(12) United States Patent
Levien et al.

(10) Patent No.: US 9,540,102 B2
(45) Date of Patent: Jan. 10, 2017

(54) BASE STATION MULTI-VEHICLE COORDINATION

(71) Applicant: Elwha LLC, a limited liability corporation of the State of Delaware, Bellevue, WA (US)

(72) Inventors: Royce A. Levien, Lexington, MA (US); Robert W. Lord, Seattle, WA (US); Richard T. Lord, Tacoma, WA (US); Mark A. Malamud, Seattle, WA (US); John D. Rinaldo, Jr., Bellevue, WA (US); Lowell L. Wood, Jr., Bellevue, WA (US)

(73) Assignee: Elwha LLC, Bellevue, WA (US)

(*) Notice: Subject to any disclaimer, the term of this patent is extended or adjusted under 35 U.S.C. 154(b) by 0 days.

(21) Appl. No.: 13/800,391

(22) Filed: Mar. 13, 2013

(65) Prior Publication Data

US 2014/0172194 A1 Jun. 19, 2014

Related U.S. Application Data

(63) Continuation-in-part of application No. 13/731,721, filed on Dec. 31, 2012, which is a continuation-in-part of application No. 13/731,450, filed on Dec. 31, 2012, which is a continuation-in-part of application No. 13/731,407, filed on Dec. 31, 2012, which is a continuation-in-part of application No. 13/731,363, filed on Dec. 31, 2012, which is a continuation-in-part
(Continued)

(51) Int. Cl.
*B64C 39/02* (2006.01)
*G05D 1/00* (2006.01)
*G08G 5/00* (2006.01)

(52) U.S. Cl.
CPC .......... *B64C 39/024* (2013.01); *G05D 1/0027* (2013.01); *G08G 5/0069* (2013.01); *G08G 5/0091* (2013.01); *B64C 2201/141* (2013.01); *B64C 2201/143* (2013.01); *B64C 2201/146* (2013.01)

(58) Field of Classification Search
CPC ............ B64C 39/024; B64C 2201/143; B64C 2201/146; B64C 2201/141; G08G 5/0069; G08G 5/0091; G05D 1/0027
USPC .......................................................... 701/2
See application file for complete search history.

(56) References Cited

U.S. PATENT DOCUMENTS 4,964,837 A 10/1990 Collier
5,581,250 A 12/1996 Khvilivitzky
(Continued)

OTHER PUBLICATIONS

"Physics-Based Approach to Chemical Source Localization Using Mobile Robotic Swarms" by Dimitri Zarzhitsky; a dissertation submitted to the Department of Computer Science and The Graduate School of The University of Wyoming; Aug. 2008.*
(Continued)

*Primary Examiner* — Anne M Antonucci

(57) ABSTRACT

Disclosed herein are example embodiments for base station multi-vehicle coordination. For certain example embodiments, at least one machine, such as a base station, may: (i) effectuate one or more communications with at least a first UFV and a second UFV; or (ii) transmit to a first UFV at least one command based at least partially on one or more communications with at least a first UFV and a second UFV. However, claimed subject matter is not limited to any particular described embodiments, implementations, examples, or so forth.

40 Claims, 27 Drawing Sheets

Related U.S. Application Data of application No. 13/730,202, filed on Dec. 28, 2012, which is a continuation-in-part of application No. 13/728,642, filed on Dec. 27, 2012, which is a continuation-in-part of application No. 13/722,874, filed on Dec. 20, 2012, which is a continuation-in-part of application No. 13/720,694, filed on Dec. 19, 2012.

(56) References Cited

U.S. PATENT DOCUMENTS

| | | |
|---|---|---|
| 6,694,228 B2 | 2/2004 | Rios |
| 6,786,213 B1 | 9/2004 | Lee |
| 6,804,607 B1 | 10/2004 | Wood |
| 6,896,220 B2 | 5/2005 | McKendree et al. |
| 6,952,001 B2 | 10/2005 | McKendree et al. |
| 6,980,151 B1 | 12/2005 | Mohan |
| 7,024,309 B2 | 4/2006 | Doane |
| 7,039,367 B1 | 5/2006 | Kucik |
| 7,299,130 B2 | 11/2007 | Mulligan et al. |
| 7,437,225 B1 | 10/2008 | Rathinam |
| 7,542,828 B2 | 6/2009 | Steele et al. |
| 7,693,624 B2 | 4/2010 | Duggan et al. |
| 7,737,878 B2 | 6/2010 | van Tooren et al. |
| 7,747,364 B2 | 6/2010 | Roy et al. |
| 7,808,377 B2 * | 10/2010 | Shafaat ............... G08G 5/0008 340/506 |
| 7,876,258 B2 | 1/2011 | Abraham et al. |
| 7,953,524 B1 | 5/2011 | Roggendorf |
| 7,969,346 B2 | 6/2011 | Franceschini et al. |
| 7,970,506 B2 | 6/2011 | DeMarco et al. |
| 8,060,270 B2 | 11/2011 | Vian et al. |
| 8,068,949 B2 | 11/2011 | Duggan et al. |
| 8,086,351 B2 | 12/2011 | Gaudiano et al. |
| 8,103,398 B2 | 1/2012 | Duggan et al. |
| 8,380,367 B2 | 2/2013 | Schultz et al. |
| 8,471,186 B2 | 6/2013 | Wallis |
| 8,700,306 B2 | 4/2014 | Duggan et al. |
| 2001/0044444 A1 | 11/2001 | Mahe et al. |
| 2003/0014165 A1 | 1/2003 | Baker et al. |
| 2003/0135762 A1 | 7/2003 | Macaulay |
| 2004/0193334 A1 | 9/2004 | Carlsson et al. |
| 2004/0249519 A1 | 12/2004 | Frink |
| 2005/0004723 A1 | 1/2005 | Duggan et al. |
| 2005/0077424 A1 | 4/2005 | Schneider |
| 2005/0090945 A1 | 4/2005 | Bodin et al. |
| 2005/0136891 A1 | 6/2005 | Wang et al. |
| 2005/0197749 A1 | 9/2005 | Nichols et al. |
| 2006/0058928 A1 | 3/2006 | Beard et al. |
| 2006/0058931 A1 | 3/2006 | Ariyur et al. |
| 2006/0089766 A1 | 4/2006 | Allard et al. |
| 2006/0097895 A1 | 5/2006 | Reynolds et al. |
| 2006/0167596 A1 | 7/2006 | Bodin et al. |
| 2006/0238414 A1 | 10/2006 | Miyamoto et al. |
| 2006/0249622 A1 | 11/2006 | Steele |
| 2006/0271248 A1 | 11/2006 | Cosgrove et al. |
| 2006/0287824 A1 | 12/2006 | Lin |
| 2007/0106473 A1 | 5/2007 | Bodin et al. |
| 2007/0139252 A1 | 6/2007 | Barry et al. |
| 2007/0152814 A1 | 7/2007 | Stefani |
| 2007/0168090 A1 | 7/2007 | DeMarco et al. |
| 2007/0210953 A1 | 9/2007 | Abraham et al. |
| 2008/0033604 A1 | 2/2008 | Margolin |
| 2008/0055149 A1 | 3/2008 | Rees et al. |
| 2008/0125933 A1 * | 5/2008 | Williams et al. ............... 701/30 |
| 2008/0190274 A1 | 8/2008 | Kirkpatrick |
| 2008/0249669 A1 | 10/2008 | Skarman |
| 2008/0255711 A1 | 10/2008 | Matos |
| 2009/0027253 A1 | 1/2009 | Van Tooren et al. |
| 2009/0102630 A1 | 4/2009 | Nordlund et al. |
| 2009/0118896 A1 | 5/2009 | Gustafsson |
| 2009/0125221 A1 | 5/2009 | Estkowski et al. |
| 2009/0134981 A1 * | 5/2009 | Shafaat ............... G08G 5/0008 340/313 |
| 2009/0210109 A1 | 8/2009 | Ravenscroft |
| 2009/0222148 A1 | 9/2009 | Knotts et al. |
| 2009/0318138 A1 | 12/2009 | Zeng et al. |
| 2009/0319100 A1 | 12/2009 | Kale et al. |
| 2010/0004798 A1 | 1/2010 | Bodin et al. |
| 2010/0049376 A1 | 2/2010 | Schultz |
| 2010/0084513 A1 | 4/2010 | Gariepy et al. |
| 2010/0100269 A1 | 4/2010 | Ekhaguere et al. |
| 2010/0121574 A1 | 5/2010 | Ariyur et al. |
| 2010/0131121 A1 | 5/2010 | Gerlock |
| 2010/0163621 A1 | 7/2010 | Ben-Asher et al. |
| 2010/0198514 A1 | 8/2010 | Miralles |
| 2010/0204867 A1 | 8/2010 | Longstaff |
| 2010/0224732 A1 | 9/2010 | Olson et al. |
| 2010/0250022 A1 | 9/2010 | Hines et al. |
| 2010/0292871 A1 | 11/2010 | Schultz et al. |
| 2010/0292874 A1 | 11/2010 | Duggan et al. |
| 2010/0302359 A1 | 12/2010 | Adams et al. |
| 2010/0332136 A1 | 12/2010 | Duggan et al. |
| 2011/0035149 A1 | 2/2011 | McAndrew et al. |
| 2011/0118981 A1 | 5/2011 | Chamlou |
| 2011/0134249 A1 | 6/2011 | Wood et al. |
| 2011/0169943 A1 | 7/2011 | Bachman, II et al. |
| 2012/0016534 A1 | 1/2012 | Lee et al. |
| 2012/0022719 A1 | 1/2012 | Matos |
| 2012/0083947 A1 | 4/2012 | Anderson et al. |
| 2012/0089274 A1 | 4/2012 | Lee et al. |
| 2012/0092208 A1 | 4/2012 | LeMire et al. |
| 2012/0106800 A1 | 5/2012 | Khan et al. |
| 2012/0123628 A1 | 5/2012 | Duggan et al. |
| 2012/0143482 A1 | 6/2012 | Gossen et al. |
| 2012/0167207 A1 | 6/2012 | Beckley et al. |
| 2012/0187243 A1 | 7/2012 | Goldie et al. |
| 2012/0200404 A1 | 8/2012 | Morris |
| 2012/0210853 A1 | 8/2012 | Abershitz et al. |
| 2012/0221168 A1 | 8/2012 | Zeng et al. |
| 2012/0296497 A1 | 11/2012 | Lee et al. |
| 2013/0197739 A1 | 8/2013 | Gallagher et al. |
| 2013/0211656 A1 | 8/2013 | An et al. |

OTHER PUBLICATIONS

"A Swarm of Nano Quadrotors ", YouTube.com, http://www.youtube.com/watch=v=YQINIGV5vtd4, Jan. 31, 2012.
"Collision Avoidance—Where We Are: Detect See and Avoid versus See and Avoid", UAV MarketSpace Developing Commercial UAV Applications, http://www.uavm.com/uavregulatory/collisionavoidance.html, Dec. 5, 2012, pp. 1-5.
"Drone Hijacking? That's Just the Start of GPS Troubles", Danger Room Wired.com, http://www.wired.com/dangerroom/2012/07/drone-hijacking/all/, Jan. 11, 2013, pp. 1-4.
"Most U.S. Drones Openly Broadcast Secret Video Feeds", Danger Room Wired.com, http://www.wired.com/dangerroom/2012/10/hack-proof-drone, Jan. 11, 2013, pp. 1-4.
"Pentagon Looks to Fix 'Pervasive Vulnerability' in Drones", Danger Room Wired.com, http://www.wired.com/dangerroom/2012/12/darpa-drones/, Jan. 11, 2013, pp. 1-5.
"Robot Quadrotors Perform James Bond Theme", YouTube.com, http://www.youtube.com/watch?vs=sUeGe-8dyk, Feb. 28, 2012.
"Unmanned aerial vehicle", Wikipedia, http://en.wikipedia.org/wiki/Unmanned_aerial_vehicle, Dec. 3, 2012, pp. 1-21.
"Vijay Kumar: Robots that fly . . . and cooperate", TED.com; http://www.ted.com/talks/vjay_kumar_robots_that_fly_and_cooperate.htm, Mar. 2012.
Albaker; Rahim; "Autonomous unmanned aircraft collision avoidance system based on geometric intersection", International Journal of the Physical Sciences, Feb. 4, 2011, vol. 6, pp. 391-401.
Anderson, Chris; "How I Accidentally Kickstarted the Domestic Drone Boom", Danger Room Wired.com, http://www.wired.com/dangerroom/2012/06/ff_drones/all, Dec. 6, 2012, pp. 1-10.
Bai; Hsu; Kochenderfer; Lee; "Unmanned Aircraft Collision Avoidance using Continuous-State POMDPs", National University of Singapore School of Computing;, http://www1.comp.nus.edu.sg/~leews/publications/rss11.pdf, Dec. 3, 2012.
Dean, Stephen; "Drone crashes into SWAT team tank during police test near Houston", Examiner.com, http://www.examiner.com/page-

(56) References Cited

OTHER PUBLICATIONS one-in-houston/drone-crashes-into-swat-team-tank-during-police-test-near-houston, Mar. 20, 2012, pp. 1-4.
Federal Aviation Administration; DOT Regs 14-CFR-91 Subchapter-F Subpart-B Flight Rules; Dec. 15, 2013 pp. 711-738.
Geyer; Singh; Chamerlain; "Avoiding Collisions Between Aircraft: State of the Art and Requirements for UAVs operating in Civilian Airspace", Robotics Institute, Carnegie Mellon University, Jan. 2008, pp. 1-19 Pittsburgh, Pennsylvania.
Gruen, Armin; "First Civilian Photogrammetric UAV Flight Over Singapore", Sensors & Systems, http://sensorandsystems.com/article/features/26474-first-vicilian-photogrammetric-uav-flig, Mar. 26, 2012; pp. 1-7.
Leopold, George; "U.S. to begin testing future drones", EE Times, http://www.eetimes.com/General/PrintView/4237809, Mar. 9, 2012, pp. 1.
Montgomery; Johnson; Roumeliotis; Matthies; "The JPL Autonomous Helicopter Testbed: A Platform for Planetary Exploration Technology Research and Development", Journal of Field Robotics, vol. 23(3), Dec. 3, 2012, Wiley Periodicals, Inc.
Subbaraman, Nidhi; "Drones over America: How unmanned fliers are already helping cops", NBC News.com, http://www.nbcnews.com/technology/drones-over-america-how-unmanned-fliers-are-already-helping-cops-1C9135554, Mar. 30, 201, pp. 1-5.

\* cited by examiner

UNOCCUPIED
FLYING
VEHICLE (UFV)
102

REMOTE
UFV
102R

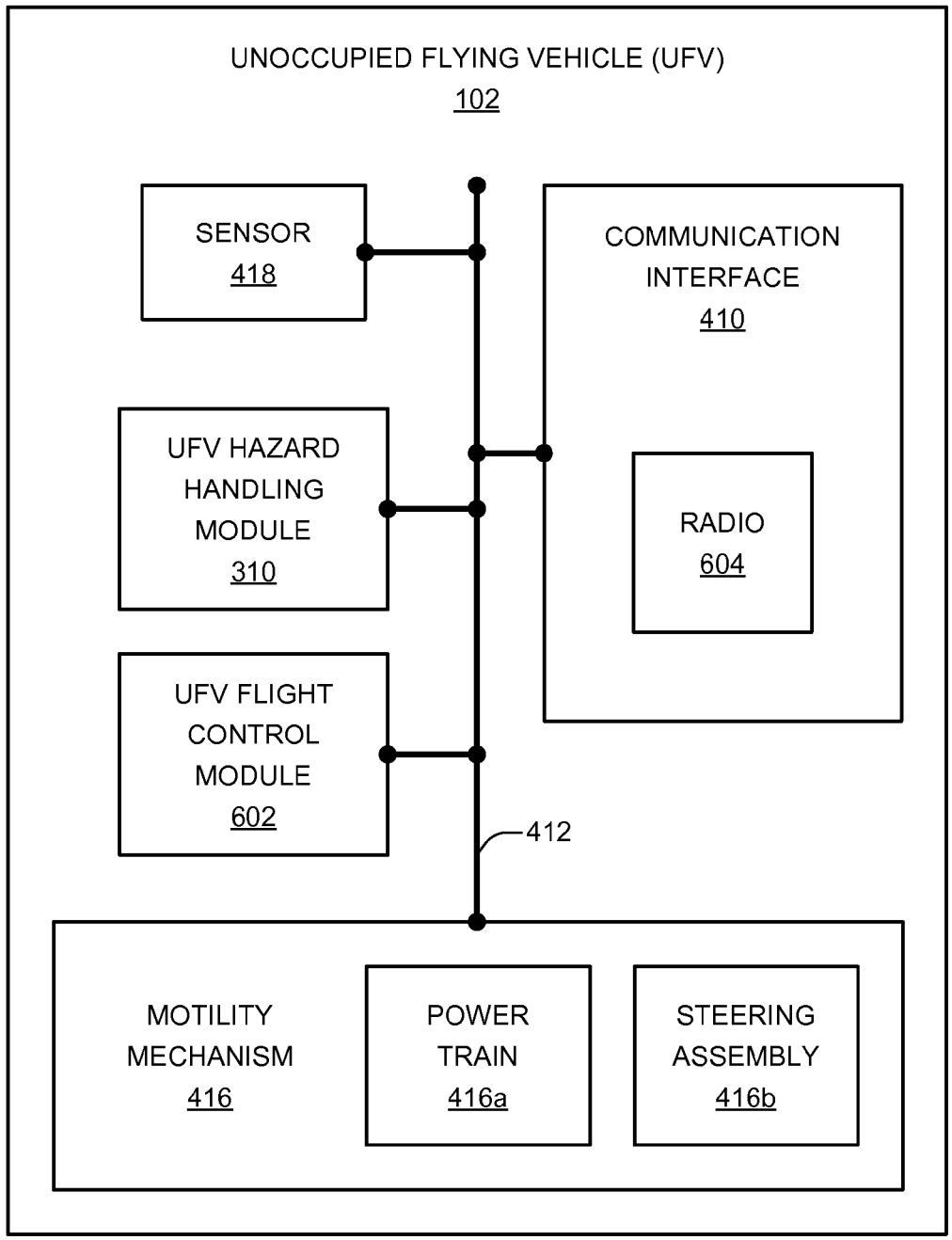
FIG. 6A
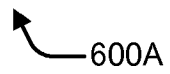

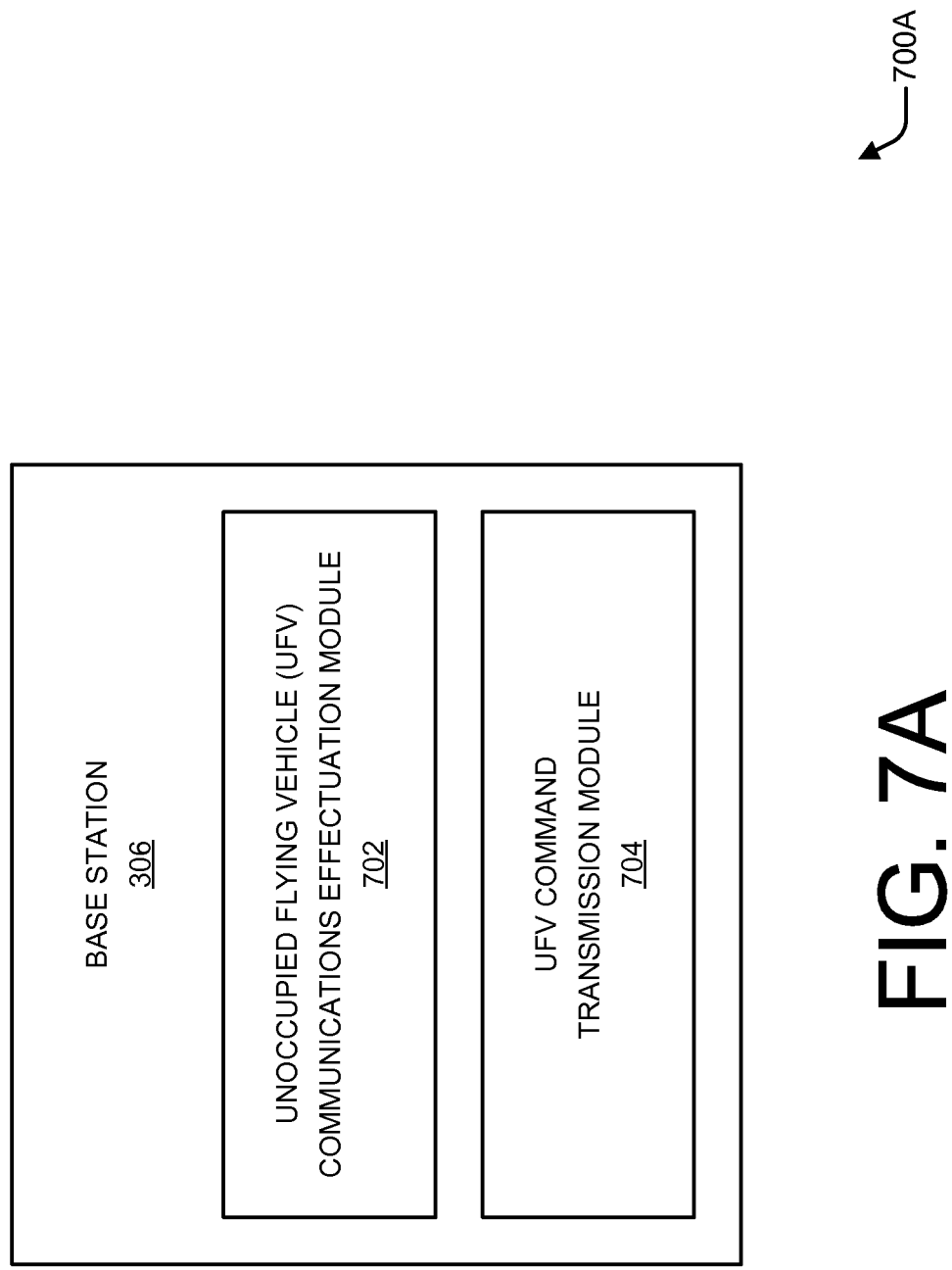

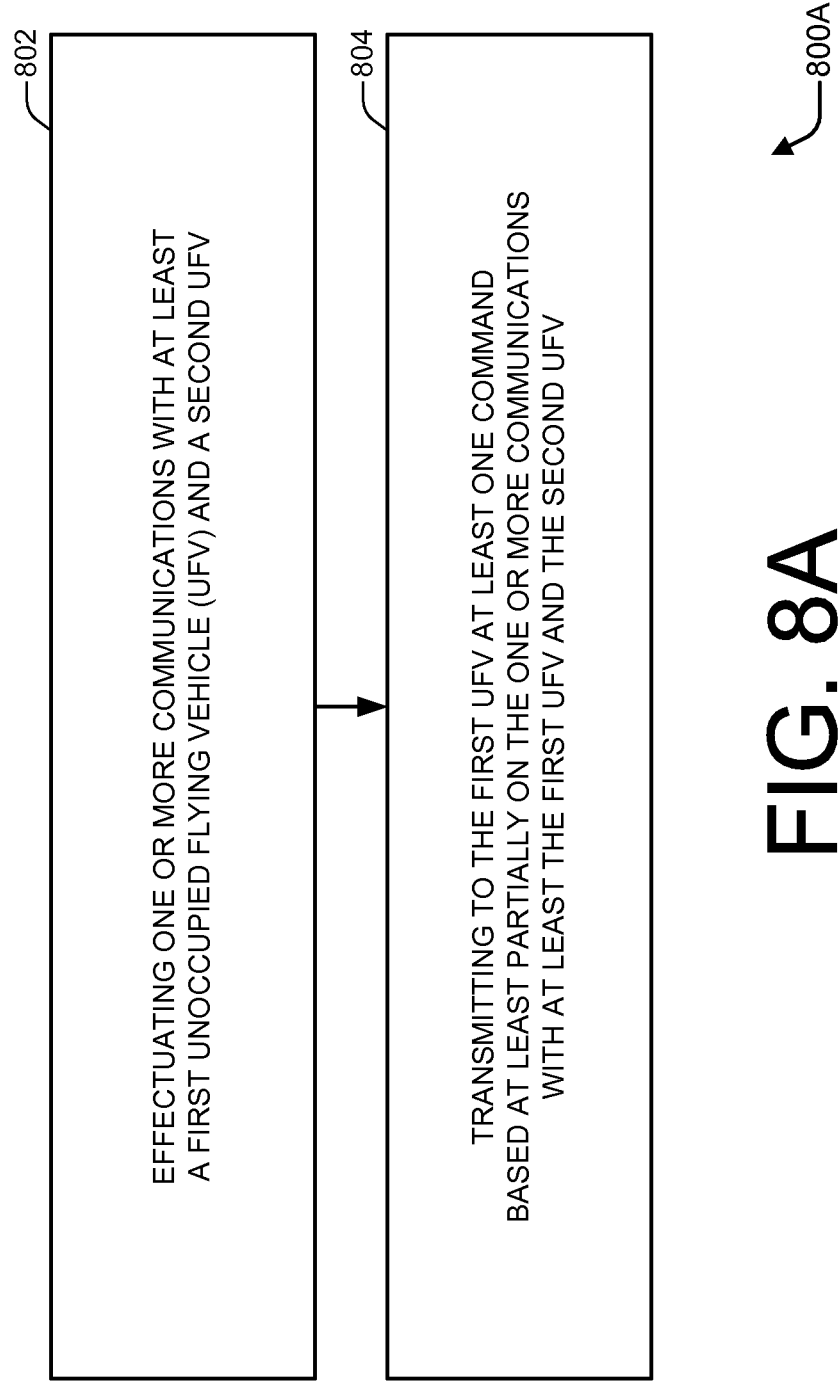

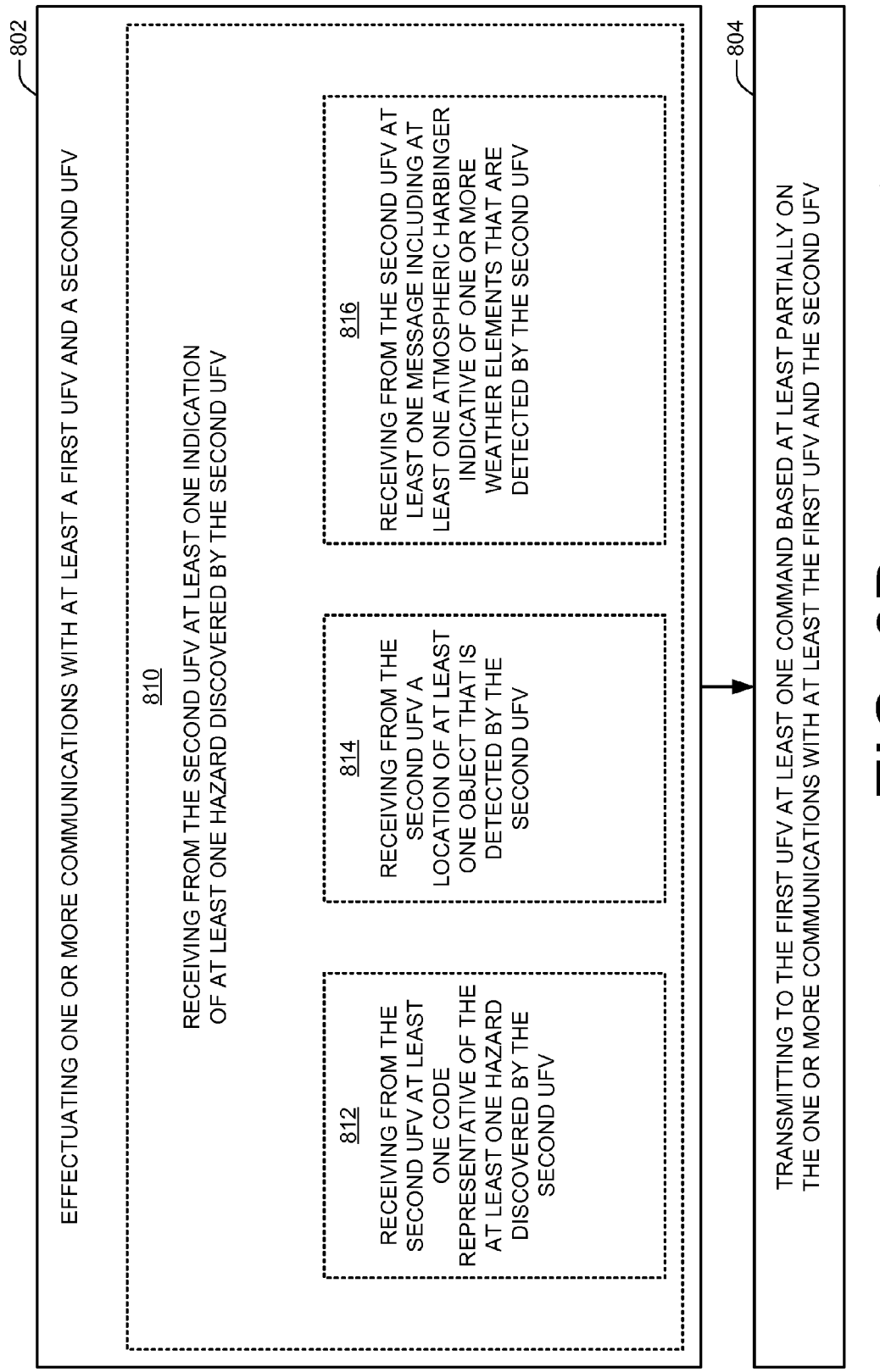

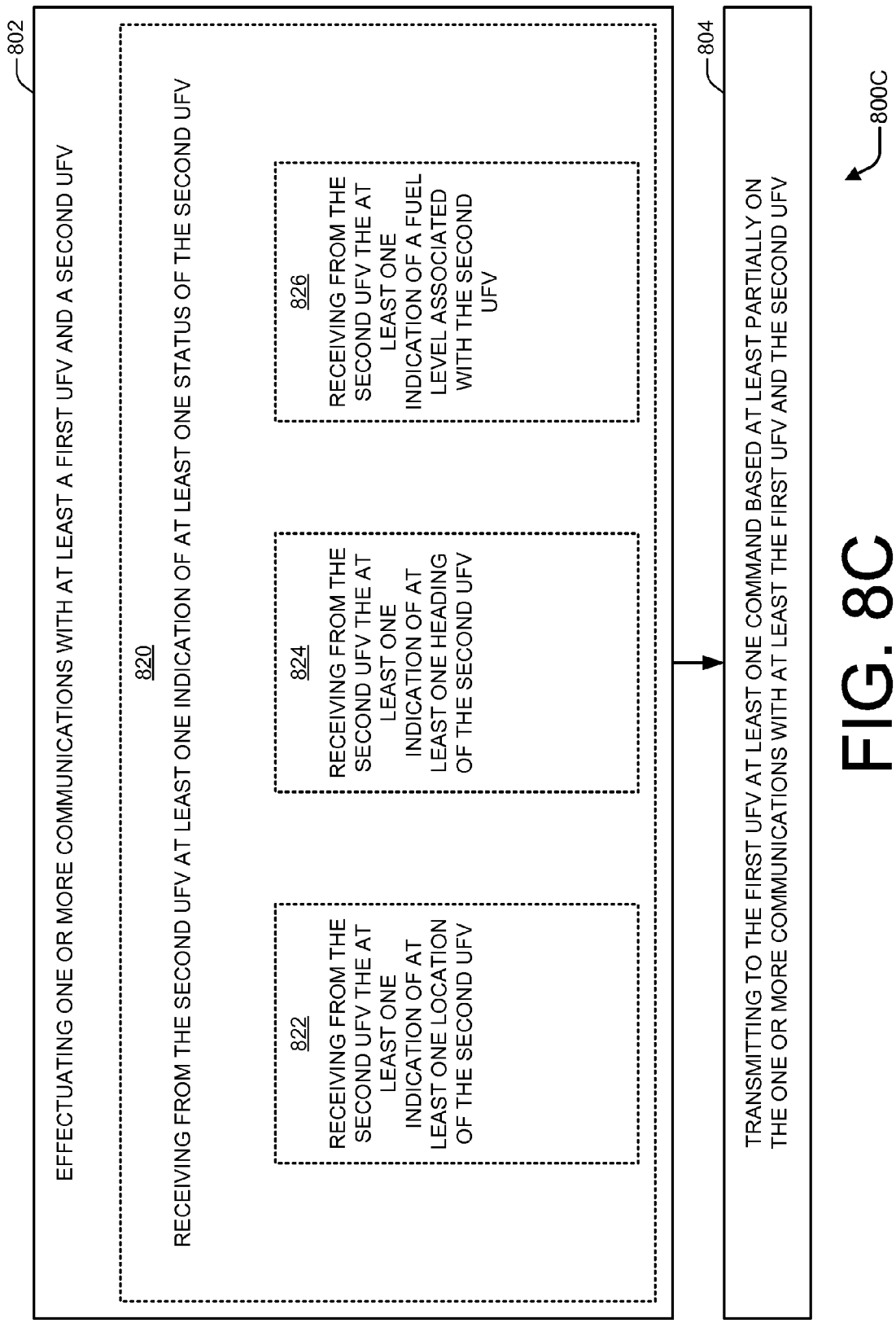

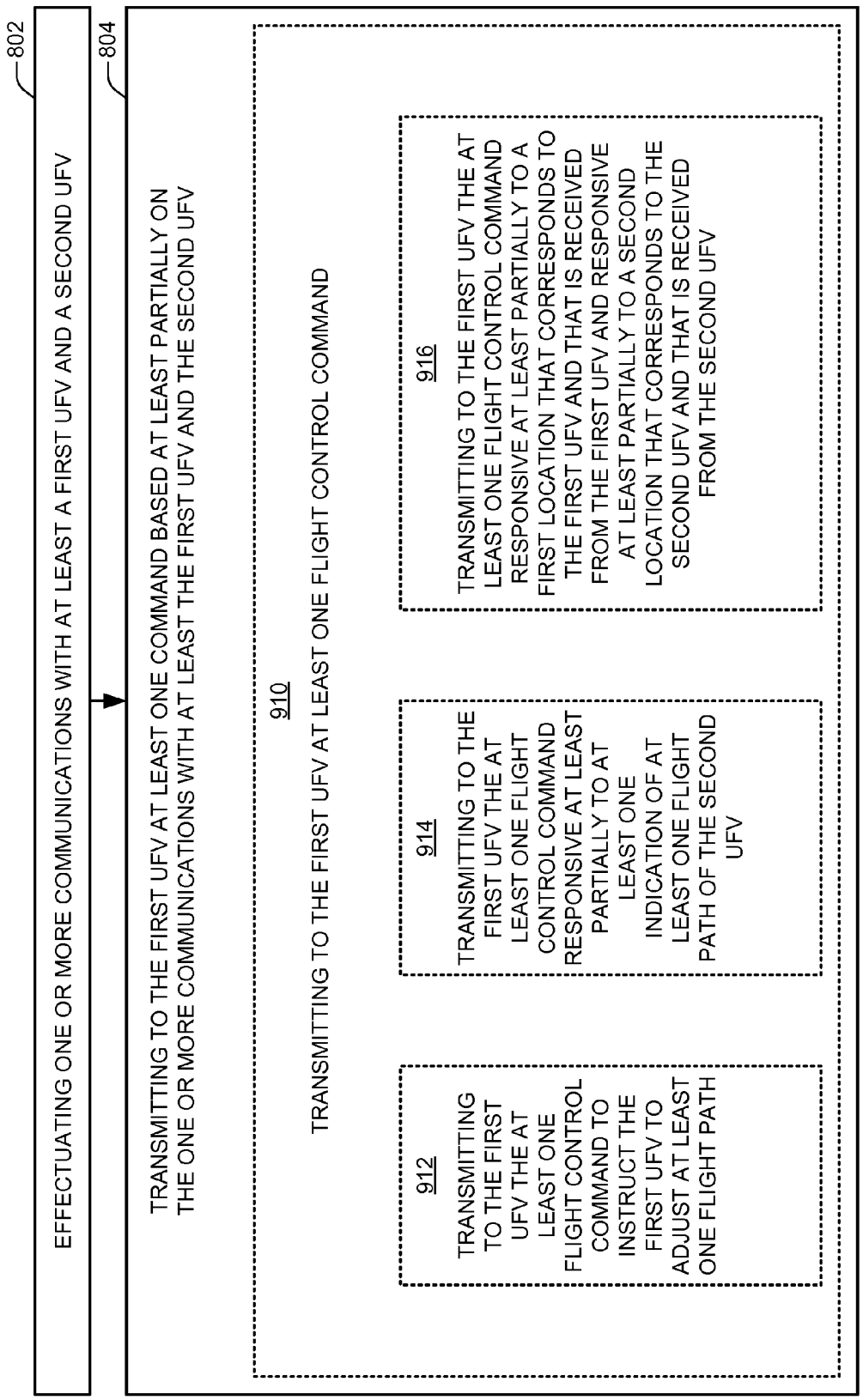

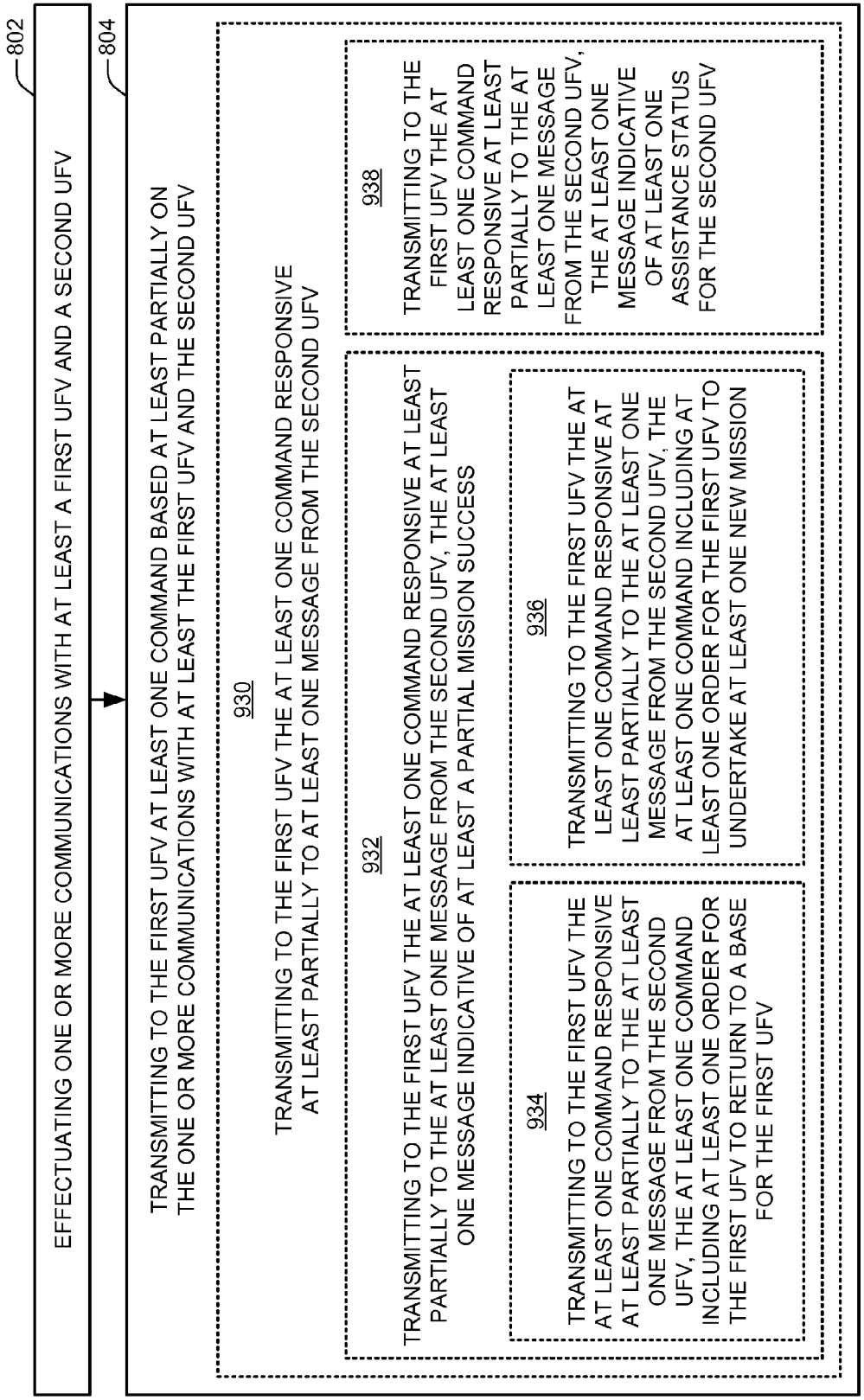

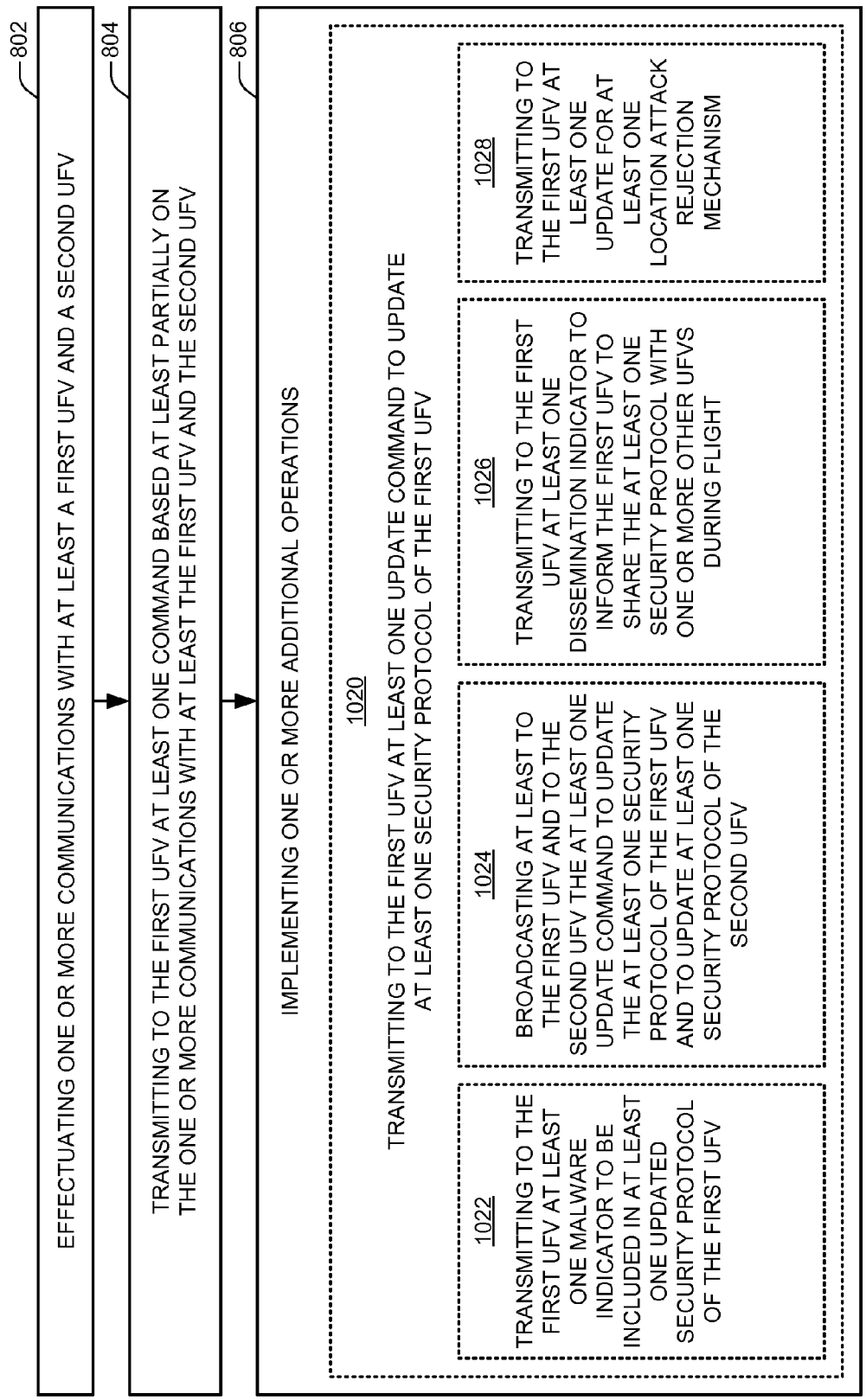

BASE STATION MULTI-VEHICLE COORDINATION

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 13/720,694, entitled "Inter-Vehicle Communication for Hazard Handling for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 19 Dec. 2012, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 13/722,874, entitled "Unoccupied Flying Vehicle (UFV) Inter-Vehicle Communication for Hazard Handling", naming Royce A. Levien, Richard T. Lord, Robert W. Lord, Mark A. Malamud, John D. Rinaldo, Jr., and Lowell L. Wood, Jr. as inventors, filed 20 Dec. 2012, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 13/728,642, entitled "Inter-Vehicle Flight Attribute Communication for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 27 Dec. 2012, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/730,202, entitled "Base Station Control for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 28 Dec. 2012, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/731,363, entitled "Automated Hazard Handling Routine Engagement", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(6) For purposes of the USPTO extra-statutory requirements, the present application constitutes a continuation-in-part of U.S. patent application Ser. No. 13/731,407, entitled "Automated Hazard Handling Routine Activation", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/731,450, entitled "Collision Targeting for an Unoccupied Flying Vehicle (UFV)", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

(8) For purposes of the USPTO extra-statutory requirements, the present application constitutes a continuation-in-part of U.S. patent application Ser. No. 13/731,721, entitled "Collision Targeting for Hazard Handling", naming Royce A. Levien, Richard T. Lord, Robert W. Lord, Mark A. Malamud, John D. Rinaldo, Jr., and Lowell L. Wood, Jr. as inventors, filed 31 Dec. 2012, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIG. 1 is a schematic diagram of at least one unoccupied flying vehicle (UFV) in accordance with certain example embodiments.

FIG. 6A is a schematic diagram of an example UFV that has one or more functional modules or one or more operational components in accordance with certain example embodiments.

FIG. 7A is a schematic diagram that includes at least one example machine, such as base station, that is capable of handling scenarios for multi-vehicle coordination in accordance with certain example embodiments.

FIG. 8A is a flow diagram illustrating an example method for at least one machine with regard to base station multi-vehicle coordination in accordance with certain example embodiments.

FIGS. 8B-8F depict example additions or alternatives for a flow diagram of FIG. 8A in accordance with certain example embodiments.

FIGS. 9A-9E depict example additions or alternatives for a flow diagram of FIG. 8A in accordance with certain example embodiments.

FIGS. 10A-10B depict example additions or alternatives for a flow diagram of FIG. 8A in accordance with certain example embodiments.

DETAILED DESCRIPTION

Figure 2:
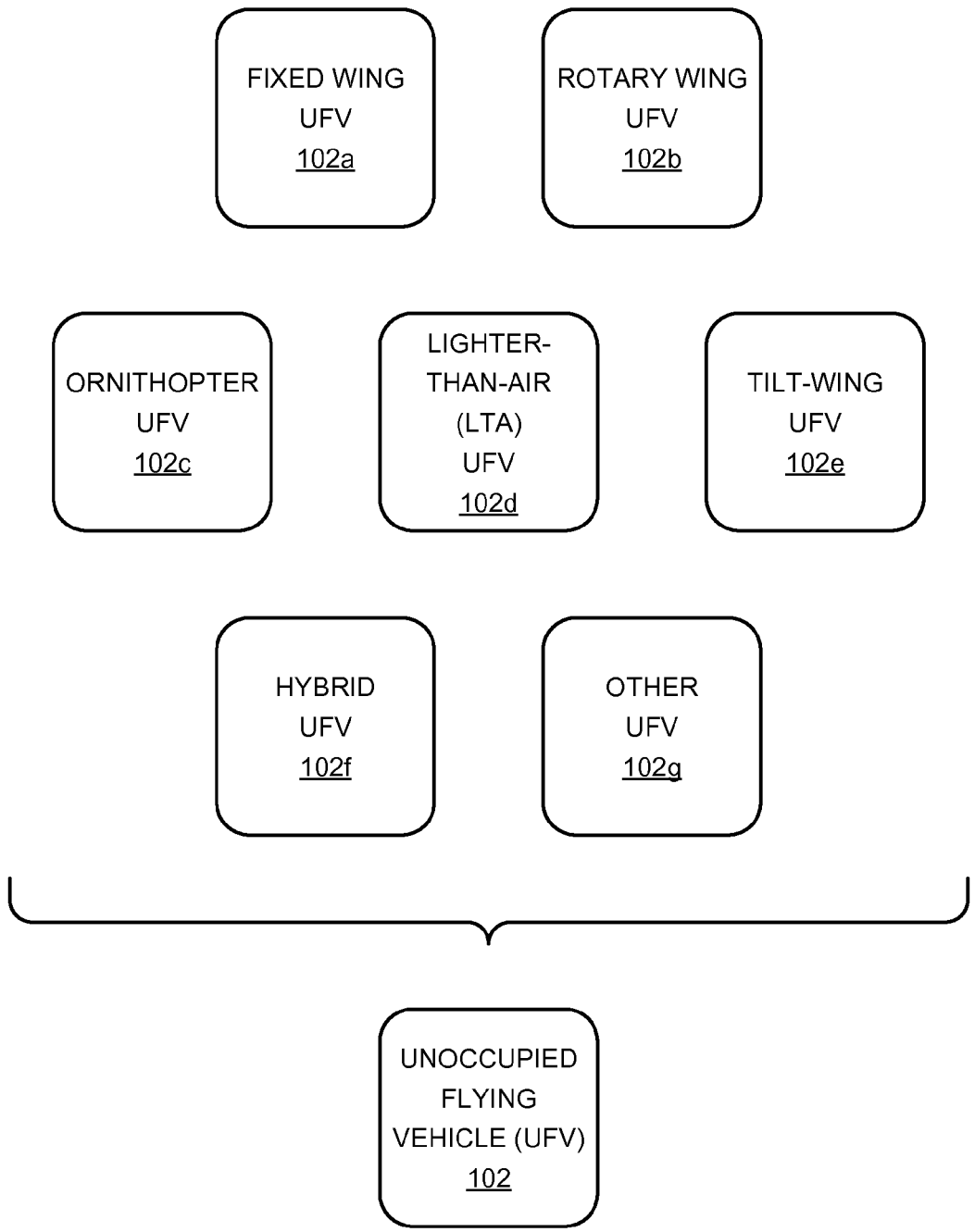
FIG. 2 is a schematic diagram of example realizations for at least one UFV in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of at least one unoccupied flying vehicle (UFV) in accordance with certain example embodiments. As shown in FIG. 1, by way of example but not limitation, schematic diagram 100 may include at least one unoccupied flying vehicle (UFV) 102 or at least one remote UFV 102R. For certain example implementations, any particular UFV: may be, comprise, or include a UFV 102, such as a local UFV, or may be, comprise, or include a remote UFV 102R. A given UFV scenario may be considered, analyzed, operated, viewed, or a combination thereof, etc. from a perspective of at least one local UFV 102 with regard to one or more remote UFVs 102R. Disclosure herein or in the accompany drawings, which form a part hereof, that is directed to a UFV 102 may additionally or alternatively be applicable to a remote UFV 102R, unless context dictates otherwise. However, claimed subject matter is not limited to any particular described embodiments, implementations, examples, etc.

For certain example embodiments, a UFV 102 may comprise or include a vehicle that is not capable of being occupied by a human pilot (e.g., due to size, shape, power, atmospheric pressure, or a combination thereof, etc. constraints), a vehicle that is not designed to seat or otherwise safely support a person, a vehicle that is not controllable by an onboard human pilot, a vehicle that is being autonomously controlled at least partially by at least one onboard module, a vehicle that is being autonomously controlled at least partially by at least one off-board module, a combination thereof, or so forth. For certain example embodiments, a UFV 102 may be at least comparable to or may comprise or include at least a portion of any one or more of: an unmanned aerial vehicle (UAV), a remotely piloted vehicle (RPV), an unmanned combat air vehicle (UCAV), an unmanned aircraft (UA), a drone, an optionally-piloted vehicle (OPV) that is not currently being controlled by an on-board pilot, a remotely piloted aircraft (RPA), a remotely operated aircraft (ROA), a radio-controlled aircraft (R/C aircraft), an automated flying drone (AFD) (e.g., a drone that is locally or remotely controlled by a computer or other processing device), an unmanned-aircraft vehicle system (UAVS), an unmanned aircraft system (UAS), a small unmanned air system (sUAS), a single one of any of the above, a combination of any two or more of the above, or so forth. For certain example embodiments, a UFV 102 may fly through a fluid (e.g., the earth's atmosphere or the air), through at least a partial vacuum (e.g., space or near-earth orbit), a combination thereof, or so forth. However, claimed subject matter is not limited to any particular described embodiments, implementations, examples, etc.

FIG. 2 is a schematic diagram 200 of example realizations for at least one UFV in accordance with certain example embodiments. As shown in FIG. 2, by way of example but not limitation, schematic diagram 200 may include at least one unoccupied flying vehicle (UFV) 102, at least one fixed wing UFV 102a, at least one rotary wing UFV 102b, at least one ornithopter UFV 102c, at least one lighter-than-air (LTA) UFV 102d, at least one tilt-wing UFV 102e, at least one hybrid UFV 102f, or at least one other type of UFV 102g. However, claimed subject matter is not limited to any particular described embodiments, implementations, examples, etc.

For certain example embodiments, a UFV 102 may be realized as described by any one or more of the examples in this paragraph. First, a UFV 102 may be realized as a fixed wing UFV 102a, such as a propeller-driven biplane or a jet plane. Second, a UFV 102 may be realized as a rotary wing UFV 102b, such as a helicopter or a gyrodyne. Third, a UFV 102 may be realized as an ornithopter UFV 102c, such as small craft that has flapping wings like an animal (e.g., like a dragonfly, bee, bird, or bat, etc.). Fourth, a UFV 102 may be realized as an LTA UFV 102d, such as a blimp, a balloon, or a dirigible. Fifth, a UFV 102 may be realized as a tilt-wing UFV 102e, such as a propeller-driven airplane with wings that rotate at least during vertical takeoff or landing. Sixth, a UFV 102 may be realized as a hybrid UFV 102f that combines one or more capabilities or structural characteristics of at least one fixed wing UFV 102a, at least one rotary wing UFV 102b, at least one ornithopter UFV 102c, at least one LTA UFV 102d, at least one tilt-wing UFV 102e, or at least one other UFV 102g. Seventh, a UFV 102 may be realized as an other type of UFV 102g, such as a tilt-rotor craft, a submarine, a rocket, a spaceship, a satellite, a vertical take-off and landing (VTOL) craft, a combination thereof, or so forth. However, claimed subject matter is not limited to any particular described embodiments, implementations, examples, etc.

For certain example embodiments, a UFV 102 may additionally or alternatively be realized so as to have one or more features, capabilities, structural characteristics, or a combination thereof, etc. as described by any one or more of the examples in this paragraph. First, a UFV 102 may include one rotor, two rotors (e.g., in a tandem, transverse, coaxial, or intermeshing, etc. configuration), three rotors, four rotors (e.g., a quadcopter, or a quadrotor, etc.), a combination thereof, or so forth. Second, a UFV 102 may include a propeller engine, a jet engine, an electric engine, a rocket engine, a ramjet or scramjet engine, a combination thereof, or so forth. Third, a UFV 102 may have at least one wing (e.g., a monoplane, a biplane, or a triplane, etc. in a stacked or tandem wing configuration), which may include a straight wing, a swept wing, a delta wing, a variable sweep wing, a combination thereof, or so forth. Fourth, a UFV 102 may be realized as having a fuselage, as having a flying wing structure, as having a blended-wing body, a combination thereof, or so forth. However, claimed subject matter is not limited to any particular described embodiments, implementations, examples, etc.

Figure 3A:
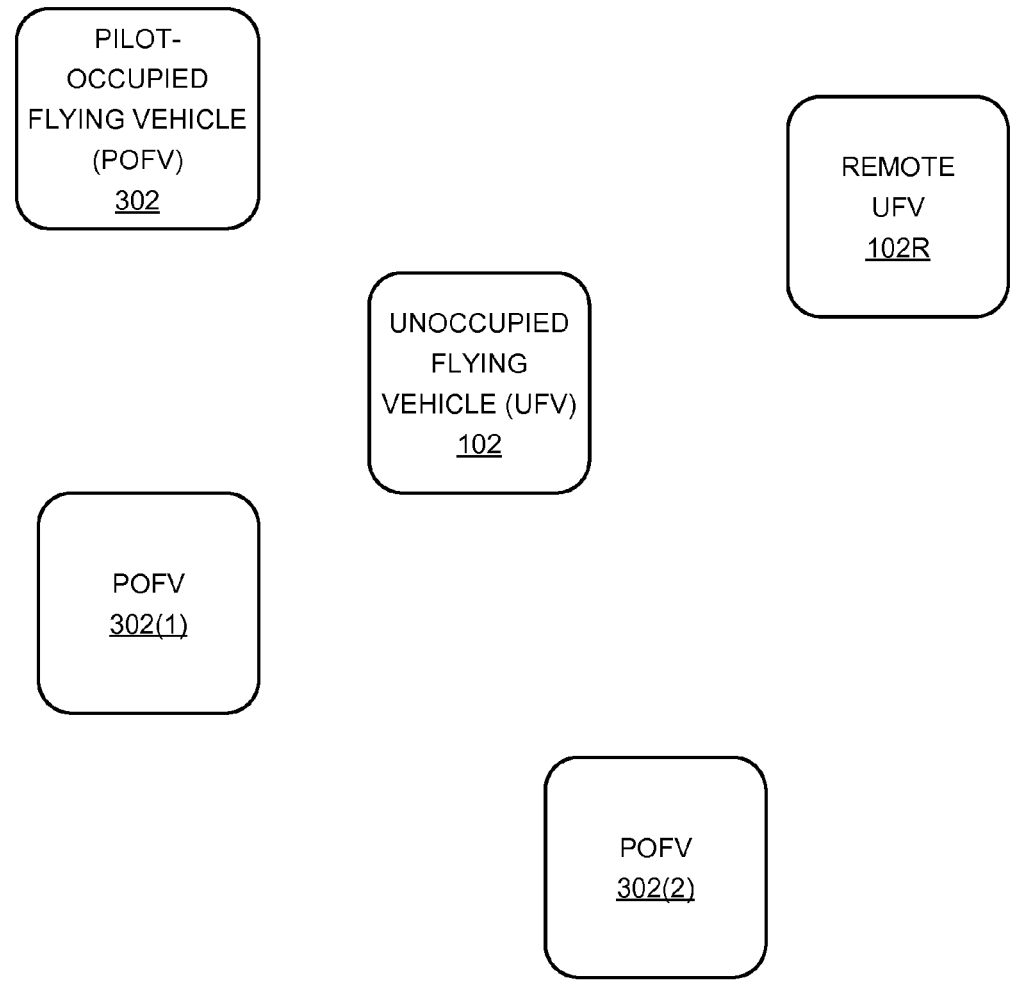
FIGS. 3A-3C are schematic diagrams of example UFV hazard handling scenarios or environments in accordance with certain example embodiments.
Figure 3A:
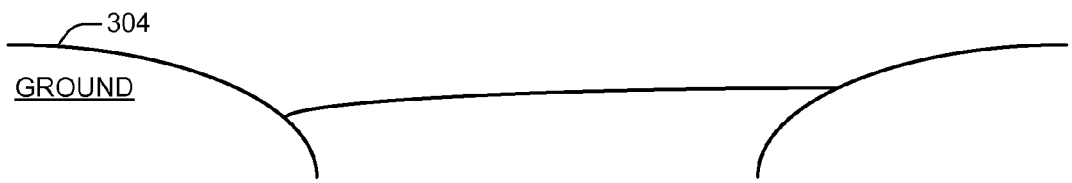
Figure 3B:
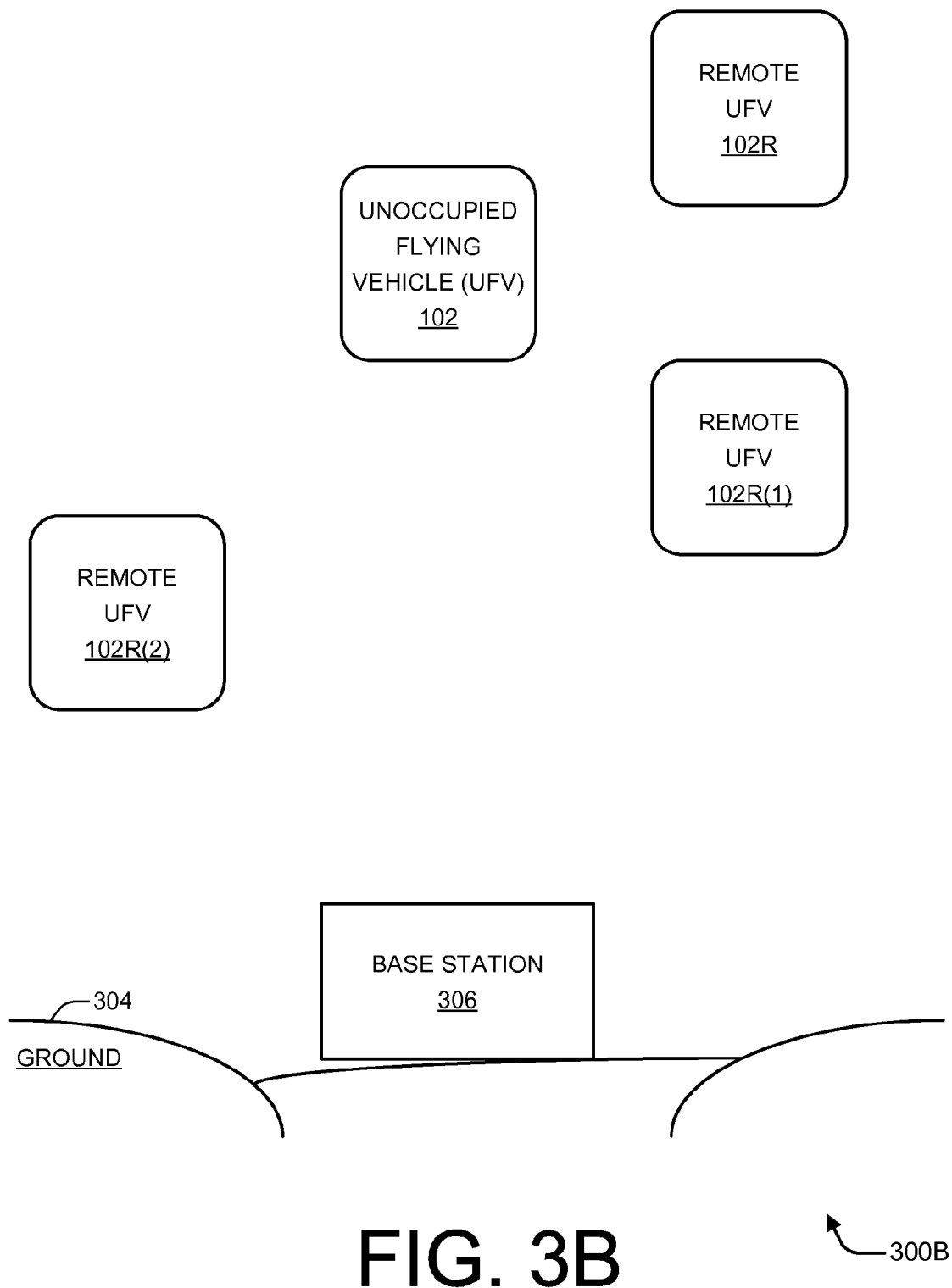
Figure 3C:
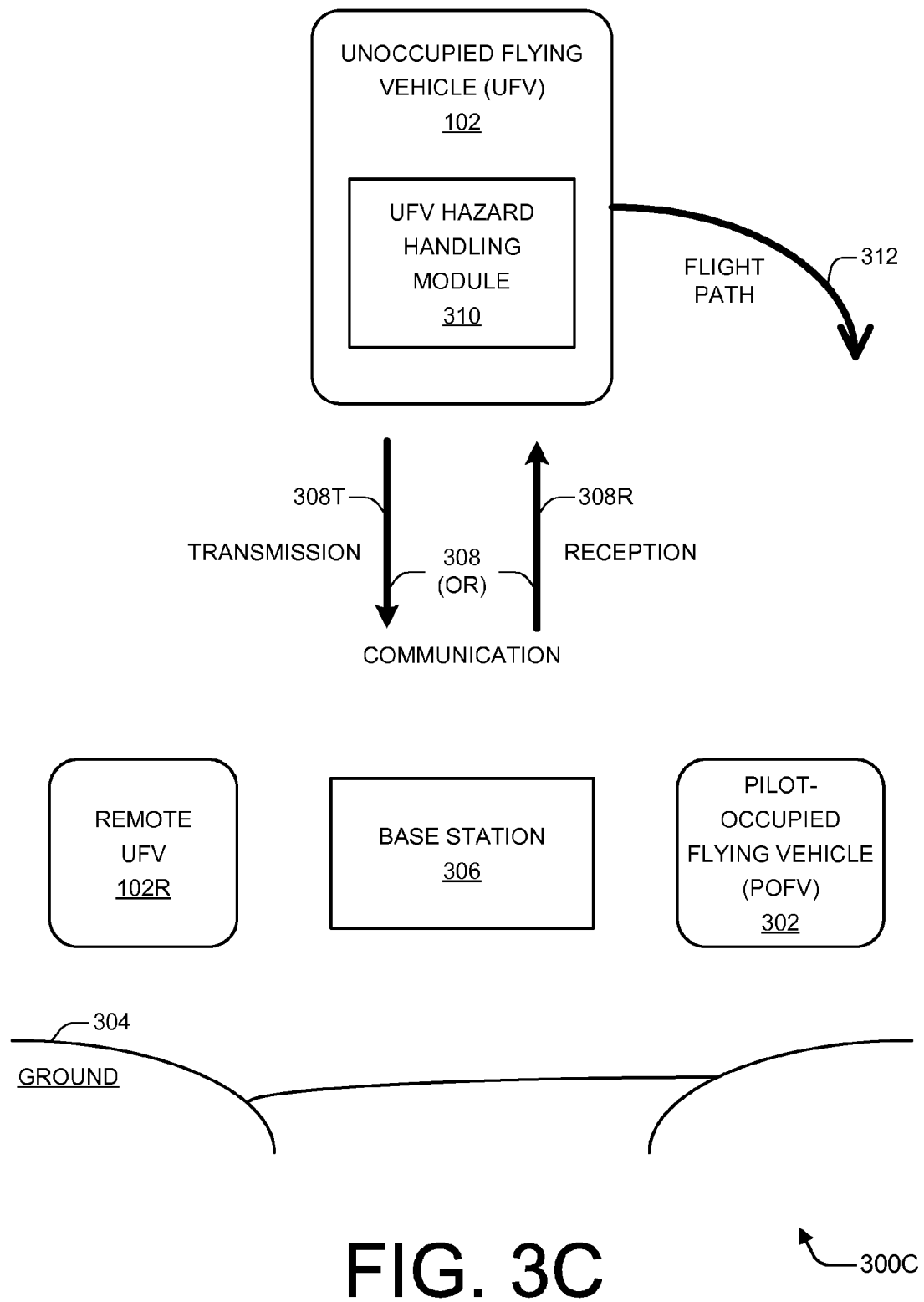

FIGS. 3A-3C are schematic diagrams 300A-300C, respectively, of example UFV hazard handling scenarios or environments in accordance with certain example embodiments. As shown in FIGS. 3A-3C, by way of example but not limitation, each of schematic diagrams 300A-300C may include at least one unoccupied flying vehicle (UFV) 102, at least one remote UFV 102R, or ground 304. In each scenario or environment of schematic diagrams 300A-300C, at least one UFV 102 may be flying above ground 304 and endeavoring to detect, sense, avoid, manage, mitigate, communicate about, coordinate over, eliminate, predict, remove, account for, remedy aftermath caused by, cooperate to address, or a combination thereof, etc. at least one hazard. For certain example embodiments, hazards may include, but are not limited to, other unoccupied flying vehicles, occupied flying vehicles, ground 304, buildings or other structures (not shown) on ground 304, moving objects, weather conditions, stationary objects, some combination thereof, or so forth. A UFV 102 may be attempting to accomplish a mission, an objective, a task, a combination thereof, or so forth. In operation, a UFV may be in communication with at least one remote UFV, at least one pilot-occupied flying vehicle (POFV), at least one base station (not shown in FIG. 3A), at least one other entity, a combination thereof, or so forth. Although scenarios or environments of schematic diagrams 300A-300C may be shown in the drawings or described herein individually or separately, at least portions or aspects of such scenarios or environments may be implemented or may otherwise occur at least partially jointly, simultaneously in time, overlapping in space, as part of a single or extended operational theater, a combination thereof, or so forth. However, claimed subject matter is not limited to any particular described embodiments, implementations, examples, etc.

FIG. 3A is a schematic diagram 300A of an example UFV hazard handling scenario or environment in accordance with certain example embodiments. As shown in FIG. 3A, by way of example but not limitation, schematic diagram 300A may include at least one UFV 102, at least one remote UFV 102R, at least one pilot-occupied flying vehicle (POFV) 302, or ground 304. More specifically, schematic diagram 300A may include a POFV 302, a first POFV 302(1), or a second POFV 302(2). For certain example embodiments, a POFV 302 may comprise or include a vehicle that is currently being controlled by an onboard human pilot. For certain example embodiments, ground 304 may include or comprise at least a portion of the earth, a landscape, a cityscape, a prairie, a hill, a mountain, a combination thereof, or so forth. However, claimed subject matter is not limited to any particular described embodiments, implementations, examples, etc.

FIG. 3B is a schematic diagram 300B of another example UFV hazard handling scenario or environment in accordance with certain example embodiments. As shown in FIG. 3B, by way of example but not limitation, schematic diagram 300B may include at least one UFV 102, at least one remote UFV 102R, ground 304, or at least one base station 306. More specifically, schematic diagram 300B may include a remote UFV 102R, a first remote UFV 102R(1), or a second remote UFV 102R(2). For certain example embodiments, a base station 306 may comprise or include a machine that is adapted to at least partially control or is capable of controlling a UFV 102 from a distance via at least one wireless communication (not explicitly shown in FIG. 3B). For certain example implementations, a base station 306 may be fixed within a building or on a mobile ground vehicle, may be capable of being hand-held, may be incorporated into or as part of another flying vehicle, a combination thereof, or so forth. For certain example implementations, a base station 306 may include or comprise a handheld controller (e.g., as may be used with an R/C model plane) for actual or near line-of-sight control, a workstation-sized or brief-case-sized controller that is mobile for operation out in the field (e.g., for police or corporate purposes), a larger apparatus that is typically stationary or may be housed in a secret or private building miles from an operational theater (e.g., for military or governmental purposes), a server-sized or distributed apparatus that provides control for a swarm of UFVs (e.g., for careful monitoring of a construction, agricultural, or warehouse site), some combination thereof, or so forth. For certain example embodiments, a base station 306 may be controlling at least one UFV, such as first remote UFV 102R(1) or second remote UFV 102R(2), while not controlling at least one other UFV, such as UFV 102 or remote UFV 102R (although it may be monitoring a UFV without controlling it). However, claimed subject matter is not limited to any particular described embodiments, implementations, examples, etc.

FIG. 3C is a schematic diagram 300C of another example UFV hazard handling scenario or environment in accordance with certain example embodiments. As shown in FIG. 3C, by way of example but not limitation, schematic diagram 300C may include at least one UFV 102, at least one remote UFV 102R, at least one POFV 302, ground 304, at least one base station 306, at least one communication 308, or at least one flight path 312. More specifically, UFV 102 may include at least one UFV hazard handling module 310, or communication 308 may include at least one transmission 308T or at least one reception 308R. For certain example embodiments, a UFV 102 may transmit at least one transmission 308T to or receive at least one reception 308R from at least one of a remote UFV 102R, a POFV 302, a base station 306, a combination thereof, or so forth. For certain example embodiments, a UFV hazard handling module 310 may affect or at least partially control a flight path of a UFV 102 at least partially based on at least one of a transmission 308T or a reception 308R. For certain example embodiments, a flight path 312 may comprise or include any one or more of: a flight trajectory, a heading, a speed, a direction, a velocity, an acceleration, a position, an altitude, a stability level, a destination, a two-dimensional course or a three-dimensional course through air or space, a course through a spherical geometrical space, a time or times at which a course is to be traversed, a time or times at which one or more positions or one or more altitudes are to be attained, a time or times at which other flight characteristic(s) are to be attained, extrapolated position-time stamp pairs based on current flight characteristic(s), extrapolated altitude-time stamp pairs based on current flight characteristic(s), a combination thereof, or so forth. However, claimed subject matter is not limited to any particular described embodiments, implementations, examples, etc.

For certain example embodiments, a remote UFV 102R, a POFV 302, or a base station 306 may participate in at least one communication 308, such as a transmission 308T or a reception 308R, with at least one UFV 102. Although not explicitly shown in schematic diagram 300C, for certain example embodiments, each of remote UFV 102R, POFV 302, or base station 306 may additionally or alternatively exchange at least one communication 308 with at least one other of remote UFV 102R, POFV 302, or base station 306. For certain example implementations, a remote UFV 102R may transmit at least one transmission 308T to or receive at least one reception 308R from at least one of a UFV 102, another remote UFV 102R, a POFV 302, a base station 306, a combination thereof, or so forth. For certain example implementations, a POFV 302 may transmit at least one transmission 308T to or receive at least one reception 308R from at least one of a UFV 102, a remote UFV 102R, another POFV 302, a base station 306, a combination thereof, or so forth. For certain example implementations, a base station 306 may transmit at least one transmission 308T to or receive at least one reception 308R from at least one of a UFV 102, a remote UFV 102R, a POFV 302, another base station 306, a combination thereof, or so forth. However, claimed subject matter is not limited to any particular described embodiments, implementations, examples, etc.

Figure 4:
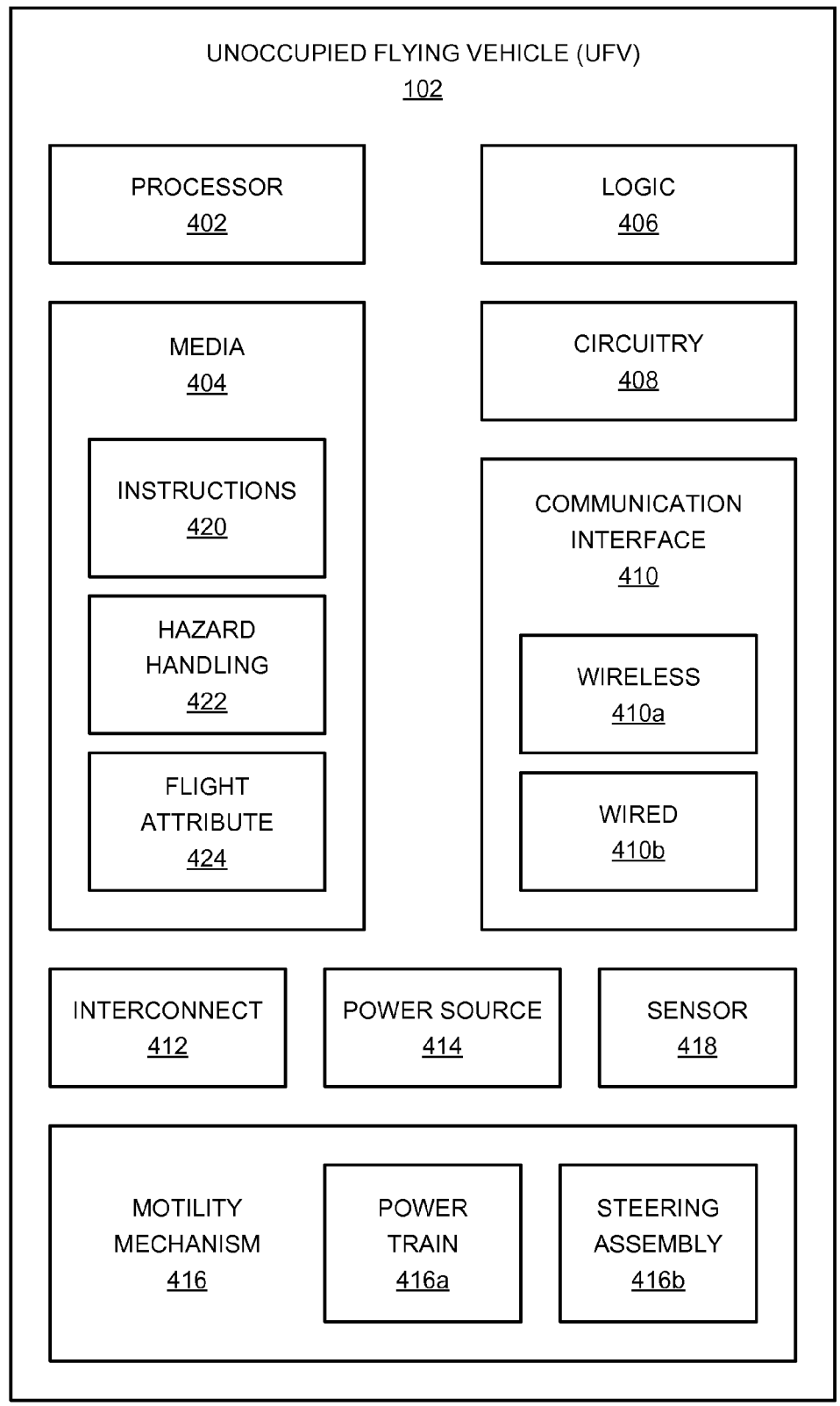
FIG. 4 is a schematic diagram of an example unoccupied flying vehicle (UFV) including one or more example components in accordance with certain example embodiments.

FIG. 4 is a schematic diagram 400 of an example unoccupied flying vehicle (UFV) including one or more example components in accordance with certain example embodiments. As shown in FIG. 4, a UFV 102 may include one or more components such as: at least one processor 402, one or more media 404, logic 406, circuitry 408, at least one communication interface 410, at least one interconnect 412, at least one power source 414, at least one motility mechanism 416, one or more sensors 418, some combination thereof, or so forth. Furthermore, as shown in schematic diagram 400, one or more media 404 may include one or more instructions 420, at least one hazard handling 422 routine, one or more flight attributes 424, some combination thereof, or so forth; a communication interface 410 may include at least one wireless communication interface 410a, at least one wired communication interface 410b, some combination thereof, or so forth; or a motility mechanism 416 may include at least one power train 416a, at least one steering assembly 416b, some combination thereof, or so forth. However, a UFV 102 may alternatively include more, fewer, or different component(s) from those that are illustrated without departing from claimed subject matter.

For certain example embodiments, a UFV 102 may include or comprise at least one machine that is capable of flight, flight control processing, (local) flight control, some combination thereof, or so forth. UFV 102 may include, for example, a computing platform or any electronic device having at least one processor or memory. Processor 402 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, or a combination thereof, etc. instructions 420, which may be executable by a processor 402; at least one hazard handling 422 routine, which may at least partially form at least a portion of instructions 420; one or more flight attributes 424; some combination thereof; or so forth. Instructions 420 may include or comprise, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 404 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 420 by one or more processors 402 may transform at least a portion of UFV 102 into a special-purpose computing device, apparatus, platform, some combination thereof, or so forth. Instructions 420 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. A hazard handling 422 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings or that are directed toward detecting, sensing, avoiding, managing, mitigating, communicating about, coordinating over, eliminating, predicting, removing, accounting for, remedying aftermath caused by, cooperating to address, or a combination thereof, etc. at least one hazard. A flight attribute 424 may include, for example, data describing or representing at least one flight attribute of a UFV, such as one or more flight characteristics, one or more flight capabilities, a combination thereof, or so forth. Additionally or alternatively, at least a portion of flight attributes 424 may be at least partially accessible to or integrated with hazard handling 422.

For certain example embodiments, logic 406 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 408 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 408 includes at least one physical or hardware component or aspect.

For certain example embodiments, one or more communication interfaces 410 may provide one or more interfaces between UFV 102 and another machine or a person/operator. With respect to a person/operator, a communication interface 410 may include, by way of example but not limitation, a screen, a speaker, keys/buttons, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, or a combination thereof, etc. to communicate wireless signals or wired signals via one or more wireless communication links or wired communication links, respectively. Communications with at least one communication interface 410 may enable transmitting, receiving, or initiating of transmissions, just to name a few examples.

For certain example embodiments, at least one interconnect 412 may enable signal communication between or among components of UFV 102. Interconnect 412 may include, by way of example but not limitation, one or more buses, channels, switching fabrics, some combination thereof, or so forth. Although not explicitly illustrated in FIG. 4, one or more components of UFV 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of UFV 102. Power source 414 may include, by way of example but not limitation, a battery, a power connector, a solar power source or charger, a mechanical power source or charger, a fuel source, a generator, an engine, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, an altimeter, an airspeed detector, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may include, by way of example but not limitation, an image/video, a sound recording, an acceleration value, a temperature, one or more SPS coordinates, a barometric pressure, a humidity level, a compass direction, an altitude, an airspeed, a gyroscopic value, a magnetic reading, a pressure value, an oscillation value, an ambient light reading, inertial readings, touch detections, proximate object location, flex detections, some combination thereof, or so forth.

For certain example embodiments, a motility mechanism 416 may enable UFV 102 to fly, overcome gravitational forces, overcome wind resistance or drag, accelerate, avoid a hazard, some combination thereof, or so forth. For certain example embodiments, a power train 416a of a motility mechanism 416 may include one or more components that work separately or at least partially together to transform or convert stored energy into kinetic energy in order to propel UFV 102. For certain example implementations, a power train 416a may include at least one engine, at least one transmission, one or more blades or propellers, at least one motor, some combination thereof, or so forth. For certain example embodiments, a steering assembly 416b of a motility mechanism 416 may include one or more components that work separately or at least partially together to transform propulsive kinetic energy into forward, backward, up, down, right, left, a combination thereof, etc. movement or some other directionality change for a UFV. For certain example implementations, a steering assembly 416b may include at least one aileron, at least one rudder, at least one elevator, one or more blades or propellers, at least one transmission that routes power to different motors or other propulsive components, at least one rotor disk tilter, at least one blade pitch angle changer, or a combination thereof, or so forth. Although illustrated separately in schematic diagram 400, power train 416a and steering assembly 416b may be implemented at least partially jointly to realize motility mechanism 416.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a photodetector may function as a wireless communication interface 410a or a sensor 418. Additionally or alternatively, one or more instructions 420 may function to realize or embody at least part of hazard handling 422 or flight attributes 424.

It should also be understood that for certain example implementations components that are illustrated in schematic diagram 400 or described herein may or may not be integral with or integrated into or onto a UFV 102. For example, a component may be removably connected to a UFV 102, a component may be wirelessly coupled to a UFV 102, some combination thereof, or so forth. By way of example only, instructions 420 may be stored on a removable card having at least one medium 404. Additionally or alternatively, at least a portion of a motility mechanism 416, such as an engine or a fuel source, may be detachable from or replaceable with a UFV 102. However, claimed subject matter is not limited to any particular described embodiments, implementations, examples, etc.

Figure 5:
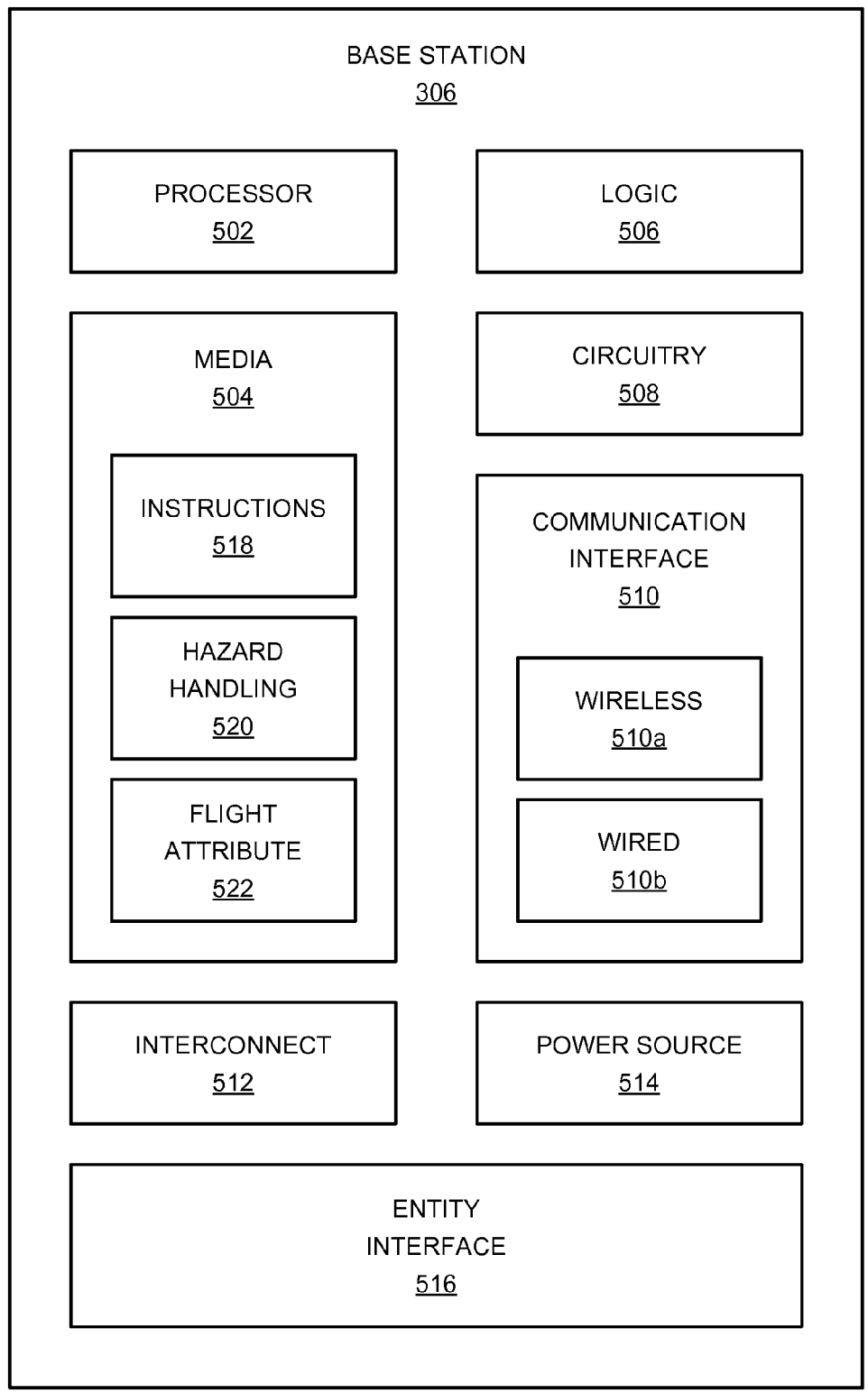
FIG. 5 is a schematic diagram of an example base station, which may be in communication with at least one UFV, including one or more example components for a base station in accordance with certain example embodiments.

FIG. 5 is a schematic diagram 500 of an example base station, which may be in communication with at least one UFV (not shown in FIG. 5), including one or more example components for a base station in accordance with certain example embodiments. As shown in FIG. 5, a base station 306 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may include one or more instructions 518, at least one hazard handling 520 routine, at least one flight attribute 522, some combination thereof, or so forth; or communication interface 510 may include at least one wireless communication interface 510a, at least one wired communication interface 510b, some combination thereof, or so forth. However, a base station 306 may alternatively include more, fewer, or different component(s) from those that are illustrated without departing from claimed subject matter.

For certain example embodiments, a base station 306 may include or comprise at least one machine that is capable of flight control processing, (distant) flight control, some combination thereof, or so forth. Base station 306 may include, for example, a computing platform or any electronic device or devices having at least one processor or memory. Processor 502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, or a combination thereof, etc. instructions 518, which may be executable by a processor 502; at least one hazard handling 520 routine, which may at least partially form at least a portion of instructions 518; one or more flight attributes 522; some combination thereof; or so forth. Instructions 518 may include or comprise, by way of example but not limitation, a program, a module, an application or app (e.g., that is native, that runs in a browser, that runs within a virtual machine or server, or a combination thereof, etc.), an operating system, or a combination thereof, etc. or portion thereof; operational data structures; source code, object code, just-in-time (JIT) compiled code, or a combination thereof, etc.; processor-executable instructions; other code; some combination thereof; or so forth. Media 504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions, one or more hazard handling routines, one or more flight attributes, some combination thereof, or so forth.

For certain example embodiments, execution of instructions 518 by one or more processors 502 may transform at least a portion of base station 306 into a special-purpose computing device, apparatus, platform, some combination thereof, or so forth. Instructions 518 may include, for example, instructions that are capable of realizing at least a portion of one or more flow diagrams methods, processes, procedures, operations, functionality, technology, mechanisms, or a combination thereof, etc. that are described herein or illustrated in the accompanying drawings. A hazard handling 520 routine may include, for example, instructions that are capable of realizing at least a portion of one or more flow diagrams, methods, processes, procedures, operations, functionality, technology, mechanisms, or a combination thereof, etc. that are described herein or illustrated in the accompanying drawings and that are directed toward interacting with at least one UFV to facilitate detecting, seeing, avoiding, managing, mitigating, communicating about, coordinating over, eliminating, predicting, removing, accounting for, remedying aftermath caused by, cooperating to address, or a combination thereof, etc. at least one hazard. A flight attribute 522 may include, for example, data describing or representing at least one flight attribute, such as one or more flight characteristics, one or more flight capabilities, a combination thereof, etc. of at least one UFV that base station 306 is communicating with, is at least partially controlling, is monitoring, some combination thereof, or so forth. Additionally or alternatively, at least a portion of flight attributes 522 may be at least partially accessible to or integrated with hazard handling 520.

For certain example embodiments, logic 506 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings. Circuitry 508 may include hardware, software, firmware, discrete/fixed logic circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 508 includes at least one physical or hardware component or aspect.

For certain example embodiments, one or more communication interfaces 510 may provide one or more interfaces between base station 306 and another machine or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, or a combination thereof, etc.), a physical or logical network adapter or port, a frequency converter, a baseband processor, an internet or telecommunications backbone connector, a fiber optic connector, a storage area network (SAN) connector, or a combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of base station 306. Interconnect 512 may include, by way of example but not limitation, one or more buses, channels, switching fabrics, local area networks (LANs), storage area networks (SANs), some combination thereof, or so forth. Although not explicitly illustrated in FIG. 5, one or more components of base station 306 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of base station 306. Power source 514 may include, by way of example but not limitation, a power connector for accessing an electrical grid, a fuel cell, a solar power source, one or more batteries, some combination thereof, or so forth.

For certain example embodiments, an entity interface 516 may enable one or more entities (e.g., a person, a group, an electronic agent, a robotic entity, or a combination thereof, etc.) to provide input to or receive output from base station 306. Interactions between an entity and a base station may relate, by way of example but not limitation, to inputting or outputting instructions, commands, settings, flight characteristics, flight capabilities, some combination thereof, or so forth. Certain entity interfaces 516 may enable both entity input and entity output at base station 306 or over at least one network link.

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize or embody at least part of hazard handling 520 or flight attributes 522.

It should also be understood that for certain example implementations components that are illustrated in schematic diagram 500 or described herein may not be integral or integrated with a base station 306. For example, a component may be removably connected to a base station 306, a component may be wirelessly coupled to a base station 306, one or more components of a base station 306 may be geographically distributed or separated from one another, some combination thereof, or so forth. By way of example only, instructions 518 may be stored on one medium 504, and flight attributes 522 (or another portion of instructions 518) may be stored on a different medium 504, which may be part or a same server or a part of a different server of, e.g., a server farm. Additionally or alternatively, respective processor-media pairs, if any, may be physically realized on different or respective server blades or server containers for a base station 306 that is implemented on server hardware. However, claimed subject matter is not limited to any particular described embodiments, implementations, examples, etc.

FIG. 6A is a schematic diagram 600A of an example UFV that has one or more functional modules or one or more operational components in accordance with certain example embodiments. As shown in FIG. 6A, example UFV 102 of schematic diagram 600A may include, by way of example but not limitation, at least one UFV hazard handling module 310, at least one communication interface 410, at least one interconnect 412, at least one motility mechanism 416, one or more sensors 418, or at least one UFV flight control module 602. More specifically, communication interface 410 may include at least one radio 604, or so forth; or motility mechanism 416 may include at least one power train 416a, at least one steering assembly 416b, some combination thereof, or so forth. However, a UFV 102 may alternatively include more, fewer, or different module(s) or component(s) from those that are illustrated without departing from claimed subject matter.

For certain example embodiments, a UFV hazard handling module 310 or a UFV flight control module 602 may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling an actual or a potential hazard. Example aspects related to hazard handling in a UFV context are described further herein above and below. Although UFV hazard handling module 310 and UFV flight control module 602 are illustrated separately in schematic diagram 600A, they may additionally or alternatively be implemented at least partially in combination, jointly, with an overlapping functionality, some combination thereof, or so forth. However, claimed subject matter is not limited to any particular described embodiments, implementations, examples, etc.

For certain example embodiments, a module of a UFV 102 may include or be comprised of at least one processor (e.g., a processor 402 of FIG. 4, etc.), one or more media (e.g., a medium 404 of FIG. 4, etc.), executable instructions (e.g., processor-executable instructions, instructions 420 of FIG. 4, computer-implementable instructions, etc.) incorporated into one or more media, logic (e.g., logic 406 of FIG. 4, etc.), circuitry (e.g., circuitry 408 of FIG. 4, etc.), other described or illustrated component(s), may be comprised as otherwise described herein, some combination thereof, or so forth. For certain example implementations, one or more modules (e.g., a UFV hazard handling module 310, a UFV flight control module 602, or a combination thereof, etc.) of at least one UFV 102 may function or interoperate with one or more modules of at least one remote UFV 102R, at least one POFV 302, at least one base station 306 (e.g., each of FIGS. 3A-3C or FIG. 6B), or a combination thereof, etc. via at least one radio 604 of UFV 102. However, claimed subject matter is not limited to any particular described embodiments, implementations, examples, etc.

For certain example embodiments, UFV 102 may be in constant, infrequent, regular, irregular, intermittent, occasional, scheduled, unscheduled, a combination thereof, etc. communication with at least one remote UFV 102R, at least one POFV 302, at least one base station 306, or a combination thereof, etc. via at least one radio 604. One or more sensors 418 or at least one radio 604 may feed sensor readings, telemetry, flight attributes, weather conditions, topographical maps, coordination parameters, one or more automated hazard handling routines, a combination thereof, etc. to UFV hazard handling module 310, UFV flight control module 602, a combination thereof, or so forth. For certain example implementations, UFV hazard handling module 310 may at least make hazard-related flight control decisions or provide flight control input to UFV flight control module 602 with regard to handling actual or potential hazards. For certain example implementations, UFV flight control module 602 may at least partially make flight control decisions or provide flight control commands to motility mechanism 416 so as to implement flight control decisions, including, by way of example but not limitation, based at least partly on flight control input provided by UFV hazard handling module 310. Additionally or alternatively, a UFV hazard handling module 310 may supply flight control input, including by way of example but not limitation with at least one flight control command, directly (e.g., without routing it first through UFV flight control module 602) to motility mechanism 416. To implement flight control decisions, including flight control commands, motility mechanism 416 may employ power train 416a to provide at least one propulsive force or may employ steering assembly 416b to provide at least one directional change. However, claimed subject matter is not limited to any particular described embodiments, implementations, examples, etc.

Figure 6B:
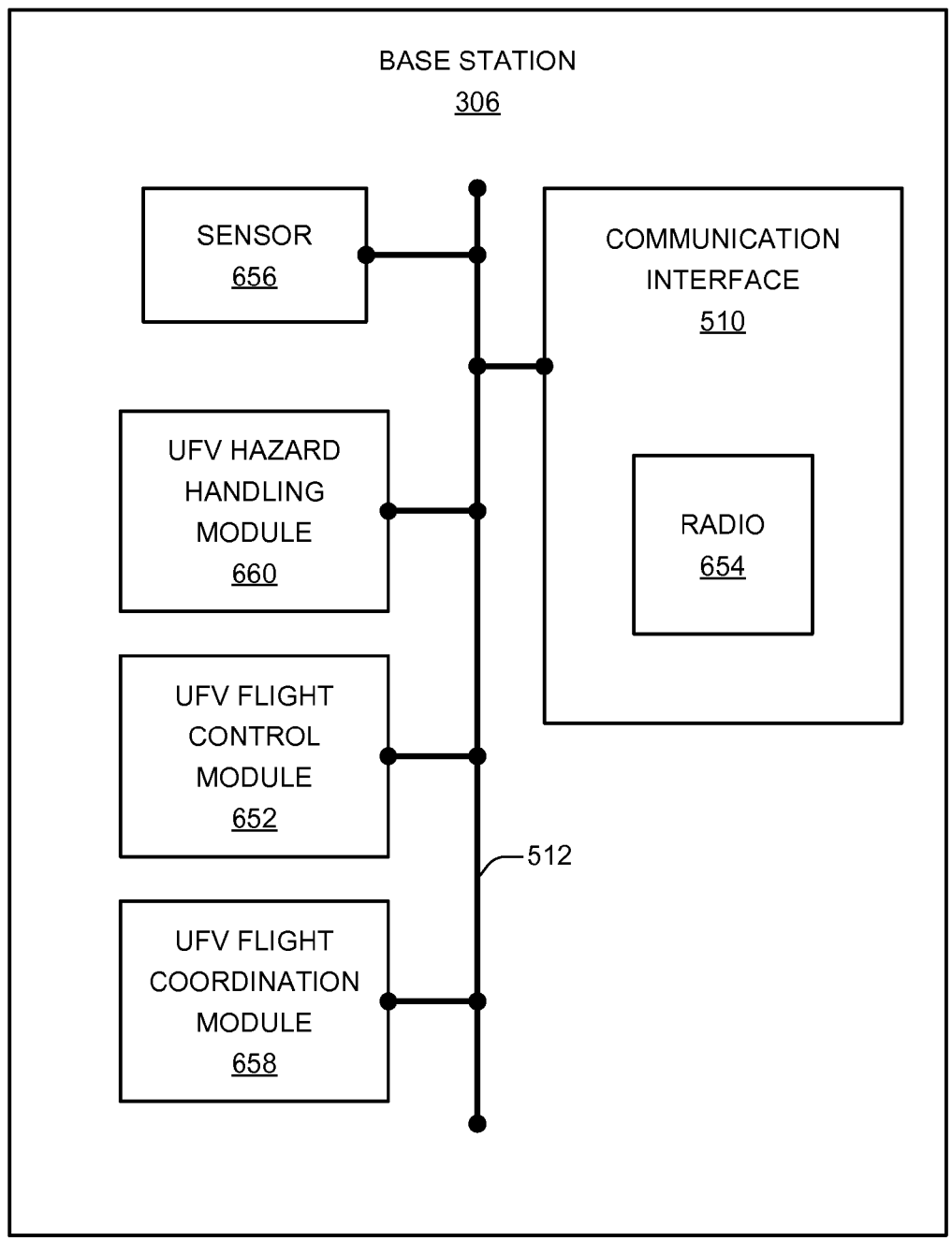
FIG. 6B is a schematic diagram of an example base station that has one or more functional modules or one or more operational components in accordance with certain example embodiments.

FIG. 6B is a schematic diagram 600B of an example base station that has one or more functional modules or one or more operational components in accordance with certain example embodiments. As shown in FIG. 6B, example base station 306 of schematic diagram 600B may include, by way of example but not limitation, at least one communication interface 510, at least one interconnect 512, at least one UFV flight control module 652, at least one sensor 656, at least one UFV flight coordination module 658, or at least one UFV hazard handling module 660. More specifically, communication interface 510 may include at least one radio 654, or so forth. However, a base station 306 may alternatively include more, fewer, or different module(s) or component(s) from those that are illustrated without departing from claimed subject matter. Moreover, module(s) or component(s) that are illustrated in schematic diagram 600B may alternatively or additionally be separate from or non-integrated with a base station 306, such as being external to a housing of or remotely-accessible to a base station 306, for certain example implementations.

For certain example embodiments, a UFV hazard handling module 660, a UFV flight coordination module 658, or a UFV flight control module 652 may operate to implement, perform, facilitate performance of, or a combination thereof, etc. one or more flow diagrams, methods, processes, procedures, operations, functionality, technology, modules, mechanisms, or a combination thereof, etc. that are described herein or illustrated in the accompanying drawings or that relate to handling of an actual or a potential hazard. Example aspects related to hazard handling in a UFV context with at least one base station are described further herein above and below. Although UFV hazard handling module 660, UFV flight control module 652, and UFV flight coordination module 658 are illustrated separately in schematic diagram 600B, they may additionally or alternatively be implemented at least partially in combination, jointly, with an overlapping functionality, some combination thereof, or so forth. For certain example embodiments, and by way of example but not limitation, at least a portion of one or more modules (e.g., module 702, module 704, or a combination thereof, etc.) that are described herein below with particular reference to FIG. 7A may be implemented as at least part of UFV hazard handling module 660, as at least part of UFV flight control module 652, as at least part of UFV flight coordination module 658, some combination thereof, or so forth. However, claimed subject matter is not limited to any particular described embodiments, implementations, examples, etc.

For certain example embodiments, a module of a base station 306 may include or be comprised of at least one processor (e.g., a processor 502 of FIG. 5, etc.), one or more media (e.g., a medium 504 of FIG. 5, etc.), executable instructions (e.g., processor-executable instructions, instructions 518 of FIG. 5, computer-implementable instructions, etc.) incorporated into one or more media, logic (e.g., logic 506 of FIG. 5, etc.), circuitry (e.g., circuitry 508 of FIG. 5, etc.), other described or illustrated component(s), may be comprised as otherwise described herein, some combination thereof, or so forth. For certain example embodiments, one or more modules (e.g., a UFV hazard handling module 660, a UFV flight control module 652, a UFV flight coordination module 658, or a combination thereof, etc.) of at least one base station 306 may function or interoperate with one or more modules of at least one UFV 102, at least one remote UFV 102R, at least one POFV 302, at least one other base station 306 (e.g., each of FIGS. 3A-3C or 6A), or a combination thereof, etc. via at least one radio 654 (or via a wired connection (not explicitly shown in FIG. 6B) of a communication interface 510) of base station 306, such as by sending one or more commands to a UFV 102. However, claimed subject matter is not limited to any particular described embodiments, implementations, examples, etc.

For certain example embodiments, a base station 306 may be in constant, infrequent, regular, irregular, intermittent, occasional, scheduled, unscheduled, a combination thereof, etc. communication with at least one UFV 102, at least one remote UFV 102R, at least one POFV 302, at least one first UFV, at least one second UFV, at least one other base station 306, or a combination thereof, etc. via at least one radio 654. For certain example implementations, one or more sensors 656 (e.g., such as one or more of example sensor types described herein above with particular reference to sensor 418 (e.g., for a UFV 102 of FIG. 4)) or at least one radio 654 may feed sensor readings, telemetry, flight attributes, weather conditions, topographical maps, coordination parameters, at least one automated hazard handling routine, a combination thereof, etc. to UFV hazard handling module 660, UFV flight control module 652, UFV flight coordination module 658, a combination thereof, or so forth. For certain example embodiments, UFV hazard handling module 660 may at least make hazard-related flight control decisions or provide flight control input to UFV flight control module 652 or UFV flight coordination module 658 with regard to handling actual or potential hazards. For certain example embodiments, UFV flight coordination module 658 may at least make multi-UFV coordination flight control decisions or provide flight control input to UFV flight control module 652 or UFV hazard handling module 660 with regard to coordinating two or more UFVs, with or without involvement by another base station. For certain example embodiments, UFV flight control module 652 may at least partially make flight control decisions or formulate flight control commands (e.g., for transmission via radio 654 to a UFV 102 and possible application to a motility mechanism 416 (e.g., of FIG. 6A) thereof) so as to realize flight control decisions, including, by way of example but not limitation, based at least partly on flight control input provided by at least UFV hazard handling module 660 or UFV flight coordination module 658. However, claimed subject matter is not limited to any particular described embodiments, implementations, examples, etc.

FIG. 7A is a schematic diagram 700A that includes at least one example machine, such as a base station, that is capable of handling scenarios for multi-vehicle coordination in accordance with certain example embodiments. As shown in FIG. 7A, by way of example but not limitation, schematic diagram 700A includes at least one machine that may include a UFV communications effectuation module 702 or a UFV command transmission module 704. More specifically, schematic diagram 700A may include a machine that includes or comprises at least one base station 306. By way of example but not limitation, a UFV communications effectuation module 702 or a UFV command transmission module 704 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, a UFV communications effectuation module 702 or a UFV command transmission module 704 may be implemented separately or at least partially jointly or in combination. For certain example implementations, a UFV communications effectuation module 702 may be configured to effectuate one or more communications with at least a first UFV and a second UFV. For certain example implementations, a UFV command transmission module 704 may be configured to transmit to a first UFV at least one command based at least partially on one or more communications with at least the first UFV and a second UFV. However, claimed subject matter is not limited to any particular described embodiments, implementations, examples, etc.

FIGS. 7B-7E are schematic diagrams 700B-700E that include at least one example machine and that depict example scenarios for implementing base station multi-vehicle coordination in accordance with certain example embodiments. As shown in FIGS. 7B-7E, by way of example but not limitation, one or more of schematic diagrams 700B-700E may include at least one first UFV 102(1), at least one second UFV 102(2), at least one base station 306, at least one effectuation 710, at least one communication 712, at least one transmission 714, or at least one command 716. Each of schematic diagrams 700B-700E may include alternative or additional depictions, which may relate to base station multi-vehicle coordination, as described herein. In addition to or in alternative to description herein below with specific reference to FIGS. 7B-7E, illustrated aspects of schematic diagrams 700B-700E may be relevant to example description with reference to FIGS. 8A-8F, 9A-9E, or 10A-10B. However, claimed subject matter is not limited to any particular described embodiments, implementations, examples, etc.

Figure 7B:
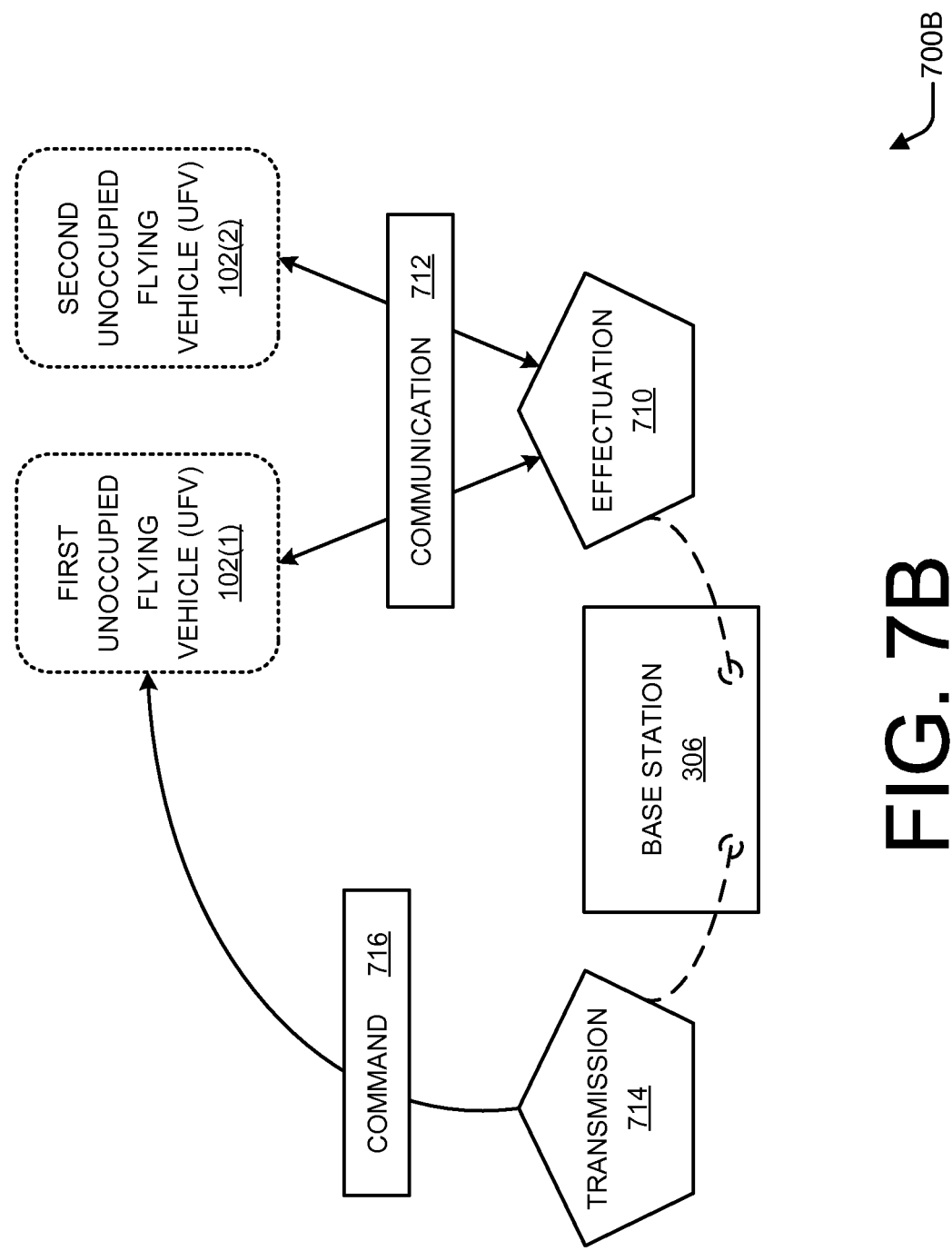
FIGS. 7B-7E are schematic diagrams that include at least one example machine and that depict example scenarios for implementing base station multi-vehicle coordination in accordance with certain example embodiments.

As shown in FIG. 7B, by way of example but not limitation, schematic diagram 700B may include at least one first UFV 102(1), at least one second UFV 102(2), at least one base station 306, at least one effectuation 710, at least one communication 712, at least one transmission 714, or at least one command 716. For certain example embodiments, at least one UFV communications effectuation module 702 (e.g., of FIG. 7A) of a base station 306 may cause an effectuation 710 of one or more communications 712 with at least a first UFV 102(1) and a second UFV 102(2). Additionally or alternatively, at least one UFV command transmission module 704 (e.g., of FIG. 7A) of a base station 306 may cause a transmission 714 of at least one command 716 to a first UFV 102(1) based at least partially on one or more communications 712 with at least first UFV 102(1) and a second UFV 102(2). However, claimed subject matter is not limited to any particular described embodiments, implementations, examples, etc. Additional or alternative description that may be relevant to schematic diagram 700B is provided herein below with particular reference to one or more of any of FIGS. 8A-8F, 9A-9E, or 10A-10B.

Figure 7C:
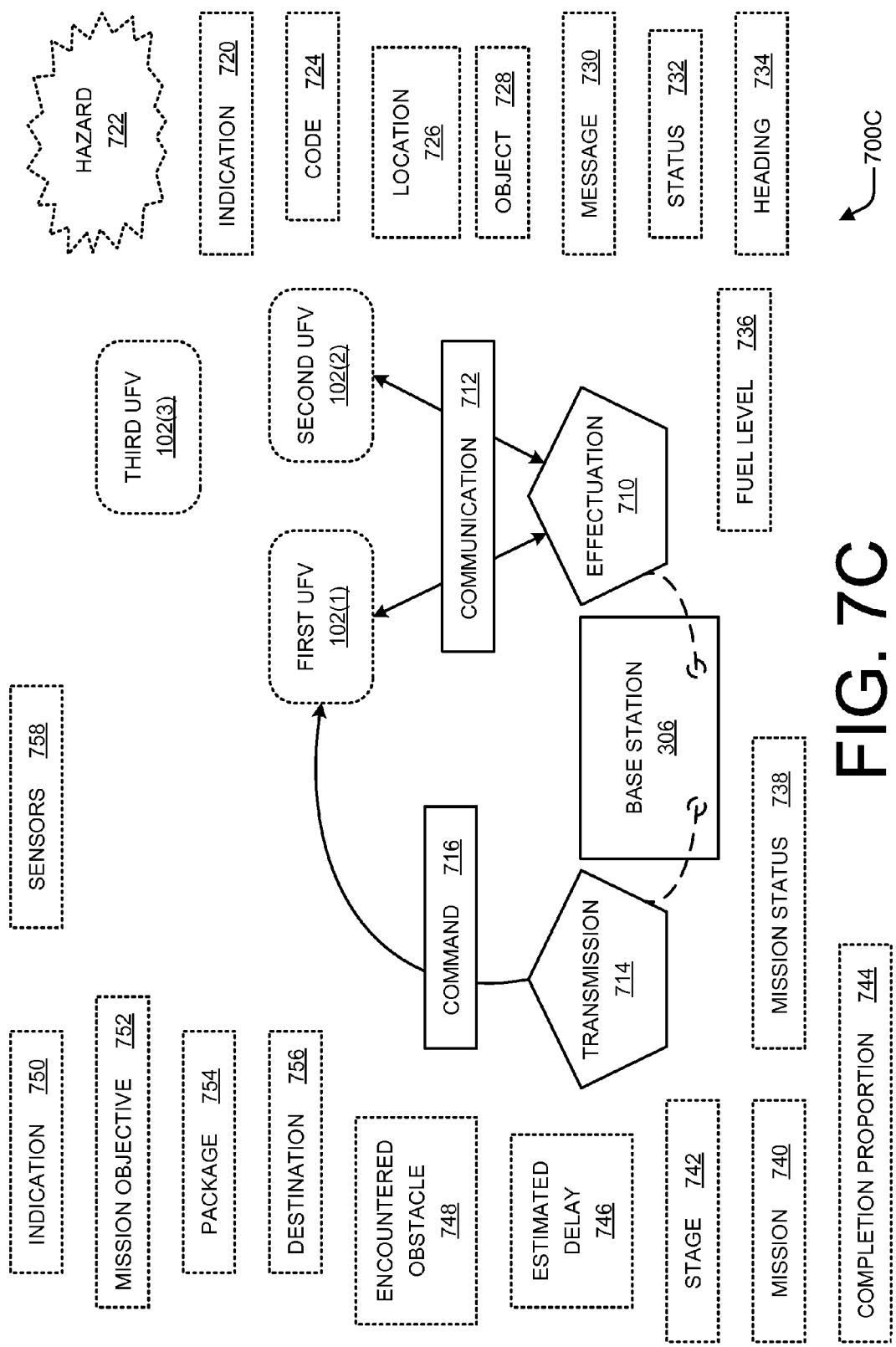

As shown in FIG. 7C, by way of example but not limitation, schematic diagram 700C may include at least one first UFV 102(1), at least one second UFV 102(2), at least one third UFV 102(1), at least one base station 306, at least one effectuation 710, at least one communication 712, at least one transmission 714, at least one command 716, at least one indication 720, at least one hazard 722, at least one code 724, at least one location 726, at least one object 728, at least one message 730, at least one status 732, at least one heading 734, at least one fuel level 736, at least one mission status 738, at least one mission 740, at least one stage 742, at least one completion proportion 744, at least one estimated delay 746, at least one encountered obstacle 748, at least one indication 750, at least one mission objective 752, at least one package 754, at least one destination 756, or at least one sensor 758. However, claimed subject matter is not limited to any particular described embodiments, implementations, examples, etc. Additional or alternative description that may be relevant to schematic diagram 700C is provided herein below with particular reference to one or more of any of FIGS. 8A-8F, 9A-9E, or 10A-10B.

Figure 7D:
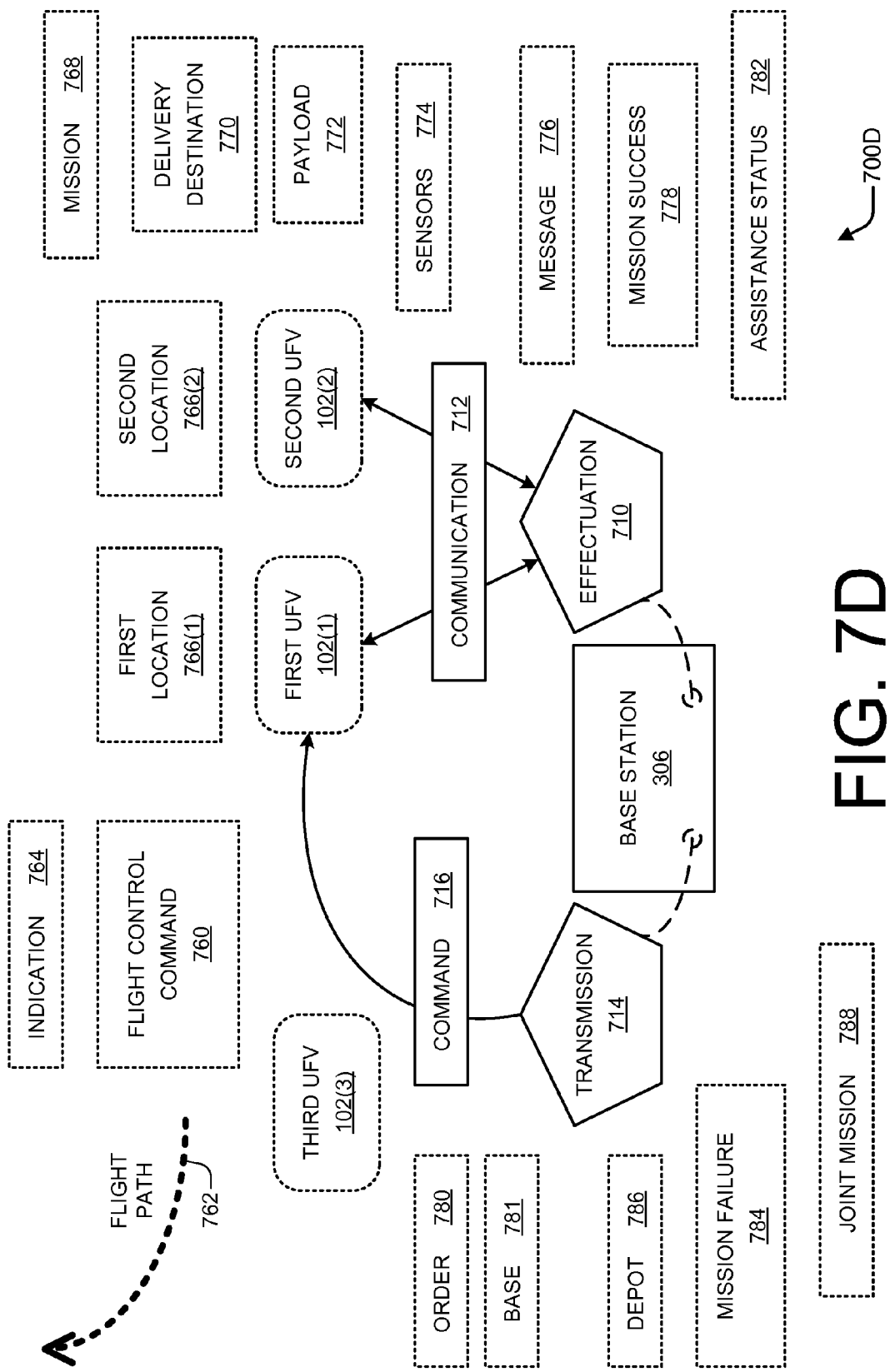

As shown in FIG. 7D, by way of example but not limitation, schematic diagram 700D may include at least one first UFV 102(1), at least one second UFV 102(2), at least one base station 306, at least one effectuation 710, at least one communication 712, at least one transmission 714, at least one command 716, at least one flight control command 760, at least one flight path 762, at least one indication 764, at least one first location 766(1), at least one second location 766(2), at least one mission 768, at least one delivery destination 770, at least one payload 772, at least one sensor 774, at least one message 776, at least one mission success 778, at least one order 780, at least one base 781, at least one assistance status 782, at least one mission failure 784, at least one depot 786, or at least one joint mission 788. However, claimed subject matter is not limited to any particular described embodiments, implementations, examples, etc. Additional or alternative description that may be relevant to schematic diagram 700D is provided herein below with particular reference to one or more of any of FIGS. 8A-8F, 9A-9E, or 10A-10B.

Figure 7E:
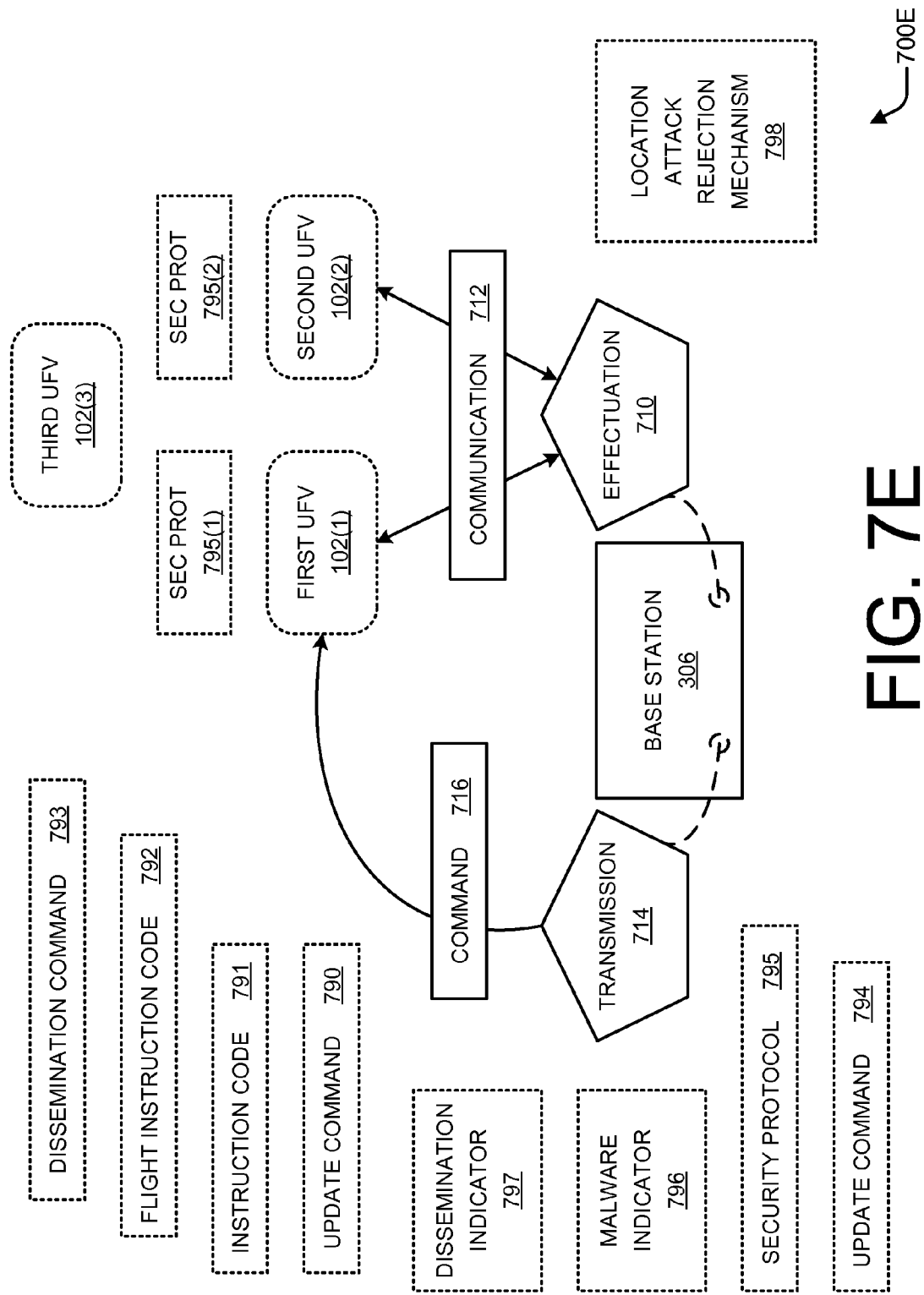

As shown in FIG. 7E, by way of example but not limitation, schematic diagram 700E may include at least one first UFV 102(1), at least one second UFV 102(2), at least one base station 306, at least one effectuation 710, at least one communication 712, at least one transmission 714, at least one command 716, at least one update command 790, at least some instruction code 791, at least one flight instruction code 792, at least one dissemination command 793, at least one update command 794, at least one security protocol 795, at least one malware indicator 796, at least one dissemination indicator 797, or at least one location attack rejection mechanism 798. However, claimed subject matter is not limited to any particular described embodiments, implementations, examples, etc. Additional or alternative description that may be relevant to schematic diagram 700E is provided herein below with particular reference to one or more of any of FIGS. 8A-8F, 9A-9E, or 10A-10B.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 8A is a flow diagram 800A illustrating an example method for at least one machine with regard to base station multi-vehicle coordination in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one machine, such as a base station 306 or at least a portion thereof. (Alternatively, although not explicitly illustrated, one or more operations of flow diagram 800A (or those of related flow diagrams) may be performed by at least one machine, such as a UFV 102 or at least a portion thereof. With such embodiment(s), a UFV communications effectuation module 702 and a UFV command transmission module 704 (e.g., of FIG. 7A) may be realized or implemented with one or more components of a UFV 102.)

For certain example embodiments, a method for hazard handling by coordinating at least one unoccupied flying vehicle (UFV) (e.g., that includes, involves, addresses, reacts to, or a combination thereof, etc. or other otherwise handles at least one UFV 102, at least one first UFV 102(1), at least one second UFV 102(2), at least one remote UFV 102R, at least one first remote UFV 102R(1), at least one second remote UFV 102R(2), at least one POFV 302, at least one other object that may present a collision risk, at least one weather-related condition, at least one obstacle to a mission objective, at least one hindrance to accomplishing a task, at least one delay to achieving a goal, or a combination thereof, etc. by coordinating at least one UFV with regard to, with reference to, in consideration of, or a combination thereof, etc. one or more other UFVs), which method may be at least partially implemented using hardware (e.g., circuitry, at least one processor, processor-accessible memory, at least one module, or a combination thereof, etc.) of a machine such as a base station, may include an operation 802 or an operation 804. An operation 802 may be directed at least partially to effectuating one or more communications with at least a first UFV and a second UFV. For certain example implementations, at least one machine may effectuate (e.g., bring about, cause to occur, initiate, precipitate, accomplish, generate, put forth effort to make happen, take action that results in, or a combination thereof, etc., such as via at least one effectuation 710) one or more communications 712 (e.g., a reception, a transmission, an exchange of data, providing information, accepting information, signaling between two machines or among more than two machines, propagation of electromagnetic encoding, a delivery of data, a linkage ferrying data, or a combination thereof, etc.) with at least a first UFV 102(1) and a second UFV 102(2) (e.g., a UAV, an RPV, a UCAV, a UA, an RPA, an ROA, an R/C aircraft, an AFD, a UAVS, a UAS, an sUAS, or a combination thereof, etc.). By way of example but not limitation, at least one base station may effectuate one or more communications with at least a first UFV and a second UFV (e.g., a base station may receive a message from a second unmanned aerial vehicle (UAV) and transmit a signal to a first UAV). However, claimed subject matter is not limited to any particular described embodiments, implementations, examples, etc.

For certain example embodiments, an operation 804 may be directed at least partially to transmitting to the first UFV at least one command based at least partially on the one or more communications with at least the first UFV and the second UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc., such as via at least one transmission 714) to a first UFV 102(1) at least one command 716 (e.g., an instruction, an order with authority, an imperative, a signal indicating to take an action, a request, a directive with specificity, a demand to act, a direction to perform a procedure, a requirement, or a combination thereof, etc.) based at least partially on one or more communications 712 with at least first UFV 102(1) and a second UFV 102(2). By way of example but not limitation, at least one base station may transmit to the first UFV at least one command based at least partially on the one or more communications with at least the first UFV and the second UFV (e.g., a base station may signal a first UAV to adjust a flight path or to activate an automated hazard handling routine based at least partly on information received from a second UAV that indicates an upcoming hazard for an unadjusted flight path of the first UAV). However, claimed subject matter is not limited to any particular described embodiments, implementations, examples, etc.

Figure 8D:
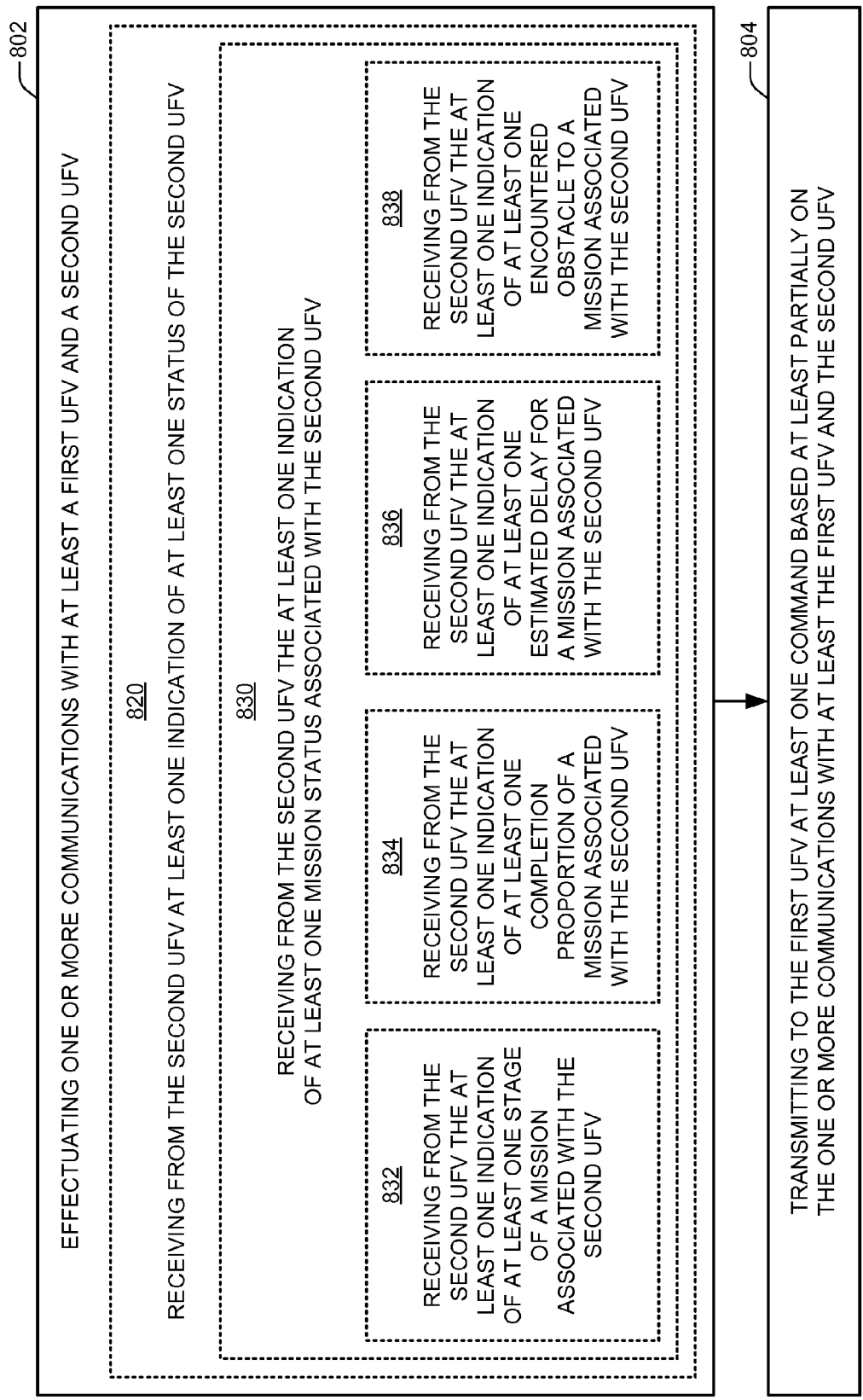

FIGS. 8B-8F depict example additions or alternatives for a flow diagram of FIG. 8A in accordance with certain example embodiments. As illustrated, flow diagrams of FIGS. 8B-8F may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8F may be performed so as to be fully or partially overlapping with other operation(s). For certain example embodiments, one or more operations of flow diagrams 800B-800F (of FIGS. 8B-8F) may be performed by at least one machine (e.g., a base station 306 or at least a portion thereof).

FIG. 8B illustrates a flow diagram 800B having example operations 810, 812, 814, or 816. For certain example embodiments, an operation 810 may be directed at least partially to wherein the effectuating one or more communications with at least a first UFV and a second UFV (of operation 802) includes receiving from the second UFV at least one indication of at least one hazard discovered by the second UFV. For certain example implementations, at least one machine may receive (e.g., accept, decode, demodulate, down-convert, detect, obtain from or via a communication or transmission from another, route from an antenna or antenna element, take into possession wirelessly, or a combination thereof, etc.) from a second UFV 102(2) at least one indication 720 (e.g., a sign, evidence, a showing, a description, a received communication, an informative data structure, a code, or a combination thereof, etc.) of at least one hazard 722 (e.g., a collision risk, at least one weather-related condition, a situation having an appreciable probability of craft damage, at least one obstacle to a mission objective, at least one hindrance to accomplishing a task, at least one delay to achieving a goal, a condition leading to harm of persons or property, or a combination thereof, etc.) discovered (e.g., detected, encountered, made aware of, found, characterized, uncovered, came across, identified, or a combination thereof, etc.) by second UFV 102(2). By way of example but not limitation, at least one base station may receive from the second UFV at least one indication of at least one hazard discovered by the second UFV (e.g., a base station may receive from a second UAV a description of a situation that may jeopardize achievement of a mission objective of a UAV). However, claimed subject matter is not limited to any particular described embodiments, implementations, examples, etc.

For certain example embodiments, an operation 812 may be directed at least partially to wherein the receiving from the second UFV at least one indication of at least one hazard discovered by the second UFV (of operation 810) includes receiving from the second UFV at least one code representative of the at least one hazard discovered by the second UFV. For certain example implementations, at least one machine may receive from a second UFV 102(2) at least one code 724 (e.g., an indicator, an instance of a communication scheme, a value, an alphanumeric identification, an abbreviated symbol, or a combination thereof, etc.) representative of (e.g., standing in place of, indicative of, characteristic of, pertaining to, evoking, identifying, or a combination thereof, etc.) at least one hazard 722 discovered by second UFV 102(2). By way of example but not limitation, at least one base station may receive from the second UFV at least one code representative of the at least one hazard discovered by the second UFV (e.g., a base station may receive from a second UAV an alphanumeric code or an embedded or overlaid signal that represents detection of signal or navigational interference that has been encountered by the second UAV or another UAV in communication with the second UAV). However, claimed subject matter is not limited to any particular described embodiments, implementations, examples, etc.

For certain example embodiments, an operation 814 may be directed at least partially to wherein the receiving from the second UFV at least one indication of at least one hazard discovered by the second UFV (of operation 810) includes receiving from the second UFV a location of at least one object that is detected by the second UFV. For certain example implementations, at least one machine may receive from a second UFV 102(2) a location 726 (e.g., a geographical position, an elevation, satellite positioning system (SPS) coordinates, latitude or longitude coordinates, distance or direction from a waypoint, distance or direction from a location of a UFV, an azimuth angle, or a combination thereof, etc.) of at least one object 728 (e.g., another UFV 102, a POFV 302, a building, a bridge, a billboard, a destination, a weather phenomenon, a crane, a payload, a target, or a combination thereof, etc.) that is detected (e.g., existence of is determined via one or more sensors, existence of is determined via one or more analyses of data, or a combination thereof, etc.) by second UFV 102(2). By way of example but not limitation, at least one base station may receive from the second UFV a location of at least one object that is detected by the second UFV (e.g., a base station may receive from a second UAV a geographical location, such as (i) one or more GPS coordinates or (ii) a direction and a distance, of a building or another UAV that is detected by the second UAV via at least one of an optical or a radar mechanism). However, claimed subject matter is not limited to any particular described embodiments, implementations, examples, etc.

For certain example embodiments, an operation 816 may be directed at least partially to wherein the receiving from the second UFV at least one indication of at least one hazard discovered by the second UFV (of operation 810) includes receiving from the second UFV at least one message including at least one atmospheric harbinger indicative of one or more weather elements that are detected by the second UFV. For certain example implementations, at least one machine may receive from a second UFV 102(2) at least one message 730 (e.g., a packet, an encapsulated piece of information, one or more transmissions/receptions, a signal, a dispatch, a communique, or a combination thereof, etc.) including at least one atmospheric harbinger (e.g., a sensor reading, barometric pressure, wind speed, temperature, precipitation, lightning, thunder, ambient light, visibility, wind direction, electricity—such as electric field or charge—in the air, or a combination thereof, etc.) indicative of (e.g., representative of, descriptive of, identifying, or a combination thereof, etc.) one or more weather elements (e.g., rain, snow, cloud cover, fog, temperature, wind conditions, thunderstorm, lightning strikes, or a combination thereof, etc.) that are detected (e.g., existence of is determined via one or more sensors, existence of is determined via one or more analyses of data, or a combination thereof, etc.) by second UFV 102(2). By way of example but not limitation, at least one base station may receive from the second UFV at least one message including at least one atmospheric harbinger indicative of one or more weather elements that are detected by the second UFV (e.g., a base station may receive from a second UAV a packet having a field that indicates a weather phenomenon, such as rainfall or wind speed, that the second UAV becomes aware of, along with an associated geographical location or altitude at which the weather phenomenon is believed to be extant). However, claimed subject matter is not limited to any particular described embodiments, implementations, examples, etc.

FIG. 8C illustrates a flow diagram 800C having example operations 820, 822, 824, or 826. For certain example embodiments, an operation 820 may be directed at least partially to wherein the effectuating one or more communications with at least a first UFV and a second UFV (of operation 802) includes receiving from the second UFV at least one indication of at least one status of the second UFV. For certain example implementations, at least one machine may receive (e.g., accept, decode, demodulate, down-convert, detect, obtain from or via a communication or transmission from another, route from an antenna or antenna element, take into possession wirelessly, or a combination thereof, etc.) from a second UFV 102(2) at least one indication 720 (e.g., a sign, evidence, a showing, a description, a received communication, an informative data structure, a code, or a combination thereof, etc.) of at least one status 732 (e.g., state, condition, position relative to an expected condition, standing, circumstance, damage/health level, mission-related situation, or a combination thereof, etc.) of second UFV 102(2). By way of example but not limitation, at least one base station may receive from the second UFV at least one indication of at least one status of the second UFV (e.g., a base station may receive a wireless transmission from a second UAV that indicates at least one flight-related status or at least one mission-related status with respect to the second UAV). However, claimed subject matter is not limited to any particular described embodiments, implementations, examples, etc.

For certain example embodiments, an operation 822 may be directed at least partially to wherein the receiving from the second UFV at least one indication of at least one status of the second UFV (of operation 820) includes receiving from the second UFV the at least one indication of at least one location of the second UFV. For certain example implementations, at least one machine may receive from second UFV 102(2) at least one indication 720 of at least one location 726 (e.g., a geographical position, an elevation, satellite positioning system (SPS) coordinates, latitude or longitude coordinates, distance or direction from a waypoint, distance or direction from a location of a UFV, an azimuth angle, or a combination thereof, etc.) of second UFV 102(2). By way of example but not limitation, at least one base station may receive from the second UFV the at least one indication of at least one location of the second UFV (e.g., a base station may receive from a second UAV (i) a geographical location, such as one or more GPS coordinates or a distance from a waypoint, or (ii) an altitudinal location that reflects a current or intended location of the second UAV). However, claimed subject matter is not limited to any particular described embodiments, implementations, examples, etc.

For certain example embodiments, an operation 824 may be directed at least partially to wherein the receiving from the second UFV at least one indication of at least one status of the second UFV (of operation 820) includes receiving from the second UFV the at least one indication of at least one heading of the second UFV. For certain example implementations, at least one machine may receive from a second UFV 102(2) at least one indication 720 of at least one heading 734 (e.g., a direction, a course of movement, two or more points forming a vector representing velocity, a directional aspect of velocity, two or more values representing magnitude components of a velocity vector, a cardinal direction value, a measure in degrees or radians, an angular value relative to some reference, an indication of inclination or declination, or a combination thereof, etc.) of second UFV 102(2). By way of example but not limitation, at least one base station may receive from the second UFV the at least one indication of at least one heading of the second UFV (e.g., a base station may receive from a second UAV a direction of flight, which may be expressed by a cardinal direction or two points defining at least a directional component of a velocity vector, for the second UAV at a current time or for a designated future time). However, claimed subject matter is not limited to any particular described embodiments, implementations, examples, etc.

For certain example embodiments, an operation 826 may be directed at least partially to wherein the receiving from the second UFV at least one indication of at least one status of the second UFV (of operation 820) includes receiving from the second UFV the at least one indication of a fuel level associated with the second UFV. For certain example implementations, at least one machine may receive from a second UFV 102(2) at least one indication 720 of a fuel level 736 (e.g., an amount of charge remaining in or used from a battery, an amount of liquid/gas/solid remaining in or taken from a reservoir, a percentage remaining of energy or material used for power based on (i) a maximum level or (ii) a level existing at takeoff or at a most-recent fuel replenishment, an expected length of flight time remaining—e.g., based on current usage or a historical average of fuel usage, a predicted number of miles that may be flown prior to needing to refuel or head toward a base or safe landing spot, or a combination thereof, etc.) associated with (e.g., corresponding to, derived from, pertaining to, related to, or a combination thereof, etc.) second UFV 102(2). By way of example but not limitation, at least one base station may receive from the second UFV the at least one indication of a fuel level associated with the second UFV (e.g., a base station may receive from a second UAV (i) a percentage remaining of a battery charge of the second UAV or (ii) an estimated remaining flight time, which estimated remaining flight time may be calculated based at least partly on a current fuel amount of the second UAV, which current fuel amount may reflect a remaining charge amount or a remaining liquid fuel amount). However, claimed subject matter is not limited to any particular described embodiments, implementations, examples, etc.

FIG. 8D illustrates a flow diagram 800D having example operations 830, 832, 834, 836, or 838. For certain example embodiments, an operation 830 may be directed at least partially to wherein the receiving from the second UFV at least one indication of at least one status of the second UFV (of operation 820) includes receiving from the second UFV the at least one indication of at least one mission status associated with the second UFV. For certain example implementations, at least one machine may receive from a second UFV 102(2) at least one indication 720 of at least one mission status 738 (e.g., a status 732 of a mission 740 (e.g., an assigned task, procedure, goal, job, delivery, sensor reading acquisition, signal ferrying, or a combination thereof, etc.) associated with (e.g., corresponding to, derived from, pertaining to, related to, or a combination thereof, etc.) second UFV 102(2). By way of example but not limitation, at least one base station may receive from the second UFV the at least one indication of at least one mission status associated with the second UFV (e.g., a base station may receive from a second UAV (i) a description of or (ii) a completion level of a state or condition of a task that is assigned to the second UAV). However, claimed subject matter is not limited to any particular described embodiments, implementations, examples, etc.

For certain example embodiments, an operation 832 may be directed at least partially to wherein the receiving from the second UFV the at least one indication of at least one mission status associated with the second UFV (of operation 830) includes receiving from the second UFV the at least one indication of at least one stage of a mission associated with the second UFV. For certain example implementations, at least one machine may receive from a second UFV 102(2) at least one indication 720 of at least one stage 742 (e.g., portion, defined segment, labeled part, identifiable aspect, or a combination thereof, etc.) of a mission 740 associated with second UFV 102(2). By way of example but not limitation, at least one base station may receive from the second UFV the at least one indication of at least one stage of a mission associated with the second UFV (e.g., a base station may receive from a second UAV a name or a number corresponding to a stage of a mission assigned to the second UAV, such as "Delivery Successful," "Stage Two," "Intrusion Initiated," "Along Designated Aisle," "Payment Received," or "Approaching Targeted Address", with an indicated stage corresponding to a completed portion or an in-progress portion or a next portion of a mission, for instance). However, claimed subject matter is not limited to any particular described embodiments, implementations, examples, etc.

For certain example embodiments, an operation 834 may be directed at least partially to wherein the receiving from the second UFV the at least one indication of at least one mission status associated with the second UFV (of operation 830) includes receiving from the second UFV the at least one indication of at least one completion proportion of a mission associated with the second UFV. For certain example implementations, at least one machine may receive from a second UFV 102(2) at least one indication 720 of at least one completion proportion 744 (e.g., a percentage, a fraction, a numerical or word term indicating a relative level or amount that has been accomplished or that is left to be accomplished compared to an entire mission or defined part thereof, or a combination thereof, etc.) of a mission 740 associated with second UFV 102(2). By way of example but not limitation, at least one base station may receive from the second UFV the at least one indication of at least one completion proportion of a mission associated with the second UFV (e.g., a base station may receive from a second UAV an indication of how much of a mission, such as 35% or ¾ or substantially, has been completed by the second UAV). However, claimed subject matter is not limited to any particular described embodiments, implementations, examples, etc.

For certain example embodiments, an operation 836 may be directed at least partially to wherein the receiving from the second UFV the at least one indication of at least one mission status associated with the second UFV (of operation 830) includes receiving from the second UFV the at least one indication of at least one estimated delay for a mission associated with the second UFV. For certain example implementations, at least one machine may receive from a second UFV 102(2) at least one indication 720 of at least one estimated delay 746 (e.g., a duration that reflects a predicted amount of extra time to complete, a clock time that is later than previously planned and reflects when completion is predicted, a temporal range, hours-minutes-seconds, a temporal period with a probabilistic window, or a combination thereof, etc.) for a mission 740 associated with second UFV 102(2). By way of example but not limitation, at least one base station may receive from the second UFV the at least one indication of at least one estimated delay for a mission associated with the second UFV (e.g., a base station may receive from a second UAV a time (i) that implicates a delay in completing at least one mission or stage thereof that is assigned to the second UAV or (ii) that represents an amount of time completion is being delayed or a time of completion that is after a previously-established time of completion). However, claimed subject matter is not limited to any particular described embodiments, implementations, examples, etc.

For certain example embodiments, an operation 838 may be directed at least partially to wherein the receiving from the second UFV the at least one indication of at least one mission status associated with the second UFV (of operation 830) includes receiving from the second UFV the at least one indication of at least one encountered obstacle to a mission associated with the second UFV. For certain example implementations, at least one machine may receive from a second UFV 102(2) at least one indication 720 of at least one encountered obstacle 748 (e.g., impediment, obstruction, hindrance, state causing delay, condition risking failure, discovered situation impacting likelihood of success, or a combination thereof, etc.) to a mission 740 associated with second UFV 102(2). By way of example but not limitation, at least one base station may receive from the second UFV the at least one indication of at least one encountered obstacle to a mission associated with the second UFV (e.g., a base station may receive from a second UAV a description or an identification of an object or an event or a condition—such as a building, a headwind, a fleet of UAVs, a slow customer, an inaccurately-designated destination, a flight zone entry request clearance delay or denial, a heavier-than expected load, a received do-not-use sensor signal or message, or sensor obscurement—that has been discovered or experienced by the second UAV for which time or fuel will be consumed to overcome, avoid, endure, or eliminate it to complete a task that is assigned to the second UAV). However, claimed subject matter is not limited to any particular described embodiments, implementations, examples, etc.

Figure 8E:
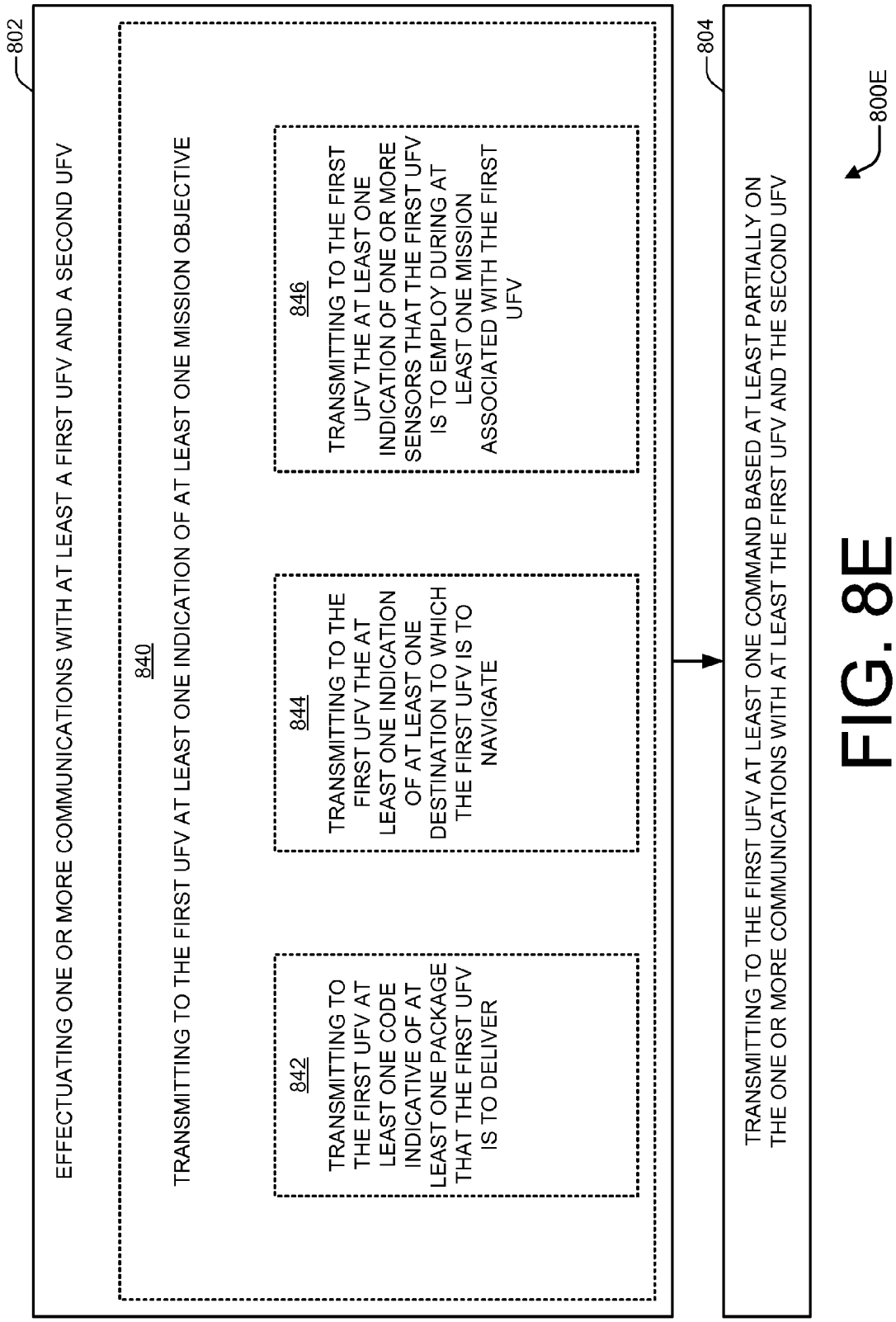

FIG. 8E illustrates a flow diagram 800E having example operations 840, 842, 844, or 846. For certain example embodiments, an operation 840 may be directed at least partially to wherein the effectuating one or more communications with at least a first UFV and a second UFV (of operation 802) includes transmitting to the first UFV at least one indication of at least one mission objective. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a first UFV 102(1) at least one indication 750 (e.g., a sign, evidence, a showing, a description, a transmitted communication, an informative data structure, a code, a command, an instruction, a policy, or a combination thereof, etc.) of at least one mission objective 752 (e.g., an assigned goal, a tasked accomplishment, a target to scan with one or more sensors, a payload to acquire or deliver, a deadline to meet, a destination to reach, an enumerated set of steps to follow, a procedure to complete, or a combination thereof, etc.). By way of example but not limitation, at least one base station may transmit to the first UFV at least one indication of at least one mission objective (e.g., a base station may send to a first UAV at least one packet that includes one or more codes representing one or more commands for the first UAV to follow in order to complete an assigned task). However, claimed subject matter is not limited to any particular described embodiments, implementations, examples, etc.

For certain example embodiments, an operation 842 may be directed at least partially to wherein the transmitting to the first UFV at least one indication of at least one mission objective (of operation 840) includes transmitting to the first UFV at least one code indicative of at least one package that the first UFV is to deliver. For certain example implementations, at least one machine may transmit to a first UFV 102(1) at least one code 724 (e.g., a value, an alphanumeric identification, an indicator, an instance of a communication scheme, an abbreviated symbol, or a combination thereof, etc.) indicative of (e.g., representative of, descriptive of, identifying, or a combination thereof, etc.) at least one package 754 (e.g., item, box, sack, product, pallet, bag, gift, pot, bundle, wrapped parcel, container, case, good, or a combination thereof, etc.) that first UFV 102(1) is to deliver. By way of example but not limitation, at least one base station may transmit to the first UFV at least one code indicative of at least one package that the first UFV is to deliver (e.g., a base station may send to a first UAV a product name or a product SKU that the first UAV is responsible for delivering after acquiring the product). However, claimed subject matter is not limited to any particular described embodiments, implementations, examples, etc.

For certain example embodiments, an operation 844 may be directed at least partially to wherein the transmitting to the first UFV at least one indication of at least one mission objective (of operation 840) includes transmitting to the first UFV the at least one indication of at least one destination to which the first UFV is to navigate. For certain example implementations, at least one machine may transmit to a first UFV 102(1) at least one indication 750 of at least one destination 756 (e.g., geographical location, object, target, position in the air, place, goal, or a combination thereof, etc.) to which first UFV 102(1) is to navigate (e.g., travel, voyage, fly, journey, maneuver, steer, move along route, or a combination thereof, etc.). By way of example but not limitation, at least one base station may transmit to the first UFV the at least one indication of at least one destination to which the first UFV is to navigate (e.g., a base station may transmit a wireless signal to a first UAV that incorporates a location—such as one or more GPS coordinates, one or more cardinal direction coordinates in degrees etc., at least one altitude, at least one address, or so forth—to the first UAV so that the first UAV may fly to the location). However, claimed subject matter is not limited to any particular described embodiments, implementations, examples, etc.

For certain example embodiments, an operation 846 may be directed at least partially to wherein the transmitting to the first UFV at least one indication of at least one mission objective (of operation 840) includes transmitting to the first UFV the at least one indication of one or more sensors that the first UFV is to employ during at least one mission associated with the first UFV. For certain example implementations, at least one machine may transmit to a first UFV 102(1) at least one indication 750 of one or more sensors 758 (e.g., a device sensitive to stimulus, a device that transforms stimuli into electrical signals, a light sensor, a sound sensor, a radiation sensor, an electromagnetic sensor, a radio frequency signal sensor, a camera, a microphone, a speed detector, an object detector, or a combination thereof, etc.) that first UFV 102(1) is to employ (e.g., utilize, activate, deploy, expose to readings, recording readings from, engage, put into use, apply, or a combination thereof, etc.) during at least one mission 740 (e.g., an assigned task, procedure, goal, job, delivery, sensor reading acquisition, signal ferrying, or a combination thereof, etc.) associated with (e.g., corresponding to, derived from, pertaining to, related to, or a combination thereof, etc.) first UFV 102(1).

By way of example but not limitation, at least one base station may transmit to the first UFV the at least one indication of one or more sensors that the first UFV is to employ during at least one mission associated with the first UFV (e.g., a base station may send to a first UAV at least one wireless transmission signaling one or more identifications of one or more sensors—such as an optical camera, an infrared imager, a microphone, a laser range finder, or a radio receiver—that the first UAV is to activate and use to collect sensor data—such as visual spectrum pictures, heat images, sounds, distances, or Wi-Fi network data). However, claimed subject matter is not limited to any particular described embodiments, implementations, examples, etc.

Figure 8F:
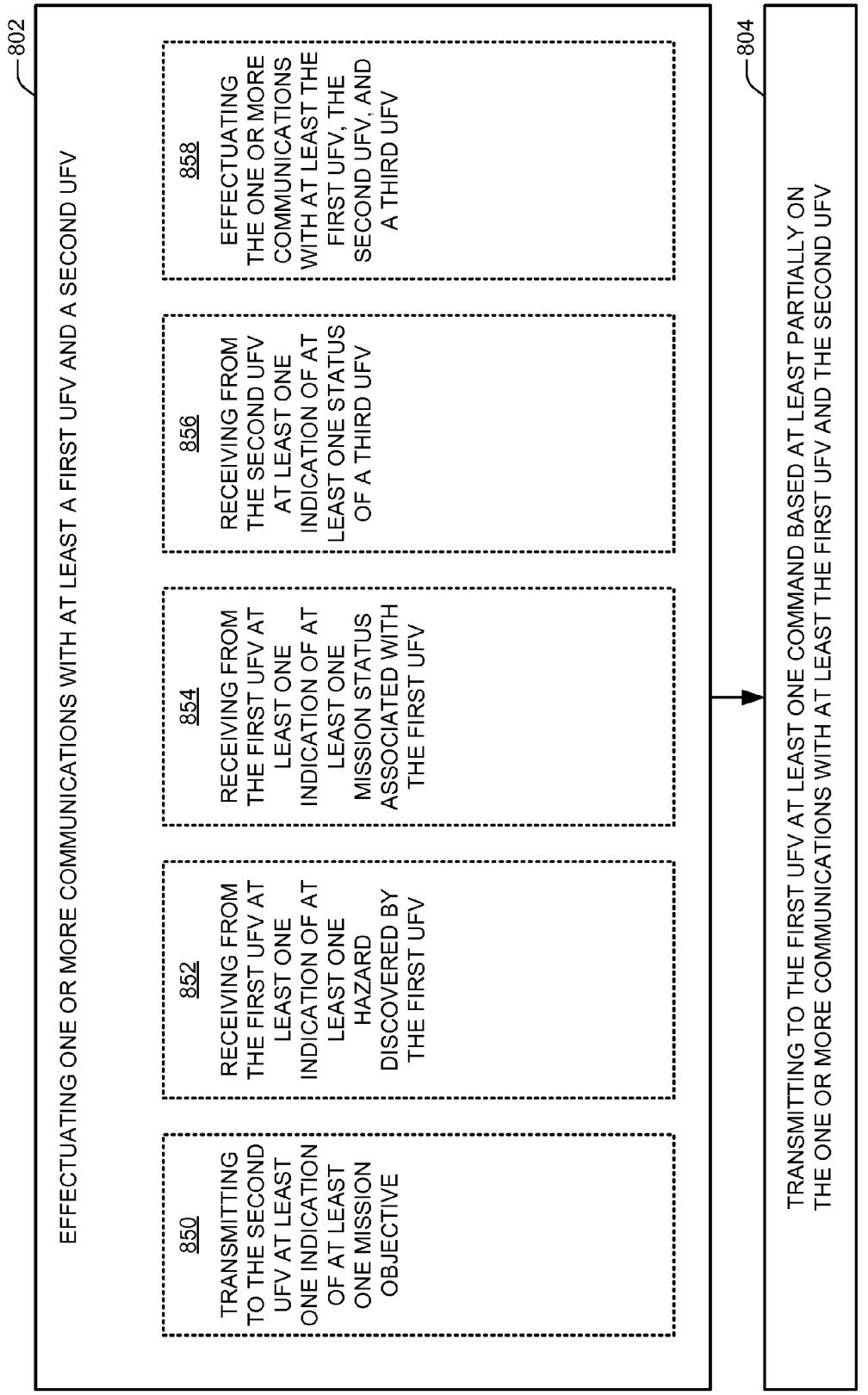

FIG. 8F illustrates a flow diagram 800F having example operations 850, 852, 854, 856, or 858. For certain example embodiments, an operation 850 may be directed at least partially to wherein the effectuating one or more communications with at least a first UFV and a second UFV (of operation 802) includes transmitting to the second UFV at least one indication of at least one mission objective. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a second UFV 102(2) at least one indication 750 (e.g., a sign, evidence, a showing, a description, a transmitted communication, an informative data structure, a code, a command, an instruction, a policy, or a combination thereof, etc.) of at least one mission objective 752 (e.g., an assigned goal, a tasked accomplishment, a target to scan with one or more sensors, a payload to acquire or deliver, a deadline to meet, a destination to reach, an enumerated set of steps to follow, a procedure to complete, or a combination thereof, etc.). By way of example but not limitation, at least one base station may transmit to the second UFV at least one indication of at least one mission objective (e.g., a base station may wirelessly transmit to a second UAV at least one message that includes a populated field indicative of at least one procedure that the second UAV is to perform or at least one goal that the second UAV is to achieve). However, claimed subject matter is not limited to any particular described embodiments, implementations, examples, etc.

For certain example embodiments, an operation 852 may be directed at least partially to wherein the effectuating one or more communications with at least a first UFV and a second UFV (of operation 802) includes receiving from the first UFV at least one indication of at least one hazard discovered by the first UFV. For certain example implementations, at least one machine may receive (e.g., accept, decode, demodulate, down-convert, detect, obtain from or via a communication or transmission from another, route from an antenna or antenna element, take into possession wirelessly, or a combination thereof, etc.) from a first UFV 102(1) at least one indication 720 (e.g., a sign, evidence, a showing, a description, a received communication, an informative data structure, a code, or a combination thereof, etc.) of at least one hazard 722 (e.g., a collision risk, at least one weather-related condition, a situation having an appreciable probability of craft damage, at least one obstacle to a mission objective, at least one hindrance to accomplishing a task, at least one delay to achieving a goal, a condition leading to harm of persons or property, or a combination thereof, etc.) discovered (e.g., detected, encountered, made aware of, found, characterized, uncovered, came across, identified, or a combination thereof, etc.) by first UFV 102(1). By way of example but not limitation, at least one base station may receive from the first UFV at least one indication of at least one hazard discovered by the first UFV (e.g., a base station may receive from a first UAV a tag corresponding to an incident that is experienced or detected by the first UAV and that may impact a probability of successfully completing a mission objective for a UAV at all or in a timely fashion). However, claimed subject matter is not limited to any particular described embodiments, implementations, examples, etc.

For certain example embodiments, an operation 854 may be directed at least partially to wherein the effectuating one or more communications with at least a first UFV and a second UFV (of operation 802) includes receiving from the first UFV at least one indication of at least one mission status associated with the first UFV. For certain example implementations, at least one machine may receive (e.g., accept, decode, demodulate, down-convert, detect, obtain from or via a communication or transmission from another, route from an antenna or antenna element, take into possession wirelessly, or a combination thereof, etc.) from a first UFV 102(1) at least one indication 720 (e.g., a sign, evidence, a showing, a description, a received communication, an informative data structure, a code, or a combination thereof, etc.) of at least one mission status 738 (e.g., a status 732 of a mission 740 (e.g., an assigned task, procedure, goal, job, delivery, sensor reading acquisition, signal ferrying, or a combination thereof, etc.) associated with (e.g., corresponding to, derived from, pertaining to, related to, or a combination thereof, etc.) first UFV 102(1). By way of example but not limitation, at least one base station may receive from the first UFV at least one indication of at least one mission status associated with the first UFV (e.g., a base station may receive from a first UAV (i) a label representing or (ii) a progress level of (a) an outlook for or (b) a circumstance relating to a job that has been assigned to the first UAV). However, claimed subject matter is not limited to any particular described embodiments, implementations, examples, etc.

For certain example embodiments, an operation 856 may be directed at least partially to wherein the effectuating one or more communications with at least a first UFV and a second UFV (of operation 802) includes receiving from the second UFV at least one indication of at least one status of a third UFV. For certain example implementations, at least one machine may receive (e.g., accept, decode, demodulate, down-convert, detect, obtain from or via a communication or transmission from another, route from an antenna or antenna element, take into possession wirelessly, or a combination thereof, etc.) from a second UFV 102(2) at least one indication 720 (e.g., a sign, evidence, a showing, a description, a received communication, an informative data structure, a code, or a combination thereof, etc.) of at least one status 732 (e.g., state, condition, position relative to an expected condition, standing, circumstance, damage/health level, mission-related situation, or a combination thereof, etc.) of a third UFV 102(3). By way of example but not limitation, at least one base station may receive from the second UFV at least one indication of at least one status of a third UFV (e.g., a base station may receive from a second UAV a spread spectrum wireless signal that indicates at least one flight-related status or at least one mission-related status with respect to a third UAV). However, claimed subject matter is not limited to any particular described embodiments, implementations, examples, etc.

For certain example embodiments, an operation 858 may be directed at least partially to wherein the effectuating one or more communications with at least a first UFV and a second UFV (of operation 802) includes effectuating the one or more communications with at least the first UFV, the second UFV, and a third UFV. For certain example implementations, at least one machine may effectuate one or more communications 712 with at least a first UFV 102(1), a second UFV 102(2), and a third UFV 102(3). By way of example but not limitation, at least one base station may effectuate the one or more communications with at least the first UFV, the second UFV, and a third UFV (e.g., a base station may transmit one or more communications or signals to or receive at least one communication or signal from a first UAV, a second UAV, and a third UAV in order to formulate a command for transmission to the first UAV or to coordinate behaviors or tasks of three or more UAVs). However, claimed subject matter is not limited to any particular described embodiments, implementations, examples, etc.

FIGS. 9A-9E depict example additions or alternatives for a flow diagram of FIG. 8A in accordance with certain example embodiments. As illustrated, flow diagrams of FIGS. 9A-9E may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9E may be performed so as to be fully or partially overlapping with other operation(s). For certain example embodiments, one or more operations of flow diagrams 900A-900E (of FIGS. 9A-9E) may be performed by at least one machine (e.g., a base station 306 or at least a portion thereof).

FIG. 9A illustrates a flow diagram 900A having example operations 910, 912, 914, or 916. For certain example embodiments, an operation 910 may be directed at least partially to wherein the transmitting to the first UFV at least one command based at least partially on the one or more communications with at least the first UFV and the second UFV (of operation 804) includes transmitting to the first UFV at least one flight control command. For certain example implementations, at least one machine may transmit to a first UFV 102(1) at least one flight control command 760 (e.g., an instruction to adjust a flight path; an order to change a flight state, such as changing a velocity, an acceleration, or an altitude; an alteration to a route or course to reach a destination; a destination substitution; or a combination thereof; etc.). By way of example but not limitation, at least one base station may transmit to the first UFV at least one flight control command (e.g., a base station may transmit to a first UAV a command that guides the first UAV with respect to flight, such as a change in destination, a change in a course to reach a destination, or a change in algorithmic self-piloting, etc.). However, claimed subject matter is not limited to any particular described embodiments, implementations, examples, etc.

For certain example embodiments, an operation 912 may be directed at least partially to wherein the transmitting to the first UFV at least one flight control command (of operation 910) includes transmitting to the first UFV the at least one flight control command to instruct the first UFV to adjust at least one flight path. For certain example implementations, at least one machine may transmit to a first UFV 102(1) at least one flight control command 760 to instruct first UFV 102(1) to adjust (e.g., change, replace at least a portion of, cause a deviation in, adapt, modify, alter, deviate from, add something to, take something away from, decrease, increase, augment, or a combination thereof, etc.) at least one flight path 762 (e.g., a heading, a flight trajectory, a position, an altitude, a speed, a direction, a velocity, an acceleration, a stability level, a destination, a course through air or space or a time at which the course is to be traversed or particular positions thereof are to be occupied, or a combination thereof, etc.). By way of example but not limitation, at least one base station may transmit to the first UFV the at least one flight control command to instruct the first UFV to adjust at least one flight path (e.g., a base station may wirelessly transmit to a first UAV a command that causes the first UAV to change a speed, a direction, an altitude, or a targeted time to reach a given destination, etc.). However, claimed subject matter is not limited to any particular described embodiments, implementations, examples, etc.

For certain example embodiments, an operation 914 may be directed at least partially to wherein the transmitting to the first UFV at least one flight control command (of operation 910) includes transmitting to the first UFV the at least one flight control command responsive at least partially to at least one indication of at least one flight path of the second UFV. For certain example implementations, at least one machine may transmit to a first UFV 102(1) at least one flight control command 760 responsive at least partially to at least one indication 764 (e.g., a sign, evidence, a showing, a description, a received communication, an informative data structure, a code, a heading, a path, a course, or a combination thereof, etc.) of at least one flight path 762 of a second UFV 102(2). By way of example but not limitation, at least one base station may transmit to the first UFV the at least one flight control command responsive at least partially to at least one indication of at least one flight path of the second UFV (e.g., a base station may transmit to a first UAV a command to decelerate to avoid a potential overlap with a current flight path of a second UAV, which current flight path may have been established at least partly by the base station or may have been received from the second UAV or from another base station corresponding to the second UAV). However, claimed subject matter is not limited to any particular described embodiments, implementations, examples, etc.

For certain example embodiments, an operation 916 may be directed at least partially to wherein the transmitting to the first UFV at least one flight control command (of operation 910) includes transmitting to the first UFV the at least one flight control command responsive at least partially to a first location that corresponds to the first UFV and that is received from the first UFV and responsive at least partially to a second location that corresponds to the second UFV and that is received from the second UFV. For certain example implementations, at least one machine may transmit to a first UFV 102(1) at least one flight control command 760 responsive at least partially to a first location 766(1) (e.g., a geographical position, an elevation, satellite positioning system (SPS) coordinates, latitude or longitude coordinates, distance or direction from a waypoint, distance or direction from a location of a UFV, an azimuth angle, or a combination thereof, etc.) that corresponds to (e.g., represents, is associated with, indicates a position for, or a combination thereof, etc.) first UFV 102(1) and that is received from first UFV 102(1) and responsive at least partially to a second location 766(2) (e.g., a geographical position, an elevation, satellite positioning system (SPS) coordinates, latitude or longitude coordinates, distance or direction from a waypoint, distance or direction from a location of a UFV, an azimuth angle, or a combination thereof, etc.) that corresponds to (e.g., represents, is associated with, indicates a position for, or a combination thereof, etc.) a second UFV 102(2) and that is received from second UFV 102(2). By way of example but not limitation, at least one base station may transmit to the first UFV the at least one flight control command responsive at least partially to a first location that corresponds to the first UFV and that is received from the first UFV and responsive at least partially to a second location that corresponds to the second UFV and that is received from the second UFV (e.g., a base station may transmit to a first UAV a command to change a first flight path of the first UAV to vector toward alignment with a second flight path of a second UAV responsive at least partly (i) to a first location of and provided by the first UAV and (ii) to a second location of and provided by the second UAV). However, claimed subject matter is not limited to any particular described embodiments, implementations, examples, etc.

Figure 9B:
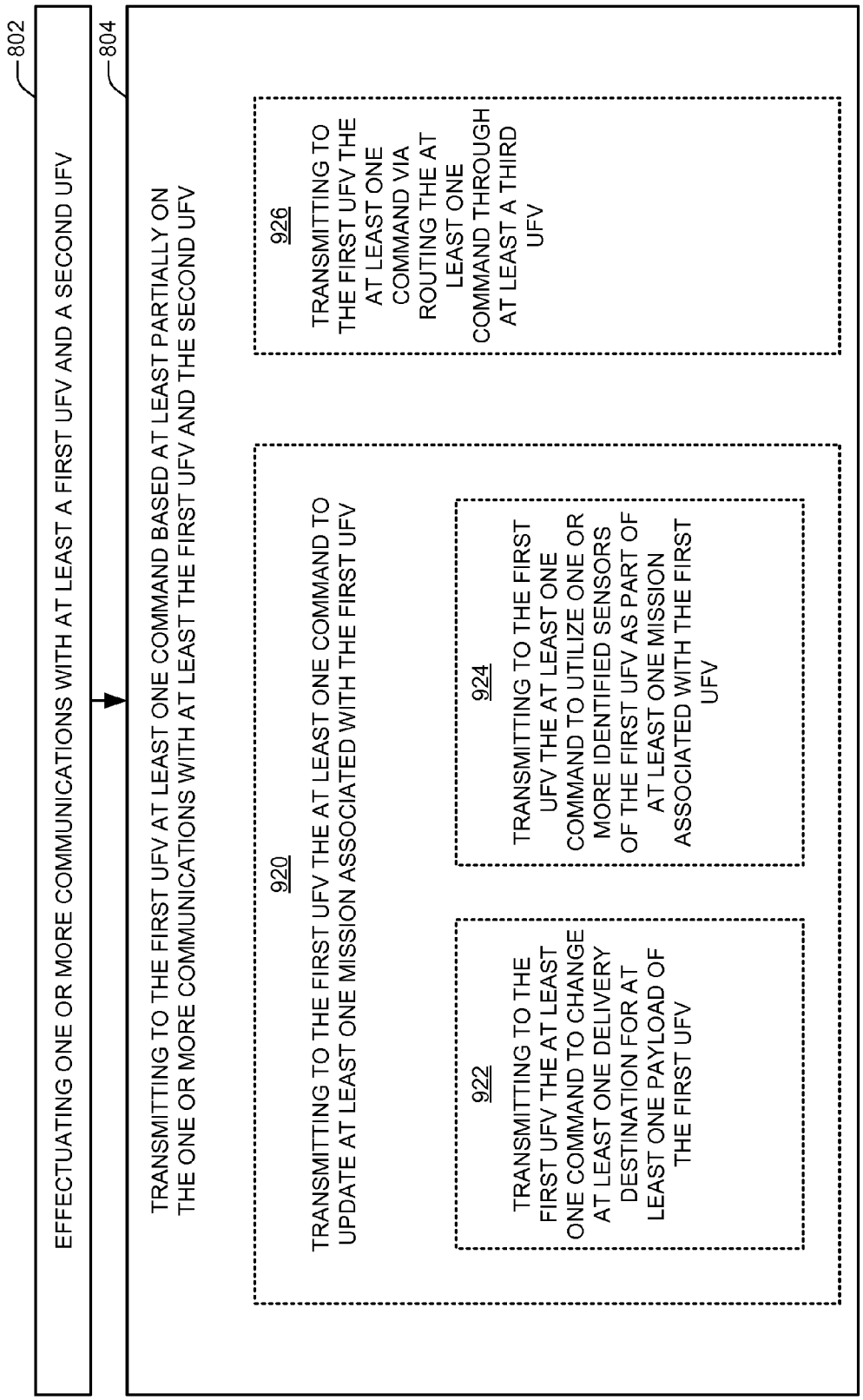

FIG. 9B illustrates a flow diagram 900B having example operations 920, 922, 924, or 926. For certain example embodiments, an operation 920 may be directed at least partially to wherein the transmitting to the first UFV at least one command based at least partially on the one or more communications with at least the first UFV and the second UFV (of operation 804) includes transmitting to the first UFV the at least one command to update at least one mission associated with the first UFV. For certain example implementations, at least one machine may transmit to a first UFV 102(1) at least one command 716 to update (e.g., alter, change based on recently acquired data, modify responsive to new information, improve, fine tune, substitute at least a portion of, or a combination thereof, etc.) at least one mission 768 (e.g., an assigned task, procedure, goal, job, delivery, sensor reading acquisition, signal ferrying, or a combination thereof, etc.) associated with (e.g., corresponding to, derived from, pertaining to, related to, or a combination thereof, etc.) first UFV 102(1). By way of example but not limitation, at least one base station may transmit to the first UFV the at least one command to update at least one mission associated with the first UFV (e.g., a base station may transmit to a first UAV an order to alter or replace an existing task that is assigned to the first UAV to thereby create a new or modified task that the first UAV is to accomplish). However, claimed subject matter is not limited to any particular described embodiments, implementations, examples, etc.

For certain example embodiments, an operation 922 may be directed at least partially to wherein the transmitting to the first UFV the at least one command to update at least one mission associated with the first UFV (of operation 920) includes transmitting to the first UFV the at least one command to change at least one delivery destination for at least one payload of the first UFV. For certain example implementations, at least one machine may transmit to a first UFV 102(1) at least one command 716 to change (e.g., alter, replace, focus, narrow, augment, substitute, or a combination thereof, etc.) at least one delivery destination 770 (e.g., an address, one or more satellite positioning system (SPS) coordinates, a geographical position, an individual, a machine identifier, a homing signal, or a combination thereof, etc.) for at least one payload 772 (e.g., a package, a product, equipment, weight being ferried, an item, food, another UFV, or a combination thereof, etc.) of first UFV 102(1). By way of example but not limitation, at least one base station may transmit to the first UFV the at least one command to change at least one delivery destination for at least one payload of the first UFV (e.g., a base station may transmit to a first UAV an order to change delivery of an item from conveyor #3 to conveyor #6 within a warehouse, such as a storage facility or a distribution center, if a second UAV failed to deliver a duplicate of the item to conveyor #6). However, claimed subject matter is not limited to any particular described embodiments, implementations, examples, etc.

For certain example embodiments, an operation 924 may be directed at least partially to wherein the transmitting to the first UFV the at least one command to update at least one mission associated with the first UFV (of operation 920) includes transmitting to the first UFV the at least one command to utilize one or more identified sensors of the first UFV as part of at least one mission associated with the first UFV. For certain example implementations, at least one machine may transmit to a first UFV 102(1) at least one command 716 to utilize one or more identified sensors 774 (e.g., a device sensitive to stimulus, a device that transforms stimuli into electrical signals, a light sensor, a sound sensor, a radiation sensor, an electromagnetic sensor, a radio frequency signal sensor, a camera, a microphone, a speed detector, an object detector, or a combination thereof, etc.) of first UFV 102(1) as part of at least one mission 768 associated with (e.g., corresponding to, derived from, pertaining to, related to, or a combination thereof, etc.) first UFV 102(1). By way of example but not limitation, at least one base station may transmit to the first UFV the at least one command to utilize one or more identified sensors of the first UFV as part of at least one mission associated with the first UFV (e.g., a base station may transmit to a first UAV an order to use a radio receiver and a microphone at a designated position for investigation if a second UAV is leaving the designated position and has revealed or discovered that interesting radio signals or sound wave signals were detected thereat). However, claimed subject matter is not limited to any particular described embodiments, implementations, examples, etc.

For certain example embodiments, an operation 926 may be directed at least partially to wherein the transmitting to the first UFV at least one command based at least partially on the one or more communications with at least the first UFV and the second UFV (of operation 804) includes transmitting to the first UFV the at least one command via routing the at least one command through at least a third UFV. For certain example implementations, at least one machine may transmit to a first UFV 102(1) at least one command 716 via routing (e.g., propagating, transmitting, forwarding via a given path, detouring through at least one node, dispatching to or toward, or a combination thereof, etc.) at least one command 716 through at least a third UFV 102(3). By way of example but not limitation, at least one base station may transmit to the first UFV the at least one command via routing the at least one command through at least a third UFV (e.g., a base station may transmit to a first UAV a command to assume control of a second UAV, which has indicated that it is losing contact with the base station, by ordering a third UAV to send a control assumption command, which identifies the second UAV, to the first UAV). However, claimed subject matter is not limited to any particular described embodiments, implementations, examples, etc.

FIG. 9C illustrates a flow diagram 900C having example operations 930, 932, 934, 936, or 938. For certain example embodiments, an operation 930 may be directed at least partially to wherein the transmitting to the first UFV at least one command based at least partially on the one or more communications with at least the first UFV and the second UFV (of operation 804) includes transmitting to the first UFV the at least one command responsive at least partially to at least one message from the second UFV. For certain example implementations, at least one machine may transmit to a first UFV 102(1) at least one command 716 responsive at least partially to at least one message 776 (e.g., a packet, an encapsulated piece of information, one or more transmissions/receptions, a signal, a dispatch, a communique, or a combination thereof, etc.) from a second UFV 102(2). By way of example but not limitation, at least one base station may transmit to the first UFV the at least one command responsive at least partially to at least one message from the second UFV (e.g., a base station may directly or indirectly send to a first UAV a command responsive at least partly to a message that is sent from or that originates at a second UAV, which message may be analyzed or otherwise processed by the base station). However, claimed subject matter is not limited to any particular described embodiments, implementations, examples, etc.

For certain example embodiments, an operation 932 may be directed at least partially to wherein the transmitting to the first UFV the at least one command responsive at least partially to at least one message from the second UFV (of operation 930) includes transmitting to the first UFV the at least one command responsive at least partially to the at least one message from the second UFV, the at least one message indicative of at least a partial mission success. For certain example implementations, at least one machine may transmit to a first UFV 102(1) at least one command 716 responsive at least partially to at least one message 776 from a second UFV 102(2), with at least one message 776 indicative of (e.g., representative of, descriptive of, identifying, or a combination thereof, etc.) at least a partial mission success 778 (e.g., achieving at least part of a goal, completing at least part of an assigned task, accomplishing at least one defined stage of a procedure, reaching a given destination, acquiring a targeted item, delivering a particular article, or a combination thereof, etc.). By way of example but not limitation, at least one base station may transmit to the first UFV the at least one command responsive at least partially to the at least one message from the second UFV, the at least one message indicative of at least a partial mission success (e.g., a base station may transmit to a first UAV a command for the first UAV to join a second UAV in a new mission, such as proceeding to a different destination or employing a different sensor, if the base station receives a message from the second UAV indicating that the second UAV has accomplished a previous mission objective, such as recording 15 minutes of video at a designated location). However, claimed subject matter is not limited to any particular described embodiments, implementations, examples, etc.

For certain example embodiments, an operation 934 may be directed at least partially to wherein the transmitting to the first UFV the at least one command responsive at least partially to the at least one message from the second UFV, the at least one message indicative of at least a partial mission success (of operation 932) includes transmitting to the first UFV the at least one command responsive at least partially to the at least one message from the second UFV, the at least one command including at least one order for the first UFV to return to a base for the first UFV. For certain example implementations, at least one machine may transmit to a first UFV 102(1) at least one command 716 responsive at least partially to at least one message 776 from a second UFV 102(2), with at least one command 716 including at least one order 780 (e.g., demand, authoritative request, requirement, procedural authorization, directive, or a combination thereof, etc.) for first UFV 102(1) to return to (e.g., fly to, land at, proceed toward, or a combination thereof, etc.) a base 781 (e.g., a landing pad, a place with protection from weather elements, a place from which takeoff occurred, a position with fuel, a location of an owner, or a combination thereof, etc.) for first UFV 102(2). By way of example but not limitation, at least one base station may transmit to the first UFV the at least one command responsive at least partially to the at least one message from the second UFV, the at least one command including at least one order for the first UFV to return to a base for the first UFV (e.g., a base station may transmit to a first UAV a packet referencing a command that includes a code for the first UAV to fly to and land at a location that corresponds to a home base for the first UAV, such as a landing pad at an owner's house, a docking port at a UAV garage facility, or a known regrouping or refueling location, etc.). However, claimed subject matter is not limited to any particular described embodiments, implementations, examples, etc.

For certain example embodiments, an operation 936 may be directed at least partially to wherein the transmitting to the first UFV the at least one command responsive at least partially to the at least one message from the second UFV, the at least one message indicative of at least a partial mission success (of operation 932) includes transmitting to the first UFV the at least one command responsive at least partially to the at least one message from the second UFV, the at least one command including at least one order for the first UFV to undertake at least one new mission. For certain example implementations, at least one machine may transmit to a first UFV 102(1) at least one command 716 responsive at least partially to at least one message 776 from a second UFV 102(2), with at least one command 716 including at least one order 780 (e.g., demand, authoritative request, requirement, procedural authorization, directive, or a combination thereof, etc.) for first UFV 102(1) to undertake (e.g., accept, be assigned, assume responsibility for, adopt, or a combination thereof, etc.) at least one new (e.g., different, additional, replacement, or a combination thereof, etc.) mission 768 (e.g., an assigned task, procedure, goal, job, delivery, sensor reading acquisition, signal ferrying, or a combination thereof, etc.). By way of example but not limitation, at least one base station may transmit to the first UFV the at least one command responsive at least partially to the at least one message from the second UFV, the at least one command including at least one order for the first UFV to undertake at least one new mission (e.g., a base station may communicate to a first UAV via another, more-physically-proximate base station or terrestrial antenna a signal comprising a command that the first UAV is programmed to interpret as an order to change or replace a mission objective so as to adopt a new mission objective, with an indication of the change to an existing mission objective—such as a new delivery destination—or an indication of a replacement mission objective—such as a new delivery destination and a new payload—being included as part of the command or being provided separately). However, claimed subject matter is not limited to any particular described embodiments, implementations, examples, etc.

For certain example embodiments, an operation 938 may be directed at least partially to wherein the transmitting to the first UFV the at least one command responsive at least partially to at least one message from the second UFV (of operation 930) includes transmitting to the first UFV the at least one command responsive at least partially to the at least one message from the second UFV, the at least one message indicative of at least one assistance status for the second UFV. For certain example implementations, at least one machine may transmit to a first UFV 102(1) at least one command 716 responsive at least partially to at least one message 776 from a second UFV 102(2), with at least one message 776 indicative of (e.g., representative of, descriptive of, identifying, or a combination thereof, etc.) at least one assistance status 782 (e.g., a condition of lacking at least one resource to complete a current mission, a state of at least partial incapacity, a situation in which mission success may be jeopardized, an environment in which help would be beneficial, or a combination thereof, etc.) for second UFV 102(2). By way of example but not limitation, at least one base station may transmit to the first UFV the at least one command responsive at least partially to the at least one message from the second UFV, the at least one message indicative of at least one assistance status for the second UFV (e.g., a base station may transmit to a first UAV a command to refuel responsive to a message from a second UAV that indicates that the second UAV is in a condition in which it could benefit from assistance, such as: the second UAV needs to be refueled to reach a given destination, a payload of the second UAV needs to handed off so that the payload can reach a given destination—because the second UAV is low on fuel or damaged, a targeted surveillance area is too large to be covered without additional sensor(s), signal communication may be improved if another UAV is positioned between the second UAV and the base station, a customer's pickup request is larger than expected and too large for the second UAV alone, or so forth). However, claimed subject matter is not limited to any particular described embodiments, implementations, examples, etc.

Figure 9D:
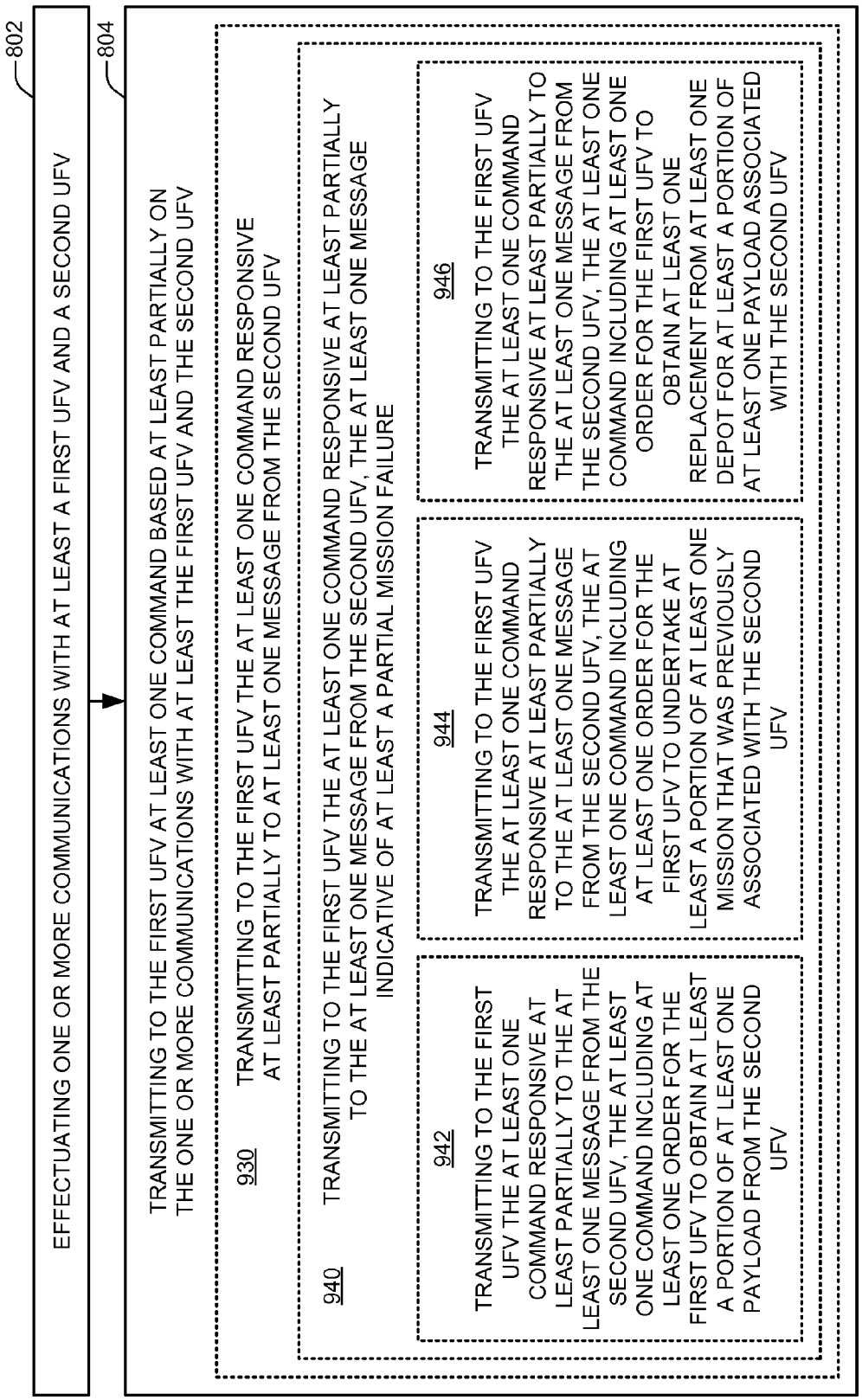

FIG. 9D illustrates a flow diagram 900D having example operations 940, 942, 944, or 946. For certain example embodiments, an operation 940 may be directed at least partially to wherein the transmitting to the first UFV the at least one command responsive at least partially to at least one message from the second UFV (of operation 930) includes transmitting to the first UFV the at least one command responsive at least partially to the at least one message from the second UFV, the at least one message indicative of at least a partial mission failure. For certain example implementations, at least one machine may transmit to a first UFV 102(1) at least one command 716 responsive at least partially to at least one message 776 from a second UFV 102(2), with at least one message 776 indicative of (e.g., representative of, descriptive of, identifying, or a combination thereof, etc.) at least a partial mission failure 784 (e.g., an inability to achieve at least part of a goal, non-completion of at least part of an assigned task, accomplishing at least one defined stage of a procedure but after an associated deadline for such accomplishment, realizing a given destination is out-of-reach absent assistance, at least an apparent inability to acquire a targeted item, delivering a particular article to an incorrect location, running out of fuel prior to or too low on fuel to achieve mission completion, or a combination thereof, etc.). By way of example but not limitation, at least one base station may transmit to the first UFV the at least one command responsive at least partially to the at least one message from the second UFV, the at least one message indicative of at least a partial mission failure (e.g., a base station may transmit to a first UAV a command—such as to help with a current mission of a second UAV or to initiate a different mission that was next on an agenda of the second UAV—at least partly in response to a message from the second UAV that indicates that at least a portion of a current mission is in a failure condition—such as the second UAV cannot complete the mission, an intermediate stage has not been completed by a targeted deadline, a designated location cannot be reached, a specified payload cannot be carried or delivered, interference is hampering sensor readings, fuel supplies are dangerously dwindling, completion of a final mission objective is in jeopardy absent aide, or so forth). However, claimed subject matter is not limited to any particular described embodiments, implementations, examples, etc.

For certain example embodiments, an operation 942 may be directed at least partially to wherein the transmitting to the first UFV the at least one command responsive at least partially to the at least one message from the second UFV, the at least one message indicative of at least a partial mission failure (of operation 940) includes transmitting to the first UFV the at least one command responsive at least partially to the at least one message from the second UFV, the at least one command including at least one order for the first UFV to obtain at least a portion of at least one payload from the second UFV. For certain example implementations, at least one machine may transmit to a first UFV 102(1) at least one command 716 responsive at least partially to at least one message 776 from a second UFV 102(2), with at least one command 716 including at least one order 780 (e.g., demand, authoritative request, requirement, procedural authorization, directive, or a combination thereof, etc.) for first UFV 102(1) to obtain at least a portion of at least one payload 772 (e.g., a package, a product, equipment, weight being ferried, an item, food, another UFV, or a combination thereof, etc.) from second UFV 102(2). By way of example but not limitation, at least one base station may transmit to the first UFV the at least one command responsive at least partially to the at least one message from the second UFV, the at least one command including at least one order for the first UFV to obtain at least a portion of at least one payload from the second UFV (e.g., a base station may transmit to a first UAV a command ordering the first UAV to seize one of two packages being carried by a second UAV). However, claimed subject matter is not limited to any particular described embodiments, implementations, examples, etc.

For certain example embodiments, an operation 944 may be directed at least partially to wherein the transmitting to the first UFV the at least one command responsive at least partially to the at least one message from the second UFV, the at least one message indicative of at least a partial mission failure (of operation 940) includes transmitting to the first UFV the at least one command responsive at least partially to the at least one message from the second UFV, the at least one command including at least one order for the first UFV to undertake at least a portion of at least one mission that was previously associated with the second UFV. For certain example implementations, at least one machine may transmit to a first UFV 102(1) at least one command 716 responsive at least partially to at least one message 776 from a second UFV 102(2), with at least one command 716 including at least one order 780 (e.g., demand, authoritative request, requirement, procedural authorization, directive, or a combination thereof, etc.) for first UFV 102(1) to undertake (e.g., accept, be assigned, assume responsibility for, adopt, or a combination thereof, etc.) at least a portion of at least one mission 768 (e.g., an assigned task, procedure, goal, job, delivery, sensor reading acquisition, signal ferrying, or a combination thereof, etc.) that was previously (e.g., earlier, prior to now, before reassignment, or a combination thereof, etc.) associated with (e.g., corresponding to, derived from, pertaining to, related to, or a combination thereof, etc.) second UFV 102(2). By way of example but not limitation, at least one base station may transmit to the first UFV the at least one command responsive at least partially to the at least one message from the second UFV, the at least one command including at least one order for the first UFV to undertake at least a portion of at least one mission that was previously associated with the second UFV (e.g., a base station may transmit to a first UAV a command having one or more actions to be undertaken by the first UAV, which one or more actions were previously assigned to be undertaken by a second UAV prior to receipt of a message from the UAV indicating that the second UAV was not going to complete the actions in a timely manner). However, claimed subject matter is not limited to any particular described embodiments, implementations, examples, etc.

For certain example embodiments, an operation 946 may be directed at least partially to wherein the transmitting to the first UFV the at least one command responsive at least partially to the at least one message from the second UFV, the at least one message indicative of at least a partial mission failure (of operation 940) includes transmitting to the first UFV the at least one command responsive at least partially to the at least one message from the second UFV, the at least one command including at least one order for the first UFV to obtain at least one replacement from at least one depot for at least a portion of at least one payload associated with the second UFV. For certain example implementations, at least one machine may transmit to a first UFV 102(1) at least one command 716 responsive at least partially to at least one message 776 from a second UFV 102(2), with at least one command 716 including at least one order 780 (e.g., demand, authoritative request, requirement, procedural authorization, directive, or a combination thereof, etc.) for first UFV 102(1) to obtain (e.g., seize, acquire, pick-up, receive, or a combination thereof, etc.) at least one replacement (e.g., duplicate, suitable substitute, same stock keeping unit (SKU), similar item, identical article, or a combination thereof, etc.) from at least one depot 786 (e.g., storage place, warehouse, repository, location housing items, stockyard, or a combination thereof, etc.) for at least a portion of at least one payload 772 (e.g., a package, a product, equipment, weight being ferried, an item, food, another UFV, or a combination thereof, etc.) associated with (e.g., corresponding to, derived from, pertaining to, related to, or a combination thereof, etc.) second UFV 102(2). By way of example but not limitation, at least one base station may transmit to the first UFV the at least one command responsive at least partially to the at least one message from the second UFV, the at least one command including at least one order for the first UFV to obtain at least one replacement from at least one depot for at least a portion of at least one payload associated with the second UFV (e.g., a base station may transmit to a first UAV a command including a reference to an order that is interpretable by the first UAV to proceed to a depot—such as a storage place or a warehouse or a particular aisle or shelf—to load at least one item that was damaged or lost on account of a second UAV as reported by a received message from the second UAV, with the at least one item being identified as part of the command or separately therefrom). However, claimed subject matter is not limited to any particular described embodiments, implementations, examples, etc.

Figure 9E:
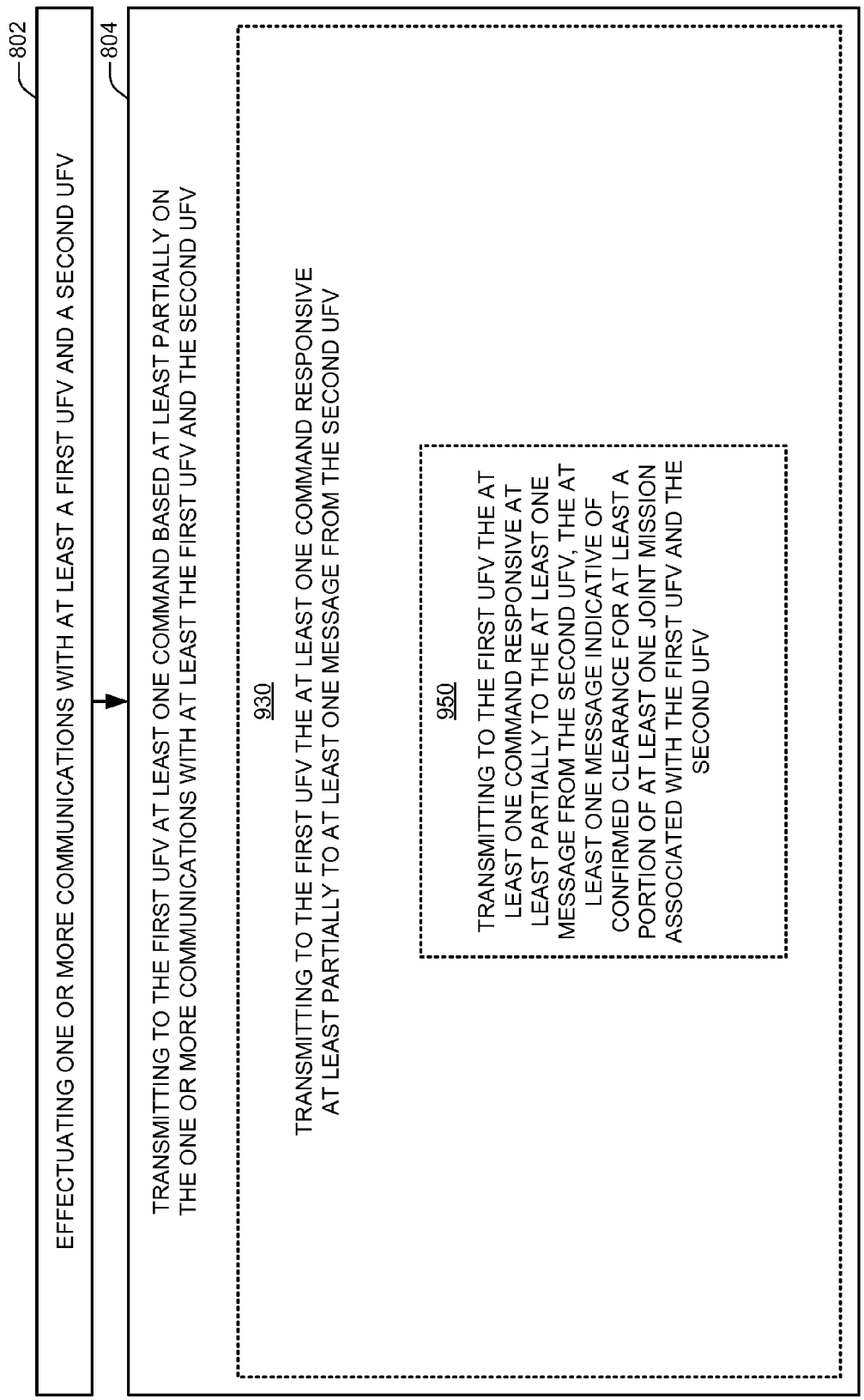

FIG. 9E illustrates a flow diagram 900E having example operation 950. For certain example embodiments, an operation 950 may be directed at least partially to wherein the transmitting to the first UFV the at least one command responsive at least partially to at least one message from the second UFV (of operation 930) includes transmitting to the first UFV the at least one command responsive at least partially to the at least one message from the second UFV, the at least one message indicative of confirmed clearance for at least a portion of at least one joint mission associated with the first UFV and the second UFV. For certain example implementations, at least one machine may transmit to a first UFV 102(1) at least one command 716 responsive at least partially to at least one message 776 from a second UFV 102(2), with at least one message 776 indicative of (e.g., representative of, descriptive of, identifying, or a combination thereof, etc.) confirmed clearance (e.g., verified capacity, checked capability, inspected and approved as feasible, ability approved, unobstructed route ensured, reviewed pathway probably available, or a combination thereof, etc.) for at least a portion of at least one joint mission 788 (e.g., a mission 768 (e.g., a task, procedure, goal, job, delivery, sensor reading acquisition, signal ferrying, or a combination thereof, etc.) that is assigned, charged to, responsible to be completed by, entrusted to, or a combination thereof, etc. two or more UFVs) associated with (e.g., corresponding to, derived from, pertaining to, related to, or a combination thereof, etc.) first UFV 102(1) and second UFV 102(2). By way of example but not limitation, at least one base station may transmit to the first UFV the at least one command responsive at least partially to the at least one message from the second UFV, the at least one message indicative of confirmed clearance for at least a portion of at least one joint mission associated with the first UFV and the second UFV (e.g., a base station may transmit to a first UAV a command to proceed at an accelerated pace on a joint mission with a second UAV after receiving a message from the second UAV indicating that a path, a position, a particular sensor usage, weather conditions, aerial traffic, or signal noise levels, etc. have been checked and is/are determined to be non-problematic). However, claimed subject matter is not limited to any particular described embodiments, implementations, examples, etc.

Figure 10A:
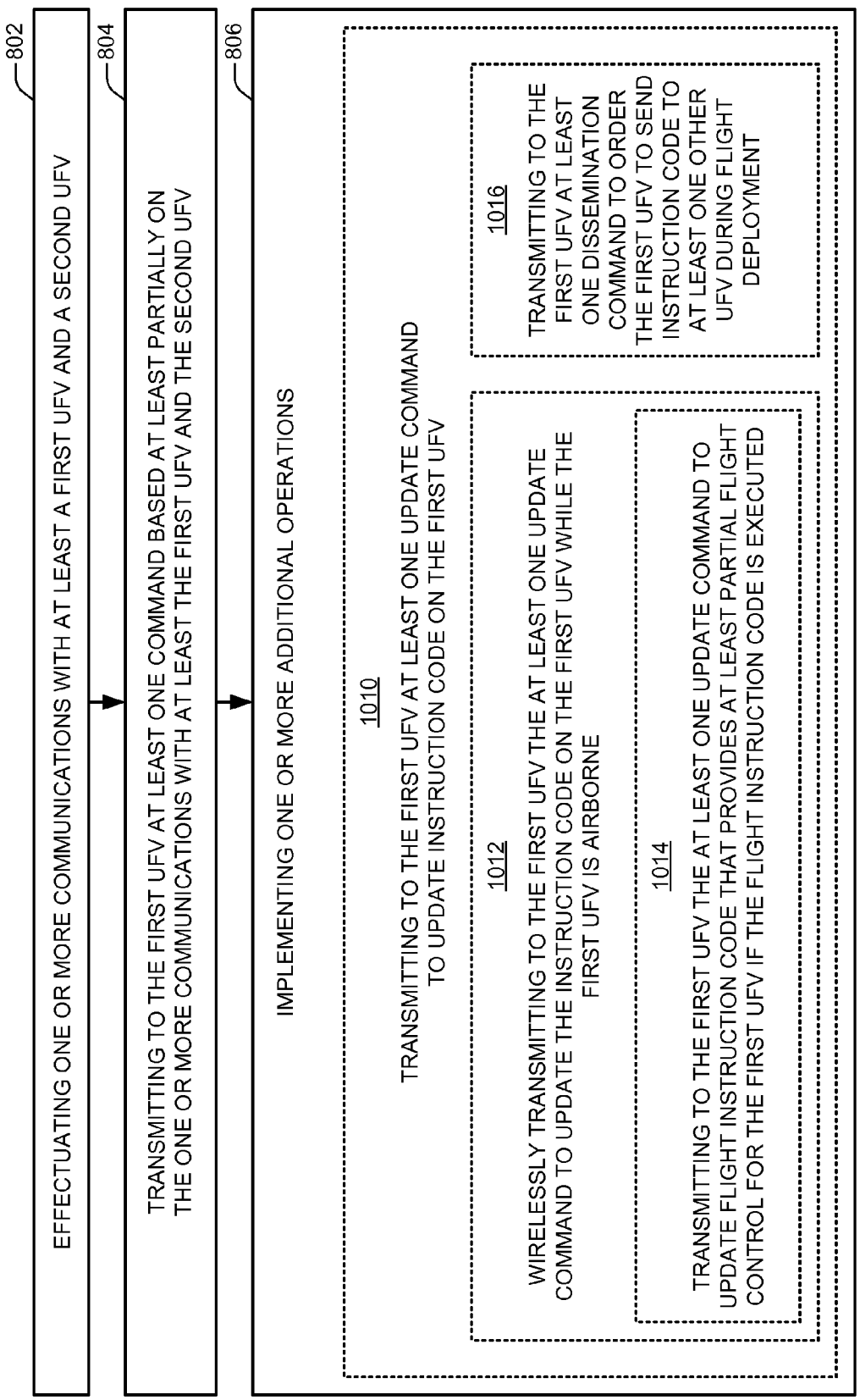

FIGS. 10A-10B depict example additions or alternatives for a flow diagram of FIG. 8A in accordance with certain example embodiments. As illustrated, flow diagrams of FIGS. 10A-10B may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 10A-10B may be performed so as to be fully or partially overlapping with other operation(s). For certain example embodiments, one or more operations of flow diagrams 1000A-1000B (of FIGS. 10A-10B) may be performed by at least one machine (e.g., a base station 306 or at least a portion thereof).

FIGS. 10A-10B each illustrate a flow diagram 1000A-1000B, respectively, having an example operation 806. For certain example embodiments, an operation 806 may be directed at least partially to wherein a method further includes implementing one or more additional operations. For certain example implementations, at least one machine may implement one or more operations in addition to effectuating (of operation 802) or transmitting (of operation 804). Example additional operations may include, by way of example but not limitation, any one or more of operations 1010, 1012, 1014, 1016, 1020, 1022, 1024, 1026, or 1028 (of FIGS. 10A-10B).

FIG. 10A illustrates a flow diagram 1000A having example operations 1010, 1012, 1014, or 1016. For certain example embodiments, an operation 1010 may be directed at least partially to wherein a method of effectuating (of operation 802) or transmitting (of operation 804) further includes (at additional operation 806) transmitting to the first UFV at least one update command to update instruction code on the first UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a first UFV 102(1) at least one update command 790 (e.g., a directive to change, an order to substitute, a demand to alter or replace, or a combination thereof, etc.) to update (e.g., alter, change based on recently acquired data, modify responsive to new information, improve, fine tune, substitute at least a portion of, augment, or a combination thereof, etc.) instruction code 791 (e.g., code that instructs a UFV how to operate, logic that enables a UFV to perform missions, directions to implement procedures, descriptions of tasks, instructions that guide a UFV's behavior, steps to achieve a goal, or a combination thereof, etc.) on first UFV 102(1). By way of example but not limitation, at least one base station may transmit to the first UFV at least one update command to update instruction code on the first UFV (e.g., a base station may send to a first UAV a command causing the first UAV to install an update to program coding—such as navigational or communication software—resident on the first UAV, the command may include or reference the updated program coding—which may be transmitted to the first UAV by the base station). However, claimed subject matter is not limited to any particular described embodiments, implementations, examples, etc.

For certain example embodiments, an operation 1012 may be directed at least partially to wherein the transmitting to the first UFV at least one update command to update instruction code on the first UFV (of operation 1010) includes wirelessly transmitting to the first UFV the at least one update command to update the instruction code on the first UFV while the first UFV is airborne. For certain example implementations, at least one machine may wirelessly transmit (e.g., transmit without a wire, send a signal over-the-air, propagate an electromagnetic wave over a non-linear medium, or a combination thereof, etc.) to a first UFV 102(1) at least one update command 790 to update instruction code 791 on first UFV 102(1) while first UFV 102(1) is airborne (e.g., in the air, above ground, flying, floating, hovering, or a combination thereof, etc.). By way of example but not limitation, at least one base station may wirelessly transmit to the first UFV the at least one update command to update the instruction code on the first UFV while the first UFV is airborne (e.g., a base station may send a radio frequency signal to a first UAV while the first UAV is airborne ordering it to install a patch to its software during flight). However, claimed subject matter is not limited to any particular described embodiments, implementations, examples, etc.

For certain example embodiments, an operation 1014 may be directed at least partially to wherein the wirelessly transmitting to the first UFV the at least one update command to update the instruction code on the first UFV while the first UFV is airborne (of operation 1012) includes transmitting to the first UFV the at least one update command to update flight instruction code that provides at least partial flight control for the first UFV if the flight instruction code is executed. For certain example implementations, at least one machine may transmit to a first UFV 102(1) at least one update command 790 to update flight instruction code 792 (e.g., instruction code 791 that includes at least processor-executable instructions and that is adapted to affect a flight path (e.g., a heading, a flight trajectory, a position, an altitude, a speed, a direction a velocity, an acceleration, a stability level, a destination, a course through air or space or a time at which the course is to be traversed, or a combination thereof, etc.) of a UFV) that provides at least partial flight control (e.g., control over a flight path, a capability to affect a flight path, an ability to change speed/direction/elevation, a mechanism to adhere to a course that comports with a mission, or a combination thereof, etc.) for first UFV 102(1) if flight instruction code 792 is executed (e.g., performed by at least one device; processed by a central processing unit (CPU), a core of a processor, a microcontroller, or a combination thereof, etc.; logically implemented; some combination thereof; or so forth). By way of example but not limitation, at least one base station may transmit to the first UFV the at least one update command to update flight instruction code that provides at least partial flight control for the first UFV if the flight instruction code is executed (e.g., a base station may send to a first UAV a command to update some flight control code, which flight control code may be capable of making navigational decisions for or adjusting a flight path of the first UAV during or after execution of the flight control code by the first UAV). However, claimed subject matter is not limited to any particular described embodiments, implementations, examples, etc.

For certain example embodiments, an operation 1016 may be directed at least partially to wherein the transmitting to the first UFV at least one update command to update instruction code on the first UFV (of operation 1010) includes transmitting to the first UFV at least one dissemination command to order the first UFV to send instruction code to at least one other UFV during flight deployment. For certain example implementations, at least one machine may transmit to a first UFV 102(1) at least one dissemination command 793 (e.g., a command to share, forward, distribute, broadcast, spread, or a combination thereof, etc. that is) to order (e.g., require, demand, obligate, direct, or a combination thereof, etc.) first UFV 102(1) to send (e.g., transmit, provide, communicate, or a combination thereof, etc.) instruction code 791 (e.g., code that instructs a UFV how to operate, logic that enables a UFV to perform missions, directions to implement procedures, descriptions of tasks, instructions that guide a UFV's behavior, steps to achieve a goal, or a combination thereof, etc.) to at least one other UFV (e.g., a second UFV 102(2), a third UFV 102(3), or a combination thereof, etc.) during flight deployment (e.g., while airborne, between a takeoff and landing, while flying during a mission, or a combination thereof, etc.). By way of example but not limitation, at least one base station may transmit to the first UFV at least one dissemination command to order the first UFV to send instruction code to at least one other UFV during flight deployment (e.g., a base station may send to a first UAV a command ordering the first UAV to disseminate updated instruction code—such as by transmitting some updated instruction code or at least one update command—to one or more other UAVs, such as a second UAV, while the first UAV is airborne or while the one or more other UAVs are airborne). However, claimed subject matter is not limited to any particular described embodiments, implementations, examples, etc.

FIG. 10B illustrates a flow diagram 1000B having example operations 1020, 1022, 1024, 1026, or 1028. For certain example embodiments, an operation 1020 may be directed at least partially to wherein a method of effectuating (of operation 802) or transmitting (of operation 804) further includes (at additional operation 806) transmitting to the first UFV at least one update command to update at least one security protocol of the first UFV. For certain example implementations, at least one machine may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to a first UFV 102(1) at least one update command 794 (e.g., a directive to change, an order to substitute, a demand to alter or replace, or a combination thereof, etc.) to update (e.g., alter, change based on recently acquired data, modify responsive to new information, improve, fine tune, substitute at least a portion of, augment, or a combination thereof, etc.) at least one security protocol 795 (e.g., a security procedure, a security program, a security policy, an approach to prevent unauthorized tampering, a mechanism to fend off attacks, code to thwart foreign control, techniques to reject location or hijacking attacks, or a combination thereof, etc.) of first UFV 102(1). By way of example but not limitation, at least one base station may transmitting to the first UFV at least one update command to update at least one security protocol of the first UFV (e.g., a base station may send a wireless transmission to a first UAV that includes a command ordering the first UAV to change or add or replace a security protocol—such as an anti-malware program, at least one anti-malware signature for a code segment fingerprint or code behavior, at least one anti-malware heuristic, at least one rootkit defense, an anti-hijacking module, or an anti-spoofing routine, etc.—that the first UAV is employing or capable of activating). However, claimed subject matter is not limited to any particular described embodiments, implementations, examples, etc.

For certain example embodiments, an operation 1022 may be directed at least partially to wherein the transmitting to the first UFV at least one update command to update at least one security protocol of the first UFV (of operation 1020) includes transmitting to the first UFV at least one malware indicator to be included in at least one updated security protocol of the first UFV. For certain example implementations, at least one machine may transmit to a first UFV 102(1) at least one malware indicator 796 (e.g., a static or dynamic image or pattern of known or predicted malware data/code or behavior, a malware signature, a malware heuristic, or a combination thereof, etc.) to be included in at least one updated (e.g., altered, changed based on recently acquired data, modified responsive to new information, improved, fine-tuned, substituted at least a portion of, augmented, or a combination thereof, etc.) security protocol 795 of first UFV 102(1). By way of example but not limitation, at least one base station may transmit to the first UFV at least one malware indicator to be included in at least one updated security protocol of the first UFV (e.g., a base station may send to a first UAV at least one anti-malware signature for a code segment fingerprint, at least one anti-malware signature for code behavior, or at least one anti-malware heuristic, etc., such as a virus signature having a known data pattern). However, claimed subject matter is not limited to any particular described embodiments, implementations, examples, etc.

For certain example embodiments, an operation 1024 may be directed at least partially to wherein the transmitting to the first UFV at least one update command to update at least one security protocol of the first UFV (of operation 1020) includes broadcasting at least to the first UFV and to the second UFV the at least one update command to update the at least one security protocol of the first UFV and to update at least one security protocol of the second UFV. For certain example implementations, at least one machine may broadcast (e.g., transmit toward multiple destinations, send to more than one UFV, attempt to distribute to any affiliated UFV in range, or a combination thereof, etc.) at least to a first UFV 102(1) and to a second UFV 102(2) at least one update command 794 to update (e.g., alter, change based on recently acquired data, modify responsive to new information, improve, fine tune, substitute at least a portion of, augment, or a combination thereof, etc.) at least one security protocol 795(1) of first UFV 102(1) and to update (e.g., alter, change based on recently acquired data, modify responsive to new information, improve, fine tune, substitute at least a portion of, augment, or a combination thereof, etc.) at least one security protocol 795(2) of second UFV 102(2). By way of example but not limitation, at least one base station may broadcast at least to the first UFV and to the second UFV the at least one update command to update the at least one security protocol of the first UFV and to update at least one security protocol of the second UFV (e.g., a base station may wirelessly transmit to multiple UAVs, such as a first UAV and a second UAV, a command ordering the multiple UAVs to update at least one security protocol to enable them to overcome an information-technology-based or signal-jamming attack). However, claimed subject matter is not limited to any particular described embodiments, implementations, examples, etc.

For certain example embodiments, an operation 1026 may be directed at least partially to wherein the transmitting to the first UFV at least one update command to update at least one security protocol of the first UFV (of operation 1020) includes transmitting to the first UFV at least one dissemination indicator to inform the first UFV to share the at least one security protocol with one or more other UFVs during flight. For certain example implementations, at least one machine may transmit to a first UFV 102(1) at least one dissemination indicator 797 (e.g., code, signal, message, field value, instruction, or a combination thereof, etc. to share, forward, distribute, broadcast, spread, or a combination thereof, etc. something, such as) to inform (e.g., notify, alert, instruct, advise, make known to, or a combination thereof, etc.) first UFV 102(1) to share (e.g., provide to others, broadcast, transmit, communicate, distribute, send a copy, or a combination thereof, etc.) at least one security protocol 795 with one or more other UFVs 102 during flight (e.g., while in the air, above ground, flying, floating, hovering, or a combination thereof, etc.). By way of example but not limitation, at least one base station may transmit to the first UFV at least one dissemination indicator to inform the first UFV to share the at least one security protocol with one or more other UFVs during flight (e.g., a base station may include as part of a security protocol update command that is communicated to a first UAV a signal or a flag that informs the first UAV that it is to spread the security protocol update to other UAVs with which it enters wireless communication range). However, claimed subject matter is not limited to any particular described embodiments, implementations, examples, etc.

For certain example embodiments, an operation 1028 may be directed at least partially to wherein the transmitting to the first UFV at least one update command to update at least one security protocol of the first UFV (of operation 1020) includes transmitting to the first UFV at least one update for at least one location attack rejection mechanism. For certain example implementations, at least one machine may transmit to a first UFV 102(1) at least one update (e.g., change, alteration, new material, different procedures, replacement information, instructions for modification, or a combination thereof, etc.) for at least one location attack rejection mechanism 798 (e.g., an approach to avoid being fooled by attacks on a UFV's ability to ascertain its location, a routine to counteract GPS spoofing, a technique to deny GPS hijacking, a code or key to facilitate using secure location-providing sources—such as a known base station or a friendly UFV, or a combination thereof, etc.). By way of example but not limitation, at least one base station may transmit to the first UFV at least one update for at least one location attack rejection mechanism (e.g., a base station may send to a first UAV executable code embodying an updated technique to thwart a location-based attack on the first UAV, with the updated technique including an approach to counteract GPS spoofing or deny GPS hijacking using other, non-GPS on-board sensors—such as an inertial measurement unit (IMU)—or one or more proximate friendly UAVs—which may provide an alternative source for trilateration data or data to correlate and ascertain spoofed GPS data). However, claimed subject matter is not limited to any particular described embodiments, implementations, examples, etc.

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++ or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A base station comprising:
   at least one electronic device including at least:
      circuitry configured for effectuating one or more communications with at least a first unoccupied flying vehicle (UFV) and a second UFV;
      circuitry configured for receiving at least one message from at least the second UFV, the at least one message including at least a notification indicative that the second UFV has autonomously determined an inability to accomplish at least one portion of at least one mission without assistance;
      circuitry configured for automated formulating of at least one command directing one or more flight control decisions of the first UFV including at least analyzing the notification indicative that the second UFV has autonomously determined an inability to accomplish at least one portion of at least one mission without assistance included in the at least one message, determining at least one mission modification based at least partially on the analysis, and formulating the at least one command based at least partially on the at least one mission modification; and
      circuitry configured for transmitting to the first UFV the at least one command.

2. The base station of claim 1, wherein the circuitry configured for receiving at least one message from at least the second UFV comprises:
   circuitry configured for receiving from the second UFV at least one indication of at least one hazard discovered by the second UFV.

3. The base station of claim 2, wherein the circuitry configured for receiving from the second UFV at least one indication of at least one hazard discovered by the second UFV comprises:
   at least one of:
      circuitry configured for receiving from the second UFV at least one code representative of the at least one hazard discovered by the second UFV;
      circuitry configured for receiving from the second UFV a location of at least one object that is detected by the second UFV; or
      circuitry configured for receiving from the second UFV at least one message including at least one atmospheric harbinger indicative of one or more weather elements that are detected by the second UFV.

4. The base station of claim 1, wherein the circuitry configured for receiving at least one message from at least the second UFV comprises:
   at least one of:
      circuitry configured for receiving from the second UFV at least one indication of at least one status of the second UFV;
      circuitry configured for receiving from the second UFV at least one indication of at least one heading of the second UFV;
      circuitry configured for receiving from the second UFV at least one indication of a fuel level associated with the second UFV;
      circuitry configured for receiving from the second UFV at least one indication of at least one mission status associated with the second UFV; or
      circuitry configured for receiving from the second UFV at least one indication of at least one estimated delay for a mission associated with the second UFV.

5. The base station of claim 1, wherein the circuitry configured for receiving at least one message from at least the second UFV comprises:
   circuitry configured for receiving from the second UFV at least one indication of at least one status of a third UFV.

6. The base station of claim 1, wherein the circuitry configured for transmitting to the first UFV the at least one command comprises:
   circuitry configured for transmitting to the first UFV at least one flight control command.

7. The base station of claim 6, wherein the circuitry configured for transmitting to the first UFV at least one flight control command comprises:
   at least one of:
      circuitry configured for transmitting to the first UFV the at least one flight control command to instruct the first UFV to adjust at least one flight path; or
      circuitry configured for transmitting to the first UFV the at least one flight control command responsive at least partially to at least one indication of at least one flight path of the second UFV.

8. The base station of claim 1, wherein the circuitry configured for transmitting to the first UFV the at least one command comprises:
   circuitry configured for transmitting to the first UFV the at least one command to update at least one mission associated with the first UFV.

9. The base station of claim 8, wherein the circuitry configured for transmitting to the first UFV the at least one command to update at least one mission associated with the first UFV comprises:
   circuitry configured for transmitting to the first UFV the at least one command to utilize one or more identified sensors of the first UFV as part of at least one mission associated with the first UFV.

10. The base station of claim 1, wherein the circuitry configured for transmitting to the first UFV the at least one command comprises:
    circuitry configured for transmitting to the first UFV the at least one command via routing the at least one command through at least a third UFV.

11. The base station of claim 1, wherein the circuitry configured for automated formulating of at least one command directing one or more flight control decisions of the first UFV including at least analyzing the notification indicative that the second UFV has autonomously determined an inability to accomplish at least one portion of at least one mission without assistance included in the at least one message, determining at least one mission modification based at least partially on the analysis, and formulating the at least one command based at least partially on the at least one mission modification further comprises:

circuitry configured for automated formulating of at least one command directing one or more flight control decisions of the first UFV including analyzing a notification of at least one condition indicative of a determination by the at least one second UFV of attainment of at least one mission objective included in the at least one message, determining at least one mission modification to join the second UFV in a new mission based at least partially on the analysis, and formulating the at least one command based at least partially on the at least one mission modification.

12. The base station of claim 1, wherein the circuitry configured for automated formulating of at least one command directing one or more flight control decisions of the first UFV including at least analyzing the notification indicative that the second UFV has autonomously determined an inability to accomplish at least one portion of at least one mission without assistance included in the at least one message, determining at least one mission modification based at least partially on the analysis, and formulating the at least one command based at least partially on the at least one mission modification further comprises:

circuitry configured for automated formulating of at least one command directing one or more flight control decisions of the first UFV including analyzing a notification of at least one condition indicative of a determination by the at least one second UFV of a condition of the second UFV which would benefit from assistance included in the at least one message, determining at least one mission modification to assist the second UFV in at least one mission based at least partially on the analysis, and formulating the at least one command based at least partially on the at least one mission modification.

13. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:

circuitry configured for automated formulating of at least one command directing one or more flight control decisions of the first UFV including analyzing a notification of at least one condition indicative of a determination by the at least one second UFV of a condition indicative of at least one assistance status for the second UFV included in the at least one message, determining at least one mission modification to assist the second UFV in at least one mission based at least partially on the analysis, and formulating the at least one command based at least partially on the at least one mission modification.

14. The base station of claim 1, wherein the circuitry configured for automated formulating of at least one command directing one or more flight control decisions of the first UFV including at least analyzing the notification of the at least one condition indicative of the least one inability to accomplish at least one portion of at least one mission without assistance included in the at least one message, determining at least one mission modification based at least partially on the analysis, and formulating the at least one command based at least partially on the at least one mission modification further comprises:

circuitry configured for automated formulating of at least one command directing one or more flight control decisions of the first UFV including analyzing a notification of at least one condition indicative of a determination by the at least one second UFV indicative of at least a partial mission failure included in the at least one message, determining at least one mission modification to update at least one mission based at least partially on the analysis, and formulating the at least one command based at least partially on the at least one mission modification.

15. The base station of claim 1, wherein the circuitry configured for automated formulating of at least one command directing one or more flight control decisions of the first UFV including at least analyzing the notification of the at least one condition indicative of the least one inability to accomplish at least one portion of at least one mission without assistance included in the at least one message, determining at least one mission modification based at least partially on the analysis, and formulating the at least one command based at least partially on the at least one mission modification further comprises:

circuitry configured for automated formulating of at least one command directing one or more flight control decisions of the first UFV including analyzing a notification of at least one condition indicative of a determination by the at least one second UFV indicative of confirmed clearance for at least a portion of at least one joint mission associated with the first UFV and the second UFV included in the at least one message, determining at least one mission modification to update at least one mission based at least partially on the analysis, and formulating the at least one command based at least partially on the at least one mission modification.

16. The base station of claim 1, further comprising:
circuitry configured for transmitting to the first UFV at least one update command to update instruction code on the first UFV.

17. The base station of claim 16, wherein the circuitry configured for transmitting to the first UFV at least one update command to update instruction code on the first UFV comprises:

circuitry configured for wirelessly transmitting to the first UFV the at least one update command to update the instruction code on the first UFV while the first UFV is airborne.

18. The base station of claim 16, wherein the circuitry configured for transmitting to the first UFV at least one update command to update instruction code on the first UFV comprises:

circuitry configured for transmitting to the first UFV at least one dissemination command to order the first UFV to send instruction code to at least one other UFV during flight deployment.

19. The base station of claim 1, further comprising:
circuitry configured for transmitting to the first UFV at least one update command to update at least one security protocol of the first UFV.

20. The base station of claim 19, wherein the circuitry configured for transmitting to the first UFV at least one update command to update at least one security protocol of the first UFV comprises:
circuitry configured for transmitting to the first UFV at least one malware indicator to be included in at least one updated security protocol of the first UFV.

21. The base station of claim 19, wherein the circuitry configured for transmitting to the first UFV at least one update command to update at least one security protocol of the first UFV comprises:
circuitry configured for transmitting to the first UFV at least one dissemination indicator to inform the first UFV to share the at least one security protocol with one or more other UFVs during flight.

22. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:
at least one of:
circuitry configured for automated formulating of at least one command directing one or more flight control decisions of the first UFV including analyzing a notification indicative of a determination by the at least one second UFV of a code specifying at least an instruction to return and a location of the base included in the at least one message, determining at least one mission modification to return to a base based at least partially on the analysis, and formulating the at least one command based at least partially on the at least one mission modification; or
circuitry configured for automated formulating of at least one command directing one or more flight control decisions of the first UFV including at least analyzing a notification indicative of at least partial mission success included in the at least one message, determining at least one order for the first UFV to undertake at least one new mission based at least partially on the analysis, and formulating the at least one command based at least partially on the at least one order for the first UFV to undertake at least one new mission.

23. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:
circuitry configured for automated formulating of at least one command directing one or more flight control decisions of the first UFV including at least analyzing a notification indicative of at least partial mission success included in the at least one message, determining at least one order for the first UFV to undertake at least one new mission based at least partially on the analysis, and formulating the at least one command based at least partially on the at least one order for the first UFV to undertake at least one new mission.

24. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:
circuitry configured for automated formulating of at least one command directing one or more flight control decisions of the first UFV including at least analyzing a notification of at least one situation in which mission success may be jeopardized included in the at least one message, determining at least one order for the first UFV to formulate at least one alternative mission objective based at least partially on the analysis, and formulating the at least one command based at least partially on the at least one order for the first UFV to formulate at least one alternative mission objective.

25. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:
circuitry configured for automated formulating of at least one command directing one or more flight control decisions of the first UFV including at least analyzing at least one notification of a condition in which the second UFV can benefit from assistance included in the at least one message, determining at least one order for the first UFV to refuel based at least partially on the analysis, and formulating the at least one command based at least partially on the at least one order for the first UFV to refuel.

26. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:
circuitry configured for automated formulating of at least one command directing one or more flight control decisions of the first UFV including at least analyzing at least one notification that at least a portion of the mission is in a failure condition included in the at least one message, determining at least one order for the first UFV to update at least one mission objective based at least partially on the analysis, and formulating the at least one command based at least partially on the at least one order for the first UFV to update at least one mission objective.

27. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:
circuitry configured for automated formulating of at least one command directing one or more flight control decisions of the first UFV including at least analyzing at least one notification indicative of a determination by the at least one second UFV of an inability to carry out at least a portion of a mission included in the at least one message, determining at least one order for the first UFV to adjust at least one flight plan based at least partially on the analysis, and formulating the at least one command based at least partially on the at least one order for the first UFV to adjust at least one flight plan.

28. The base station of claim 1, wherein the circuitry configured for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification further comprises:
circuitry configured for automated formulating of at least one command directing one or more flight control decisions of the first UFV including at least analyzing at least one notification indicative of a determination by the at least one second UFV of an inability to carry out the at least a portion of at least one mission included in the at least one message, determining at least one order for the first UFV to undertake at least a portion of at least one mission previously assigned to the second UFV based at least partially on the analysis, and formulating the at least one command based at least partially on the at least one order for the first UFV to undertake at least a portion of at least one mission previously assigned to the second UFV.

29. The base station of claim 1, wherein the circuitry configured for automated formulating of at least one command directing one or more flight control decisions of the first UFV including at least analyzing the notification indicative that the second UFV has autonomously determined an inability to accomplish at least one portion of at least one mission without assistance included in the at least one message, determining at least one mission modification based at least partially on the analysis, and formulating the at least one command based at least partially on the at least one mission modification further comprises:
circuitry configured for automated formulating of at least one command directing one or more flight control decisions of the first UFV including at least analyzing at least one notification indicative of a determination by the at least one second UFV of an inability to carry out at least a portion of at least one mission according to a predetermined schedule included in the at least one message, determining at least one order for the first UFV to undertake at least a portion of at least one mission previously assigned to the second UFV based at least partially on the analysis, and formulating the at least one command based at least partially on the at least one order for the first UFV to undertake at least a portion of at least one mission previously assigned to the second UFV.

30. The base station of claim 1, wherein the circuitry configured for receiving at least one message from at least the second UFV comprises:
circuitry configured for receiving at least one message from at least the second UFV which autonomously detects at least one condition indicative of at least one inability to accomplish at least one portion of at least one mission without assistance, formulates at least one notification configured to inform the base station of the at least one condition for inclusion in the at least one message, and transmits the at least one message to the base station upon detection that the second UFV has autonomously determined an inability to accomplish at least one portion of at least one mission without assistance.

31. The base station of claim 1, wherein the circuitry configured for receiving at least one message from at least the second UFV comprises:
circuitry configured for receiving at least one message from at least the second UFV which autonomously detects at least one condition indicative of at least one inability to accomplish at least one portion of at least one mission without assistance, formulates at least one notification configured to identify the at least one condition from among two or more conditions for inclusion in the at least one message, and transmits the at least one message to the base station upon detection that the second UFV has autonomously determined an inability to accomplish at least one portion of at least one mission without assistance.

32. The base station of claim 1, wherein the circuitry configured for receiving at least one message from at least the second UFV comprises:
circuitry configured for receiving at least one message from at least the second UFV which autonomously detects at least one condition indicative of the second UFV lacking at least one resource to complete at least one portion of at least one mission, formulates at least one notification configured to identify the at least one condition indicative of the second UFV lacking at least one resource to complete at least one portion of at least one mission for inclusion in the at least one message, and transmits the at least one message to the base station upon detection of the at least one condition indicative of the second UFV lacking at least one resource to complete at least one portion of at least one mission.

33. The base station of claim 1, wherein the circuitry configured for receiving at least one message from at least the second UFV comprises:
circuitry configured for receiving at least one message from at least the second UFV which autonomously detects at least one condition indicative of a state of partial incapacity of the second UFV, formulates at least one notification configured to identify the at least one condition indicative of a state of partial incapacity of the second UFV for inclusion in the at least one message, and transmits the at least one message to the base station upon detection of the at least one condition indicative of a state of partial incapacity of the second UFV.

34. The base station of claim 1, wherein the circuitry configured for receiving at least one message from at least the second UFV comprises:
circuitry configured for receiving at least one message from at least the second UFV which autonomously detects at least one condition indicative of the second UFV lacking sufficient fuel to reach at least one destination, formulates at least one notification configured to identify the at least one condition indicative of the second UFV lacking sufficient fuel to reach at least one destination for inclusion in the at least one message, and transmits the at least one message to the base station upon detection of the at least one condition indicative of the second UFV lacking sufficient fuel to reach at least one destination.

35. The base station of claim 1, wherein the circuitry configured for receiving at least one message from at least the second UFV comprises:
circuitry configured for receiving at least one message from at least the second UFV which autonomously detects at least one condition indicative of non-completion of at least one mission task by the second UFV, formulates at least one notification configured to identify the at least one condition indicative of non-completion of at least one mission task by the second UFV for inclusion in the at least one message, and transmits the at least one message to the base station upon detection of the at least one condition indicative of non-completion of at least one mission task by the second UFV.

36. The base station of claim 1, wherein the circuitry configured for receiving at least one message from at least the second UFV comprises:
circuitry configured for receiving at least one message from at least the second UFV which autonomously detects at least one condition indicative of at least one determination by the second UFV that an intermediate state of at least a portion of at least one mission has not been completed by a specified deadline, formulates at least one notification configured to identify the at least one condition indicative of at least one determination by the second UFV that an intermediate state of at least a portion of at least one mission has not been completed by a specified deadline for inclusion in the at least one message, and transmits the at least one message to the base station upon detection of the at least one condition indicative of at least one determination by the second UFV that an intermediate state of at least a portion of at least one mission has not been completed by a specified deadline.

37. The base station of claim 1, wherein the circuitry configured for receiving at least one message from at least the second UFV comprises:
circuitry configured for receiving at least one message from at least the second UFV which autonomously detects at least one condition indicative of at least one determination by the second UFV that interference is hampering sensor readings, formulates at least one notification configured to identify the at least one condition indicative of at least one determination by the second UFV that interference is hampering sensor readings for inclusion in the at least one message, and transmits the at least one message to the base station upon detection of the at least one condition indicative of at least one determination by the second UFV that interference is hampering sensor readings.

38. The unoccupied flying vehicle (UFV) of claim 1, wherein the circuitry configured for automated formulating of at least one command directing one or more flight control decisions of the first UFV comprises:
circuitry configured for automated formulating of at least one command directing one or more flight control decisions of the first UFV based at least partially on the analysis of at least one mission objective including one or more of an assigned goal, a target to scan with one or more sensors, a payload to acquire or deliver, a tasked accomplishment, a deadline to meet, a destination to reach, an enumerated set of steps to follow, or a procedure to complete.

39. A method comprising:
effectuating one or more communications with at least a first unoccupied flying vehicle (UFV) and a second UFV;
receiving at least one message from at least the second UFV, the at least one message including at least a notification indicative that the second UFV has autonomously determined an inability to accomplish at least one portion of at least one mission without assistance;
automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification; and
transmitting to the first UFV at least one command,
wherein at least one of the effectuating, receiving, formulating, or the transmitting is at least partially implemented using one or more machines.

40. A system comprising:
means for effectuating one or more communications with at least first unoccupied flying vehicle (UFV) and a second UFV;
means for receiving at least one message from at least the second UFV, the at least one message including at least a notification indicative that the second UFV has autonomously determined an inability to accomplish at least one portion of at least one mission without assistance;
means for automated formulating of at least one command directing one or more flight control decisions of the first UFV including at least analyzing the notification indicative of the least one inability to accomplish at least one portion of at least one mission without assistance included in the at least one message, determining at least one mission modification based at least partially on the analysis, and formulating the at least one command based at least partially on the at least one mission modification; and
means for transmitting to the first UFV at least one command,
wherein at least one of the means for effectuating, the means for receiving, the means for formulating, or the means for transmitting is at least partially implemented using one or more machines.

* * * * *

UNITED STATES PATENT AND TRADEMARK OFFICE
CERTIFICATE OF CORRECTION

PATENT NO. : 9,540,102 B2
APPLICATION NO. : 13/800391
DATED : January 10, 2017
INVENTOR(S) : Levien et al.

It is certified that error appears in the above-identified patent and that said Letters Patent is hereby corrected as shown below:

On the Title Page

Under abstract "40 Claims, 27 Drawing Sheets" should read --39 Claims, 27 Drawing Sheets--

In the Claims

In Column 53, Line 50, Claim 13 "of the least one inability to accomplish at least one" should be --of the at least one inability to accomplish at least one--
In Column 54, Line 5, Claim 14 "at least one condition indicative of the least one inability to" should be --at least one condition indicative of the at least one inability to--
In Column 55, Line 24, Claim 22 "of the least one inability to accomplish at least one" should be --of the at least one inability to accomplish at least one--
In Column 55, Line 46, Claim 22 "mission success included in the at least one message." should be --mission success included in the at least one message,--
In Column 55, please delete Claim 23
In Column 56, Line 6, replace "24." with --23.--
In Column 56, Line 27, replace "25." with --24.--
In Column 56, Line 47, replace "26." with --25.--
In Column 56, Line 10, "of the least one inability to accomplish at least one" should be --of the at least one inability to accomplish at least one--
In Column 56, Line 31, "of the least one inability to accomplish at least one" should be --of the at least one inability to accomplish at least one--
In Column 56, Line 51, "of the least one inability to accomplish at least one" should be --of the at least one inability to accomplish at least one--
In Column 57, Line 1, replace "27." with --26.--
In Column 57, Line 22, replace "28." with --27.--
In Column 57, Line 46, replace "29." with --28.--
In Column 57, Line 5, "of the least one inability to accomplish at least one" should be --of the at least one inability to accomplish at least one--

Signed and Sealed this
Thirtieth Day of May, 2017

Michelle K. Lee
*Director of the United States Patent and Trademark Office*

CERTIFICATE OF CORRECTION (continued)
U.S. Pat. No. 9,540,102 B2

In Column 58, Line 5, replace "30." with --29.--
In Column 58, Line 21, replace "31." with --30.--
In Column 58, Line 37, replace "32." with --31.--
In Column 58, Line 54, replace "33." with --32.--
In Column 59, Line 1, replace "34." with --33.--
In Column 59, Line 16, replace "35." with --34.--
In Column 59, Line 30, replace "36." with --35.--
In Column 59, Line 50, replace "37." with --36.--
In Column 60, Line 1, replace "38." with --37.--
In Column 60, Line 14, replace "39." with --38.--
In Column 60, Line 37, replace "40." with --39.--
In Column 60, Line 52, "indicative of the least one inability to accomplish at" should be --indicative of the at least one inability to accomplish at--